US012788011B2

(12) United States Patent
Rosenmund

(10) Patent No.: US 12,788,011 B2
(45) Date of Patent: Nov. 10, 2026

(54) 5-FLUORO-4-IMINO-3-METHYL-1-TOSYL-3,4-DIHYDROPYRIMIDIN-2(1H)-ONE FOR CONTROLLING PLANT DISEASES

(71) Applicants: Adama Makhteshim Ltd., Beer Sheva (IL); Alexandra Rosenmund, Zurich (CH)

(72) Inventor: Alexandra Rosenmund, Zurich (CH)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 325 days.

(21) Appl. No.: 18/262,914

(22) PCT Filed: Jan. 27, 2022

(86) PCT No.: PCT/IB2022/050735

§ 371 (c)(1),
(2) Date: Jul. 25, 2023

(87) PCT Pub. No.: WO2022/162591

PCT Pub. Date: Aug. 4, 2022

(65) Prior Publication Data

US 2024/0172750 A1 May 30, 2024

Related U.S. Application Data

(60) Provisional application No. 63/298,901, filed on Jan. 12, 2022, provisional application No. 63/142,447, filed on Jan. 27, 2021.

(51) Int. Cl.
*A01N 43/54* (2006.01)
*A01P 3/00* (2006.01)

(52) U.S. Cl.
CPC ................ *A01N 43/54* (2013.01); *A01P 3/00* (2021.08)

(58) Field of Classification Search
CPC ................................. A01N 43/54; A01P 3/00
USPC ................................................. 504/100, 105
See application file for complete search history.

(56) References Cited

FOREIGN PATENT DOCUMENTS

| | | |
|---|---|---|
| WO | WO 2014/105845 A1 | 7/2014 |
| WO | WO 2020/095181 A1 | 5/2020 |

OTHER PUBLICATIONS

International Search Report issued Mar. 31, 2022 in connection with PCT International Application No. PCT/IB2022/050735.
Written Opinion of the International Searching Authority issued Mar. 31, 2022 in connection with PCT International Application No. PCT/IB2022/050735.

*Primary Examiner* — Charanjit Aulakh
(74) *Attorney, Agent, or Firm* — Gary J. Gershik

(57) ABSTRACT

The present invention provides a method for treating select plants against select fungal pathogen infection and/or fungal disease comprising applying an amount of flumetylsulforim to the plant or a locus thereof so as to thereby treat the plant against the fungal pathogen infection and/or fungal disease. The present invention also provides method for treating a plant against fungal pathogen infection and/or fungal disease comprising applying an amount of flumetylsulforim, wherein the amount of flumetylsulforim is effective to treat the plant against fungal pathogen infection and/fungal disease and has an ecologically acceptable effect on non-target organisms.

18 Claims, 8 Drawing Sheets

5-FLUORO-4-IMINO-3-METHYL-1-TOSYL-3,4-DIHYDROPYRIMIDIN-2(1H)-ONE FOR CONTROLLING PLANT DISEASES

CROSS-REFERENCE TO RELATED APPLICATIONS

This application is a § 371 national stage of PCT International Application No. PCT/IB2022/050735, filed Jan. 27, 2022, claiming the benefit of U.S. Provisional Application No. 63/298,901, filed Jan. 12, 2022, and U.S. Provisional Application No. 63/142,447, filed Jan. 27, 2021, the entire contents of each of which are hereby incorporated by reference into the subject application.

Throughout this application various publications are referenced. The disclosures of these documents in their entireties are hereby incorporated by reference into this application in order to more fully describe the state of the art to which this invention pertains.

FIELD OF THE INVENTION

This disclosure concerns use compound of Formula I for treating a plant against fungal pathogen infection and/or fungal disease comprising applying an amount of a compound of Formula I Formula I

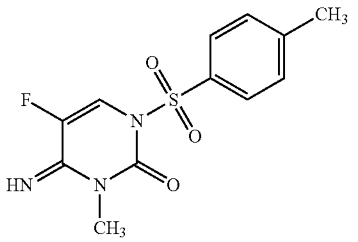

(flumetylsulforim) to a plant or a locus thereof so as to thereby treat the plant against fungal pathogen infection and/or fungal disease. The present invention also provides method for treating a plant against fungal pathogen infection and/or fungal disease comprising applying an amount of flumetylsulforim, wherein the amount of flumetylsulforim is effective to treat the plant against fungal pathogen infection and/fungal disease and has an ecologically acceptable effect on non-target organisms.

BACKGROUND AND SUMMARY

Fungicides are compounds, of natural or synthetic origin, which act to protect plants against damage caused by fungi. Current methods of agriculture rely heavily on the use of fungicides. In fact, some crops cannot be grown usefully without the use of fungicides. Using fungicides allows a grower to increase the yield and the quality of the crop, and consequently, increase the value of the crop. In most situations, the increase in value of the crop is worth at least three times the cost of the use of the fungicide.

5-fluoro-4-imino-3-methyl-1-tosyl-3,4-dihydropyrimidin-2(1H)-one is a compound which provides control of a variety of pathogens affecting economically important crops including, but not limited to, the causal agent of leaf blotch in wheat, *Zynoseptoria tritici* (SEPTTR) and fungi of the classes ascomycetes and basidiomycetes. 5-fluoro-4-imino-3-methyl-1-tosyl-3,4-dihydropyrimidin-2(1H)-one has both preventive and curative effects.

Uses of N3-substituted-N1-sulfonyl-5-fluoropyrimidinone derivatives as fungicides were described in U.S. Pat. No. 8,263,603, issued Sep. 11, 2012, the content of which is incorporated herein by reference in its entirety. Methods of preparation of 5-fluoro-4-imino-3-methyl-1-tosyl-3,4-dihydropyrimidin-2(1H)-one were described in U.S. Pat. No. 9,850,215, issued Dec. 26, 2017 and U.S. Pat. No. 9,840,476, issued Dec. 12, 2017, the contents of each of which are incorporated herein by reference in their entirety. U.S. Pat. No. 8,263,603 also described fungicidal compositions for the control or prevention of fungal attack comprising N3-substituted-N1-sulfonyl-5-fluoropyrimidinone derivatives and a phytologically acceptable carrier material, and methods of use thereof. Use of 5-fluoro-4-imino-3-(alkyl/substituted alkyl)-1-(arylsulfonyl)-3,4-dihydropyrimidin-2(1H)-one as seed treatment to prevent or control plant disease was described U.S. Patent Application Publication No. 2018/0000082, published on Jan. 4, 2018. Synergistic mixtures comprising 5-fluoro-4-imino-3-methyl-1-tosyl-3,4-dihydropyrimidin-2(1H)-one and at least one fungicidal sterol biosynthesis inhibitor were described in U.S. Pat. No. 9,526,245, issued Dec. 27, 2016 and U.S. Pat. No. 10,045,533, issued Aug. 14, 2018. Synergistic mixtures comprising 5-fluoro-4-imino-3-methyl-1-tosyl-3,4-dihydropyrimidin-2(1H)-one and at least one succinate dehydrogenase inhibitor were described in U.S. Pat. No. 9,532,570, issued Jan. 3, 2017 and U.S. Pat. No. 10,045,534, issued Aug. 14, 2018. Synergistic mixtures comprising 5-fluoro-4-imino-3-methyl-1-tosyl-3,4-dihydropyrimidin-2(1H)-one and fluindapyr, pydiflumetofen, mefentrifluconazole, inpyrfluxam, isofetamid, and Qi inhibitor were described in PCT/IB2020/056828

There is a need to develop additional methods that are effective for treating a plant against fungal pathogen infection and/or fungal disease.

SUMMARY OF THE INVENTION

The present invention provides a method for treating a plant against fungal pathogen infection and/or fungal disease comprising applying an amount of a compound of Formula I Formula I

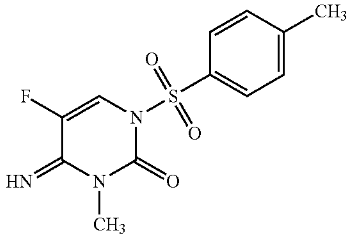

to a plant or a locus thereof so as to thereby treat the plant against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Coryne-*

*spora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

The present invention also provides a method for treating a seed or seedling against fungal pathogen infection and/or fungal disease comprising applying a compound of Formula I Formula I

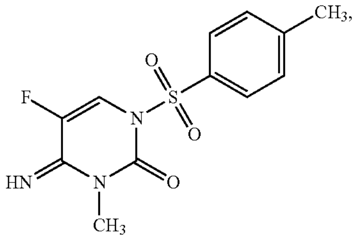

to the seed, seedling and/or a locus thereof so as to thereby treat the seed or seedling against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus-carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

The present invention also provides a method of producing a plant resistant to fungal pathogen infection and/or fungal disease, the method comprising applying a compound of Formula I Formula I

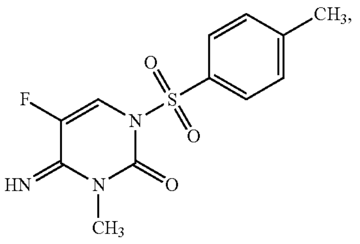

to the plant or a locus thereof so as to thereby produce a plant resistant to fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

The present invention also provides a method of producing a plant resistant to fungal pathogen infection and/or fungal disease, the method comprising applying a compound of Formula I Formula I

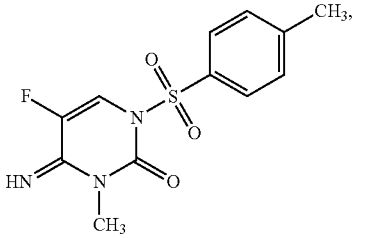

to a seed of the plant, a seedling of the plant, and/or a locus of the seed or seedling, so as to thereby produce a plant resistant to fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

The present invention also provides a plant resistant to fungal pathogen infection and/or fungal disease, wherein the seed adapted to produce the plant, the seedling adapted to produce the plant, or a locus of plant is treated with a compound of Formula I Formula I

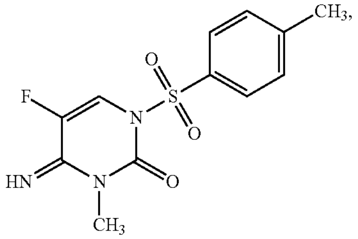

wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

The present invention also provides a plant seed or seedling adapted to produce a plant resistant to fungal pathogen infection and/or fungal disease, wherein the plant seed or seedling is treated with a compound of Formula I Formula I

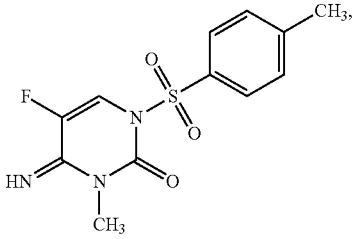

and wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

The present invention also provides use of a compound of Formula I

Formula I

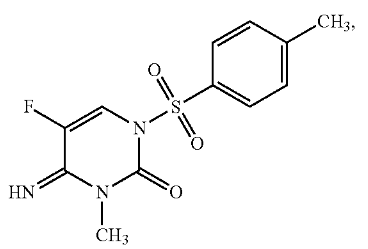

for treating a plant against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

The present invention also provides a composition comprising an amount of the compound of formula I Formula I

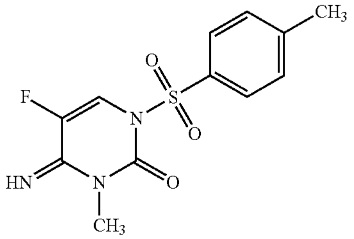

for treating a plant against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

DETAILED DESCRIPTION

Definitions

Figure 1:
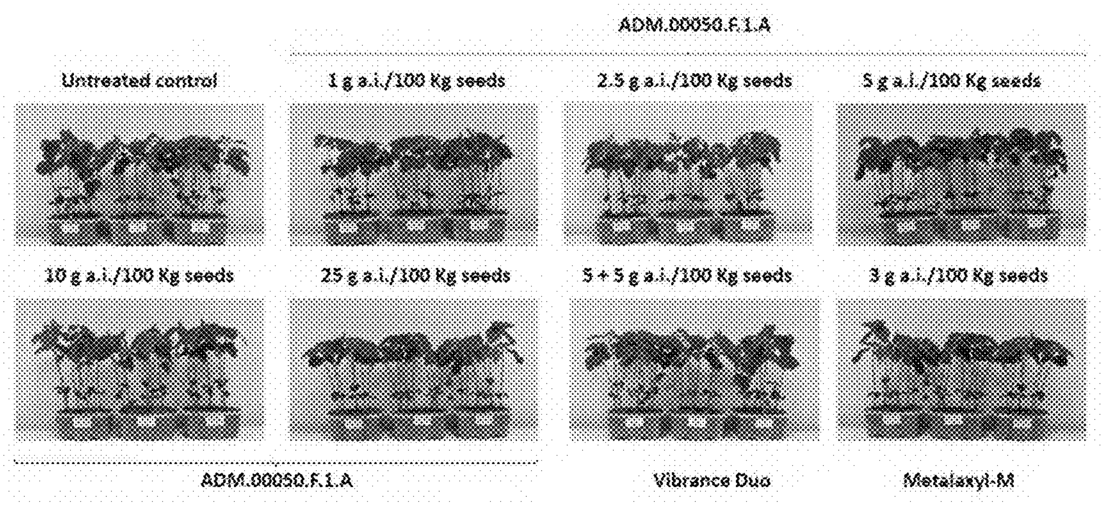
FIG. 1: observation of the aerial part development of soybean plants from untreated seeds (control) or treated with ADM.00050.F.1.A at five rates, Vibrance Duo or Metalaxyl-M at one rate each after 3 weeks of incubation in controlled conditions.

Unless defined otherwise, all technical and scientific terms used herein have the meaning commonly understood by persons of ordinary skill in the art to which this subject matter belongs.

As used herein, the term "compound of formula I" includes all solid forms thereof including, but not limited to, amorphous, crystalline, solvate or hydrate. Crystalline forms of the compound of Formula I are disclosed in PCT International Application Publication No. WO 2019/038583 A1, published Feb. 28, 2019, the entire content of which is hereby incorporated by reference. The term "compound of formula I" also includes salts and optical isomers thereof.

As used herein, the terms "compound of formula I" and "flumetylsulforim" may be used interchangeably.

As used herein, the term "simultaneous" when used in connection with application of agrochemicals means that the agrochemicals are applied in an admixture, for example, a tank mix. For simultaneous application, the combination may be the admixture or separate containers each containing an agrochemical that are combined prior to application.

As used herein, the term "contemporaneous" when used in connection with application of agrochemicals means that an individual agrochemical is applied separately from another agrochemical or premixture at the same time or at times sufficiently close together that an activity that is additive or more than additive or synergistic relative to the activity of either agrochemical alone at the same dose is achieved.

As used herein, the term "mixture" refers to, but is not limited to, a combination in any physical form, e.g., blend, solution, suspension, dispersion, emulsion, alloy, or the like.

As used herein, the term "tank mix" means one or more of the components of the combination, of the present invention are added are mixed in a spray tank at the time of spray application or prior to spray application.

As used herein, the term "composition" includes flumetylsulforim or a combination or a mixture of the present invention with an agriculturally acceptable carrier.

As used herein, the term "effective" when used in connection with an amount of the active ingredient (for example the compound of formula I), combination, mixture or composition refers to an amount of the active ingredient, combination, mixture or composition that achieve an agriculturally beneficial level of control of the fungus, pathogen, and/or disease when applied to a plant, propagation material of the plant, soil or a locus.

As used herein, the term "effective" when used in connection with a method for treating a plant or locus against fungal infection means that the method provides an agriculturally beneficial level of treatment without significantly interfering with the normal growth and development of the plant.

As used herein, the term "effective" when used in connection with an active ingredient (for example the compound of formula I), a mixture, or a composition may be, but is not limited to, controlling fungal disease and/or preventing fungal disease.

In some embodiments, the method is effective for controlling fungal disease. In some embodiments, the method is effective for preventing fungal disease.

As used herein, the term "effective amount" refers to an amount of the active ingredient (for example the compound of formula I), composition or mixture which is sufficient for controlling harmful fungi on crop plants and does not cause any significant damage to the treated crop plants.

As used herein, the term "fungicidally effective amount" refers to an amount of the active ingredient (for example the compound of formula I) that is commercially recommended for use to control fungi. The commercially recommended amount for each active component, often specified as application rates of the commercial formulation, may be found on the label accompanying the commercial formulation. The commercially recommended application rates of the commercial formulation may vary depending on factors such as the plant species and the fungus to be controlled.

As used herein, the term "treating a plant or locus against fungal infection" includes, but is not limited to, protecting the plant or locus against fungal infection and/or controlling fungal infection of the plant or locus.

As used herein, the term "protecting the plant or locus against fungal infection" includes, but is not limited to, protecting the plant or locus against fungal attack, protecting the plant or locus from fungal disease, and/or preventing fungal infection of the plant or locus.

As used herein, the term "controlling fungal infection of the plant or locus" includes, but is not limited to, controlling fungal disease infecting the plant or locus, controlling a plant or soil disease caused by phytopathologic fungi, controlling fungal attack on the plant or locus, reducing fungal infection of the plant or locus, and/or curing plant or soil disease caused by phytopathologic fungi.

As used herein, the term "protectant application" means an application of one or more fungicide for preventing fungal infection of the plant or locus, wherein the fungicidal combination, mixture or composition is applied before infection occurs, before any disease symptoms are shown or when the disease pressure is low. Disease pressure may be assessed based on the conditions associated with disease development such as spore concentration and certain environmental conditions.

As used herein the term "curative application" means an application of one or more fungicide for controlling fungal infection of the plant or locus, wherein the fungicidal combination, mixture or composition is applied after an infection or after disease symptoms are shown.

As used herein, the term "agriculturally acceptable carrier" means carriers which are known and accepted in the art for the formation of compositions for agricultural or horticultural use.

As used herein, the term "adjuvant" is broadly defined as any substance that itself is not an active ingredient but which enhances or is intended to enhance the effectiveness of the fungicide with which it is used. Adjuvants may be understood to include, spreading agents, penetrants, compatibility agents, and drift retardants.

As used herein, the term "agriculturally acceptable inert additives" is defined as any substance that itself is not an active ingredient but is added to the composition such as sticking agents, surfactants, synergists, buffers, acidifiers, anti-oxidation agent, defoaming agents and thickeners.

As used herein, the term "plant" includes reference to the whole plant, plant organ (e.g., leaves, stems, twigs, roots, trunks, limbs, shoots, fruits etc.), plant cells, and propagation material of the plant.

As used herein the term "plant" includes reference to agricultural crops include field crops (soybean, maize, wheat, rice, etc.), vegetable crops (potatoes, cabbages, etc.) and fruits (peach, etc.).

As used herein the term "propagation material" is to be understood to denote all the generative parts of the plant such as seeds and spores, seedlings, and vegetative structures such as bulbs, corns, tubers, rhizomes, roots stems, basal shoots, stolons and buds.

As used herein, the term "locus" includes not only areas where fungal infection may already be shown, but also areas where fungal infection have yet to show, and also to areas under cultivation. Locus includes, but is not limited to, soil and other plant growth medium.

As used herein the term "ha" refers to hectare.

The term "a" or "an" as used herein includes the singular and the plural, unless specifically stated otherwise. Therefore, the terms "a," "an," or "at least one" can be used interchangeably in this application.

Throughout the application, descriptions of various embodiments use the term "comprising"; however, it will be understood by one of skill in the art, that in some specific instances, an embodiment can be described using the language "consisting essentially of" or "consisting of."

The term "about" herein specifically includes ±10% from the indicated values in the range. In addition, the endpoints of all ranges directed to the same component or property herein are inclusive of the endpoints, are independently combinable, and include all intermediate points and ranges.

It is understood that where a parameter range is provided, all integers within that range, and tenths thereof, are also provided by the invention as if the integers and tenths thereof are expressly described herein. For example, "5 g ai/ha to 120 g ai/ha" includes 5.0 g ai/ha, 5.1 g ai/ha, 5.2 g ai/ha, 5.3 g ai/ha, 5.4 g ai/ha, etc. up to 120 g ai/ha.

All publications, patents and patent applications mentioned in this specification are herein incorporated in their entirety by reference into the specification, to the same extent as if each individual publication, patent or patent application was specifically and individually indicated to be incorporated herein by reference.

The following examples illustrate the practice of the present subject matter in some of its embodiments but should not be construed as limiting the scope of the present subject matter. Other embodiments apparent to persons of ordinary skill in the art from consideration of the specification and examples herein that fall within the spirit and scope of the appended claims are part of this invention. The specification, including the examples, is intended to be exemplary only, without limiting the scope and spirit of the invention.

Aspects and embodiments of the present invention will now be described.

The present invention provides a method for treating a plant against fungal pathogen infection and/or fungal disease comprising applying an amount of a compound of Formula I Formula I

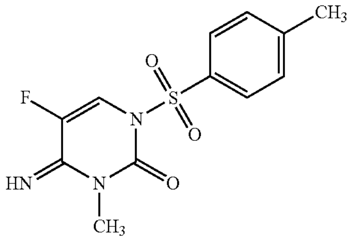

to a plant or a locus thereof so as to thereby treat the plant against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp.,

*Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

In some embodiments, treating a plant against fungal pathogen infection and/or fungal disease is controlling fungal pathogen infection and/or fungal disease.

In some embodiments, treating a plant against fungal pathogen infection and/or fungal disease is preventing fungal pathogen infection and/or fungal disease.

In some embodiments, treating a plant against fungal pathogen infection and/or fungal disease is protecting the plant from fungal pathogen infection and/or fungal disease.

In some embodiments, the compound of formula I is applied by contacting the plant or a locus thereof with an effective amount of a compound of Formula I.

In some embodiments, the compound of formula I is applied to root of the plant. In some embodiments, the compound of formula I is applied to foliage of the plant.

In some embodiments, the compound of formula I is applied to seed. In some embodiments, the compound of formula I is applied to seedling. In some embodiments, the plant is a seed or seedling.

In some embodiments, the fungal disease is a soil fungal disease.

In some embodiments, the plant disease is selected from the group consisting of blast, sheath blight, early blight, late blight, leaf blight, apple scab, downy mildew, black sigatoka, downy mildew, late season diseases of soybean, Asian soybean rust, anthracnose, powdery mildew, and any combination thereof.

In some embodiments, the plant disease is selected from the group consisting of blast, sheath blight, early blight, apple scab, downy mildew, black sigatoka, downy mildew, late season diseases of soybean, Asian soybean rust, anthracnose, powdery mildew, and any combination thereof.

In some embodiments, the plant disease is blast. In some embodiments, the plant disease is sheath blight. In some embodiments, the plant disease is early blight. In some embodiments, the plant disease is blast. In some embodiments, the plant disease is late blight. In some embodiments, the plant disease is leaf blight. In some embodiments, the plant disease is apple scab. In some embodiments, the plant disease is downy mildew.

In some embodiments, the plant disease is black sigatoka. In some embodiments, the plant disease is downy mildew. In some embodiments, the plant disease is late season diseases of soybean. In some embodiments, the plant disease is Asian soybean rust. In some embodiments, the plant disease is anthracnose. In some embodiments, the plant disease is powdery mildew.

In some embodiments, the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof.

In some embodiments, the fungal pathogen is selected from the group consisting of *Pyricularia oryzae, Rhizoctonia solani, sclerotinia sclerotium, Pseudoperonospora cubensis, Venturia inequalis, Podosphaera leucotricha,*

*Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof.

In some embodiments, the fungal pathogen is *Pyricularia oryzae*. In some embodiments, the fungal pathogen is *Rhizoctonia solani*. In some embodiments, the fungal pathogen is *Sclerotinia sclerotium*. In some embodiments, the fungal pathogen is *Pseudoperonospora cubensis*. In some embodiments, the fungal pathogen is *Venturia inequalis*. In some embodiments, the fungal pathogen is *Podosphaera leucotricha*. In some embodiments, the fungal pathogen is *Botrytis cinerea*. In some embodiments, the fungal pathogen is *Sphaerotheca fuliginea*. In some embodiments, the fungal pathogen is *Pseudoperonospora cubensis*. In some embodiments, the fungal pathogen is *Alternaria solani*. In some embodiments, the fungal pathogen is *Cercospora beticola. In some embodiments, the fungal pathogen is Ramularia beticola*. In some embodiments, the fungal pathogen is *Ramularia areola*. In some embodiments, the fungal pathogen is *Erysiphe betae*. In some embodiments, the fungal pathogen is *Phakopsora pachyrhizi*. In some embodiments, the fungal pathogen is, *Microsphaera diffusa*. In some embodiments, the fungal pathogen is *Mycosphaerella areola*. In some embodiments, the fungal pathogen is *Corynespora cassiicola*. In some embodiments, the fungal pathogen is *Colletotrichum dematium*. In some embodiments, the fungal pathogen is *Cercospora kikushi*. In some embodiments, the fungal pathogen is *Plasmopara viticola*. In some embodiments, the fungal pathogen is *Mycosphaerella fijiensis*. In some embodiments, the fungal pathogen is *Plasmopara viticola*. In some embodiments, the fungal pathogen is *Phytophthora infestans*. In some embodiments, the fungal pathogen is *Colletotrichum capsica*. In some embodiments, the fungal pathogen is *Podosphaera fuliginea*.

In some embodiments, plant is selected from the group consisting of soybean, rice, fruit plants, vegetable plants, sugar beet, rapeseed, grapevine, cotton and any combination thereof.

In some embodiments, the plant is soybean. In some embodiments, the plant is rice. In some embodiments, the plant is a fruit plant. In some embodiments, the plant is a vegetable plant. In some embodiments, the plant is sugar beet. In some embodiments, the plant is rapeseed. In some embodiments, the plant is grapevine. In some embodiments, the plant is cotton.

In some embodiments, the fruit is apple. In some embodiments, the fruit is strawberry. In some embodiments, the fruit is banana.

In some embodiments, the vegetable is zucchini. In some embodiments, the vegetable is cucumber. In some embodiments, the vegetable is potato. In some embodiments, the vegetable is chili. In some embodiments, the vegetable is carrot.

In some embodiments, the plant is soybean and the fungal pathogen is *Sclerotinia sclerotium.*

In some embodiments, the plant is soybean and the fungal pathogen is *Rhizoctonia solani.*

In some embodiments, the plant is rice and the fungal pathogen is *Rhizoctonia solani. In some embodiments, the plant is rice and the disease is sheath blight caused by fungal pathogen Rhizoctonia solani.*

In some embodiments, the plant the plant is rice and the fungal pathogen is *Pyricularia oryzae*. In some embodiments, the plant the plant is rice and the disease is blast caused by fungal pathogen *Pyricularia oryzae.*

In some embodiments, the plant the plant is rapeseed and the fungal pathogen is *Sclerotinia sclerotiorum.*

In some embodiments, the plant is cucumber and the fungal pathogen is *Pseudoperonospora cubensis*. In some embodiments, the plant is cucumber and the disease is downy mildew caused by fungal pathogen *Pseudoperonospora cubensis.*

In some embodiments, the plant is grapevine and the fungal pathogen is *Plasmopara viticola*. In some embodiments, the plant is grapevine and the disease is downy mildew caused by fungal pathogen *Plasmopara viticola.*

In some embodiments the plant is sugar beet and the fungal pathogen is *Erysiphe betae. In some embodiments the plant is sugar beet and the disease is powdery mildew caused by fungal pathogen Erysiphe betae.*

In some embodiments, the plant is banana and the fungal pathogen is *Mycosphaerella fijiensis*. In some embodiments, the plant is banana and the disease is black sigatoka caused by fungal pathogen *Mycosphaerella fijiensis*. In some embodiments, the plant is banana, the disease is black sigatoka caused by fungal pathogen *Mycosphaerella fijiensis*, and an EC composition of the compound of formula I is used. In some embodiments, the plant is banana, the disease is black sigatoka caused by fungal pathogen *Mycosphaerella fijiensis*, and an EC composition comprising 50 g/L of the compound of formula I is used. An example of an EC composition is provided in the Experiments Section.

In some embodiments, the plant is strawberry and the fungal pathogen is *Botrytis cinerea.*

In some embodiments, the plant is apple and the fungal pathogen is *Podosphaera leucotricha*. In some embodiments, the plant is apple and the disease is powdery mildew caused by fungal pathogen *Podosphaera leucotricha.*

In some embodiments the plant is soybean and the fungal pathogen is *Sphaerotheca fuliginea*. In some embodiments the plant is soybean and the disease is powdery mildew caused by fungal pathogen *Sphaerotheca fuliginea.*

In some embodiments, the plant is sugar beet and the fungal pathogen is *Cercospora beticola*. In some embodiments, the plant is sugar beet and the disease is *Cercospora* leaf spot caused by *Cercospora beticola.*

In some embodiments, the plant is sugar beet and the fungal pathogen is *Ramularia beticola.*

In some embodiments, the plant is soybean and the fungal pathogen is *Microsphaera diffusa*. In some embodiments, the plant is soybean and the disease is powdery mildew caused by fungal pathogen *Microsphaera diffusa.*

In some embodiments, the plant is cotton and the fungal pathogen is *Ramularia areola.*

In some embodiments, the plant is soybean and the fungal pathogen is *Corynespora cassiicola.*

In some embodiments, the plant is soybean and the fungal pathogen is *Colletotrichum dematium.*

In some embodiments, the plant is soybean and the fungal pathogen is *Cercospora kikushi.*

In some embodiments, the plant is apple and the fungal pathogen is *Venturia inequalis*. In some embodiments, the plant is apple and the disease is apple scab caused by fungal pathogen *Venturia inequalis.*

In some embodiments, the plant is potato and the fungal pathogen is *Alternaria solani. In some embodiments, the plant is potato and the disease is early blight caused by fungal pathogen Alternaria solani*. In some embodiments, the plant is potato and the fungal pathogen is *Phytophtora infestans*. In some embodiments, the plant is potato and the disease is late blight caused by *Phytophtora infestans.*

In some embodiments, the plant is soybean and the fungal pathogen is *Phakopsora pachyrhizi.*

In some embodiments, the plant the plant is soybean and the fungal pathogen is *Fusarium graminearum.*

In some embodiments, the plant is zucchini and the fungal pathogen is *Sphaerotheca fuliginea* (powdery mildew).

In some embodiments, the plant is zucchini and the fungal pathogen is *Podosphaera fuliginea*. In some embodiments, the plant is zucchini and the disease is powdery mildew caused by the fungal pathogen *Podosphaera fuliginea.*

In some embodiments, the plant is cucumber and the disease is downy mildew.

In some embodiments, the plant is soybean and the disease is Asian soybean rust.

In some embodiments, the plant is cotton and the fungal pathogen is *Mycosphaerella areola.*

In some embodiments, the plant is chili and the fungal pathogen is *Colletotrichum dematium.*

In some embodiments, the plant is chili and the disease is Anthracnose.

In some embodiments, the plant is chili and the fungal pathogen is *Colletotrichum capsici*. In some embodiments, the plant is chili and the disease is leaf blight caused by *Colletotrichum capsici.*

In some embodiments, the plant is banana and the fungal pathogen is *Mycosphaerella fijiensis.*

In some embodiments, the method is effective for protecting the plant or locus against fungal infection. In some embodiments, the method is effective for protecting the plant or locus against fungal attack. In some embodiments, the method is effective for protecting the plant or locus from fungal disease. In some embodiments, the method is effective for preventing fungal infection of the plant or locus.

In some embodiments, the method is effective for controlling fungal infection of the plant or locus. In some embodiments, the method is effective for controlling fungal disease infecting the plant or locus. In some embodiments, the method is effective for controlling a plant or soil disease caused by phytopathologic fungi. In some embodiments, the method is effective for controlling fungal attack on the plant or locus. In some embodiments, the method is effective for reducing fungal infection of the plant or locus. In some embodiments, the method is effective for curing plant or soil disease caused by phytopathologic fungi.

The present invention also provides a composition for controlling disease caused by pathogen on plant as described in Table A.

The present invention also provides a method for controlling disease caused by pathogen on plant as described in Table A.

TABLE A

| Disease | Fungal Pathogen | Crops |
|---|---|---|
| Early blight | *Alternaria* sp. | Potato or tomato |
| Anthracnose | *Colletotrichum* sp. | Pulses |
| Anthracnose | *Colletotrichum truncatum* | Chili |
| Asian soybean rust | *Phakopsora pachyrhizi* | Soybean |
| Black sigatoka | *Mycosphaerella fijiensis* | Banana |
| Brown rust | *Puccinia recondita* | Cereals |
| Coffee Berry Disease | *Colletotrichum kahawae* | Coffee |
| Coffee Leaf Rust | *Hemileia vastatrix* | Coffee |
| Didymella pisi | *Ascochyta rabiei* | Pulses |
| Downy mildew | *Pseudoperonospora cubensis* | Cucurbits |

TABLE A-continued

| Disease | Fungal Pathogen | Crops |
|---|---|---|
| Downy mildew | *Plasmopara viticola* | Grape |
| Fusarium head blight | *Fusarium* sp. | Cereals |
| Gray Leaf Spot | *Cercospora zeae-maydis* | Corn |
| Late blight | *Phytophthora infestans* | Potato or tomato |
| leaf spot of beet | *Cercospora beticola* | Sugar beet |
| Northern Corn Leaf Blight | *Setosphaeria turcica* | Corn |
| Northern Corn Leaf Spot | *Cochliobolus carbonum* | Corn |
| *Ramularia* leaf spot | *Ramularia collo-cygni* | Cereals |
| *Ramularia* leaf spot | *Ramularia areola* | Cotton |
| *Ramularia* leaf spot | *Ramularia beticola* | Sugar Beet |
| Rice Blast | *Pyricularia oryzae* | Rice |
| Rust | *Uromyces betae* | Sugar beet |
| Scab | *Venturia inaequalis* | Pome fruit |
| *Sclerotinia* | *Sclerotinia sclerotiorum* | OSR |
| Septoria | *Zymoseptoria tritici* | Cereals |
| Sheath Blight | *Rhizoctonia solani/ Thanatephorus cucumeris* | Rice |
| Southern corn leaf blight | *Cochliobolus heterostrophus* | Corn |
| Target spot | *Corynespora cassiicola* | Soybean |
| Yellow rust | *Puccinia striiformis* | Cereals |
| Yellow sigatoka | *Pseudocercospora musae* | Banana |

In some embodiments, the present invention provides a composition for controlling a disease caused by a fungal pathogen on a crop, wherein the disease, the fungal pathogen, and the crop are indicated in each row of Table A.

In some embodiments, the present invention provides a method for controlling a disease caused by a fungal pathogen on a crop, wherein the disease, the fungal pathogen, and the crop are indicated in each row of Table A.

The present invention also provides a composition for controlling powdery mildew on a plant. The present invention also provides a composition for controlling *Erysiphae diffusa, Erysiphae necator*, or *Erysiphae betae* on a plant. The present invention also provides a method for controlling powdery mildew on a plant. The present invention also provides a method for controlling *Erysiphae diffusa, Erysiphae necator*, or *Erysiphae betae* on a plant.

The present invention also provides a composition for controlling *Plenodomus lingam* on a plant. The present invention also provides a method for controlling *Plenodomus lingam* on a plant. In some embodiments, the plant is OSR.

The present invention also provides a composition for controlling *Plenodomus biglobosus* on a plant. The present invention also provides a method for controlling *Plenodomus biglobosus* on a plant. In some embodiments, the plant is OSR.

The present invention also provides a composition for controlling *Phaeosphaeria maydis* on a plant. The present invention also provides a method for controlling *Phaeosphaeria maydis* on a plant. In some embodiments, the plant is corn.

The present invention also provides a composition for controlling *Alternaria alternata* on a plant. The present invention also provides a method for controlling *Alternaria alternata* on a plant.

In some embodiments, the plant is apple.

In some embodiments, the compound of formula I is applied as seed treatment.

In some embodiments, the compound of formula I is applied as seed treatment at a rate between 0.5-50 g ai/100 kg seeds. In some embodiments, the compound of formula I is applied as seed treatment at a rate between 1-25 g ai/100 kg seeds. In some embodiments, the compound of formula I is applied as seed treatment at a rate of 1 g ai/100 kg seeds. In some embodiments, the compound of formula I is applied as seed treatment at a rate of 2.5 g ai/100 kg seeds. In some embodiments, the compound of formula I is applied as seed treatment at a rate of: 5 g ai/100 kg seeds. In some embodiments, the compound of formula I is applied as seed treatment at a rate of 10 g ai/100 kg seeds. In some embodiments, the compound of formula I is applied as seed treatment at a rate of 25 g ai/100 kg seeds.

In some embodiment, the seed is soybean.

In some embodiments, when the compound of formula I is applied as seed treatment, the suspension concentrate composition of the compound of formula I is used.

The present invention provides a method for treating a plant against fungal pathogen infection and/or fungal disease comprising applying an amount of a compound of Formula I Formula I

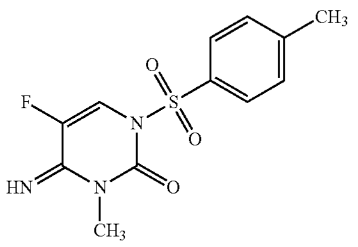

to a plant or a locus thereof so as to thereby treat the plant against fungal pathogen infection and/or fungal disease, wherein the rate of application, disease, the fungal pathogen, and/or the crop are indicated in any one or any combination of the embodiments described herein below.

In some embodiments, the present invention provides a method for controlling a disease caused by a fungal pathogen on a crop, wherein the rate of application, disease, the fungal pathogen, and/or the crop are indicated in any one or any combination of the embodiments described herein below.

In some embodiments, the compound of formula I is applied as foliar treatment. In some embodiments, the compound of formula I is applied as foliar treatment at a rate between 5 and 1000 g ai/ha. In some embodiments, the compound of formula I is applied as foliar treatment at a rate between 5 and 500 g ai/ha. In some embodiments, the compound of formula I is applied as foliar treatment at a rate between 50 and 200 g ai/ha. In some embodiments, the compound of formula I is applied as foliar treatment at a rate between 50 and 150 g ai/ha. In some embodiments, the compound of formula I is applied as foliar treatment at a rate between 200 and 500 g ai/ha.

In some embodiments, the compound of formula I is applied as foliar treatment at a rate of 6.25 g ai/ha. In some embodiments, the compound of formula I is applied as foliar treatment at a rate of 12.5 g ai/ha. In some embodiments, the compound of formula I is applied as foliar treatment at a rate of 25 g ai/ha. In some embodiments, the compound of formula I is applied as foliar treatment at a rate of 50 g ai/ha. In some embodiments, the compound of formula I is applied as foliar treatment at a rate of 75 g ai/ha. In some embodiments, the compound of formula I is applied as foliar treatment at a rate of 100 g ai/ha. In some embodiments, the compound of formula I is applied as foliar treatment at a rate of 125 g ai/ha. In some embodiments, the compound of formula I is applied as foliar treatment at a rate of 150 g ai/ha. In some embodiments, the compound of formula I is applied as foliar treatment at a rate of 175 g ai/ha. In some embodiments, the compound of formula I is applied as foliar treatment at a rate of 200 g ai/ha. In some embodiments, the compound of formula I is applied as foliar treatment at a rate of 225 g ai/ha. In some embodiments, the compound of formula I is applied as foliar treatment at a rate of 250 g ai/ha. In some embodiments, the compound of formula I is applied as foliar treatment at a rate of 275 g ai/ha. In some embodiments, the compound of formula I is applied as foliar treatment at a rate of 300 g ai/ha. In some embodiments, the compound of formula I is applied as foliar treatment at a rate of 400 g ai/ha. In some embodiments, the compound of formula I is applied as foliar treatment at a rate of 450 g ai/ha. In some embodiments, the compound of formula I is applied as foliar treatment at a rate of 500 g ai/ha.

In some embodiments, the application rate of the compound of formula I for controlling *Sclerotinia sclerotium* as a foliar application in rapeseed is between 75-200 g ai/ha. In some embodiments, the application rate of the compound of formula I for controlling *Sclerotinia sclerotium* as a foliar application in rapeseed is between 75-150 g ai/ha. The application time is at flowering.

In some embodiments, the application rate of the compound of formula I for controlling *Sclerotinia sclerotium* in soybean as seed treatment is between 1-25 g ai/100 kg seeds. In some embodiments, the application rate of the compound of formula I for controlling *Sclerotinia sclerotium* in soybean as seed treatment is between 5-25 g ai/100 kg seeds.

In some embodiments, the application rate of the compound of formula I for controlling *Rhizoctonia solani* in soybean as seed treatment is between 1-25 g ai/100 kg seeds. In some embodiments, the application rate of the compound of formula I for controlling *Rhizoctonia solani* in soybean as seed treatment is between 5-25 g ai/100 kg seeds.

In some embodiments, the application rate of the compound of formula I for controlling *Phytium ultimum* in soybean as seed treatment is between 5-25 g ai/100 kg seeds.

In some embodiments, the application rate of the compound of formula I for controlling *Fusarium graminearum* in soybean as seed treatment is between 5-25 g ai/100 kg seeds.

In some embodiments, the application rate of the compound of formula I for controlling *Fusarium graminearum* in wheat as seed treatment is between 5-25 g ai/100 kg seeds.

In some embodiments, the application rate of the compound of formula I for controlling *Rhizoctonia solani* (sheath blight) in rice as a foliar application is between 50-200 g ai/ha. In some embodiments, the application rate of the compound of formula I for controlling *Rhizoctonia solani* (sheath blight) in rice as a foliar application is between 50-150 g ai/ha.

In some embodiments, the application rate of the compound of formula I for controlling *Pyricularia oryzae* (blast) in rice as a foliar application is between 50-200 g ai/ha. In some embodiments, the application rate of the compound of formula I for controlling *Pyricularia oryzae* (blast) in rice as a foliar application is between 50-150 g ai/ha.

In some embodiments, the application rate of the compound of formula I for controlling *Venturia inaequalis* (apple scab) in fruits like apple as a foliar application is between 75-200 g ai/ha.

In some embodiments, the application rate of the compound of formula I for controlling *Podosphaera leucotricha* (powdery mildew) in fruits like apple as a foliar application is between 75-200 g ai/ha. In some embodiments, the application rate of the compound of formula I for controlling *Podosphaera leucotricha* (powdery mildew) in fruits like apple as a foliar application is between 75-150 g ai/ha.

In some embodiments, the application rate of the compound of formula I for controlling *Botrytis cinerea* in fruit plant as a foliar application is between 150-500 g ai/ha. In some embodiments, the application rate of the compound of formula I for controlling *Botrytis cinerea* in fruit plant as a foliar application is between 150-350 g ai/ha. In some embodiments, the application rate of the compound of formula I for controlling *Botrytis cinerea* in strawberry as a foliar application is between 150-500 g ai/ha. In some embodiments, the application rate of the compound of formula I for controlling *Botrytis cinerea* in strawberry as a foliar application is between 150-350 g ai/ha.

In some embodiments, the application rate of the compound of formula I for controlling *Sphaerotheca fuliginea* (powdery mildew) in vegetable plant as a foliar application is between 75-200 g ai/ha. In some embodiments, the application rate of the compound of formula I for controlling *Sphaerotheca fuliginea* (powdery mildew) in vegetable plant as a foliar application is between 75-150 g ai/ha. In some embodiments, the application rate of the compound of formula I for controlling *Sphaerotheca fuliginea* (powdery mildew) in zucchini as a foliar application is between 75-200 g ai/ha. In some embodiments, the application rate of the compound of formula I for controlling *Sphaerotheca fuliginea* (powdery mildew) in zucchini as a foliar application is between 75-150 g ai/ha.

In some embodiments, the application rate of the compound of formula I for controlling *Podosphaera fuliginea* (powdery mildew) in vegetable plant as a foliar application is between 75-200 g ai/ha. In some embodiments, the application rate of the compound of formula I for controlling *Podosphaera fuliginea* (powdery mildew) in vegetable plant as a foliar application is between 75-150 g ai/ha. In some embodiments, the application rate of the compound of formula I for controlling *Podosphaera fuliginea* (powdery mildew) in zucchini as a foliar application is between 75-200 g ai/ha. In some embodiments, the application rate of the compound of formula I for controlling *Podosphaera fuliginea* (powdery mildew) in zucchini as a foliar application is between 100-200 g ai/ha.

In some embodiments, the application rate of the compound of formula I for controlling *Pseudoperonospora cubensis* (downy mildew) in vegetable plant as a foliar application is between 75-200 g ai/ha. In some embodiments, the application rate of the compound of formula I for controlling *Pseudoperonospora cubensis* (downy mildew) in vegetable plant as a foliar application is between 75-150 g ai/ha. In some embodiments, the application rate of the compound of formula I for controlling *Pseudoperonospora cubensis* (downy mildew) in cucumber as a foliar application is between 75-200 g ai/ha. In some embodiments, the application rate of the compound of formula I for controlling *Pseudoperonospora cubensis* (downy mildew) in cucumber as a foliar application is between 75-150 g ai/ha.

In some embodiments, the application rate of the compound of formula I for controlling *Alternaria solani* in vegetable plant as a foliar application is between 75-200 g ai/ha. In some embodiments, the application rate of the compound of formula I for controlling *Alternaria solani* in vegetable plant as a foliar application is between 75-150 g ai/ha. In some embodiments, the application rate of the compound of formula I for controlling *Alternaria solani* in vegetable plant as a foliar application is between 100-150 g ai/ha. In some embodiments, the application rate of the compound of formula I for controlling *Alternaria solani* (early blight) in potato as a foliar application is between 75-200 g ai/ha. In some embodiments, the application rate of the compound of formula I for controlling *Alternaria solani* (early blight) in potato as a foliar application is between 75-150 g ai/ha. In some embodiments, the application rate of the compound of formula I for controlling *Alternaria solani* (early blight) in potato as a foliar application is between 100-150 g ai/ha. In some embodiments, the application rate of the compound of formula I for controlling *Alternaria solani* in potato as a foliar application is between 175 g ai/ha to 200 g ai/ha. In some embodiments, the application rate of the compound of formula I for controlling *Alternaria solani* in potato as a foliar application is about 175 g ai/ha or about 200 g ai/ha. In some embodiments, the application rate of the compound of formula I for controlling *Alternaria solani* in potato as a foliar application is about 100 g ai/ha, 125 g ai/ha, or 150 g ai/ha.

In some embodiments, the application rate of the compound of formula I for controlling *Cercospora beticola* in sugar beet as a foliar application is between 50-150 g ai/ha. In some embodiments, the application rate of the compound of formula I for controlling *Cercospora beticola* in sugar beet as a foliar application is between 75-150 g ai/ha. In some embodiments, the application rate of the compound of formula I for controlling *Cercospora beticola* in sugar beet as a foliar application is about 125 g ai/ha.

In some embodiments, the application rate of the compound of formula I for controlling *Ramularia beticola* in sugar beet as a foliar application is between 50-150 g ai/ha. In some embodiments, the application rate of the compound of formula I for controlling *Ramularia beticola* in sugar beet as a foliar application is between 125-150 g ai/ha.

In some embodiments, the application rate of the compound of formula I for controlling *Erysiphe betae* (powdery mildew) in sugar beet as a foliar application is between 50-150 g ai/ha.

In some embodiments, the application rate of the compound of formula I for controlling *Phakopsora pachyrhizi* (Asian soybean rust) in soybean as a foliar application is between 50-200 g ai/ha.

In some embodiments, the application rate of the compound of formula I for controlling *Microsphaera diffusa* (powdery mildew) in soybean as a foliar application is between 50-200 g ai/ha.

In some embodiments, the application rate of the compound of formula I for controlling *Cercospora kikushi* in soybean as a foliar application is between 50-200 g ai/ha. In some embodiments, the application rate of the compound of formula I for controlling a late season disease in soybean as a foliar application is between 50-200 g ai/ha.

In some embodiments, the application rate of the compound of formula I for controlling *Corynespora cassilcola* in soybean as a foliar application is between 50-200 g ai/ha.

In some embodiments, the application rate of the compound of formula I for controlling *Colletotrichum dematium* in soybean as a foliar application is between 50-200 g ai/ha.

In some embodiments, the application rate of the compound of formula I for controlling *Mycosphaerella areola* in cotton as a foliar application is between 50-200 g ai/ha.

In some embodiments, the application rate of the compound of formula I for controlling *Ramularia areola* in cotton as a foliar application is between 50-200 g ai/ha.

In some embodiments, the application rate of the compound of formula I for controlling *Colletotrichum dematium* (anthracnose) in vegetable plant as a foliar application is between 50-200 g ai/ha. In some embodiments, the application rate of the compound of formula I for controlling *Colletotrichum dematium* (anthracnose) in chili as a foliar application is between 50-200 g ai/ha.

In some embodiments, the application rate of the compound of formula I for controlling *Colletotrichum capsici* in chili as a foliar application is between 150-250 g ai/ha. In some embodiments, the application rate of the compound of formula I for controlling *Colletotrichum capsici* in chili as a foliar application is about 200 g ai/ha.

In some embodiments, the application rate of the compound of formula I for controlling *Plasmopara viticola* (downy mildew) in grapevine as a foliar application is between 50-200 g ai/ha. The usual rate is between 75-100 g ai/ha.

In some embodiments, the application rate of the compound of formula I for controlling *Mycosphaerella fijiensis* (black sigatoka) in fruits like banana as a foliar application is between 50-200 g ai/ha.

In some embodiments, the application rate of the compound of formula I for controlling *Phytophtora infestans* in potato as a foliar application is between 100 g ai/ha to 200 g ai/ha. embodiments, the application rate of the compound of formula I for controlling *Phytophtora infestans* in potato is about 150 g ai/ha.

In some embodiments, the compound of formula I is applied by contacting the plant or a locus thereof with an effective amount of a compound of Formula I.

In some embodiments, the compound of formula I is applied to root of the plant. In some embodiments, the compound of formula I is applied to foliage of the plant.

In some embodiments, the compound of formula I is applied to seed. In some embodiments, the compound of formula I is applied to seedling.

In some embodiments, the compound of formula I is applied to soil. In some embodiments, the compound of formula I is applied to a locus of the fungus. In some embodiments, the compound of formula I is applied to a locus in which the fungal infection and/or fungal disease is to be prevented.

In some embodiments, the compound of Formula I is applied to a portion of a plant, an area adjacent to a plant, soil in contact with a plant, soil adjacent to a plant, any surface adjacent to a plant, any surface in contact with a plant, a seed, and/or equipment used in agriculture. In some embodiments, the compound of Formula I is applied to a locus of the plant, a locus in proximity to the plant, a locus of the fungi, or a locus in proximity to the fungi. In some embodiments, the compound of Formula I is applied to soil in which the plant is grown. In some embodiments, the compound of Formula I is applied to soil in which the plant is to be grown.

In some embodiments, the compound of Formula I is applied at the time of planting.

In some embodiments, the compound of Formula I is applied 1 to 60 day(s) after planting.

In some embodiments, the compound of Formula I is applied 1 to 9 month(s) after planting.

In some embodiments, the compound of Formula I is applied once during a growth season.

In some embodiments, the compound of Formula I is applied at least one time during a growth season.

In some embodiments, the compound of Formula I is applied two or more times during a growth season.

In some embodiments, the compound of Formula I is applied as a soil application. In some embodiments, the compound of Formula I is applied as a foliar application.

In some embodiments, the method comprises a protectant application of the compound of Formula I. In some embodiments, the method comprises a curative application of the compound of Formula I.

In some embodiments, the method comprises applying the compound of Formula I before fungal disease symptoms are shown.

In some embodiments, the method comprises applying the compound of Formula I when disease pressure is low.

In some embodiments, the method comprises applying the compound of Formula I after existence of a fungal pathogen infection.

In some embodiments, the method comprises applying the compound of Formula I after fungal disease symptoms are shown.

In some embodiments, the application rate of the compound of formula I is 150 g ai/ha or less.

In some embodiments, the application rate of the compound of formula I is 100 g ai/ha or less.

In some embodiments, the application rate of the compound of formula I is 100 g ai/ha or less, applied twice with a 7-day interval in between applications.

In some embodiments, the method is effective for reducing leaf necrosis. In some embodiments, leaf necrosis is reduced by at least 10%. In some embodiments, leaf necrosis is reduced by at least 25%. In some embodiments, leaf necrosis is reduced by at least 50%. In some embodiments, leaf necrosis is reduced by at least 75%.

In some embodiments, effectiveness of the method is evaluated at least one week after application of the compound of Formula I. In some embodiments, effectiveness of the method is evaluated at least two weeks after application of the compound of Formula I. In some embodiments, effectiveness of the method is evaluated at least three weeks after application of the compound of Formula I. In some embodiments, effectiveness of the method is evaluated at least four weeks after application of the compound of Formula I.

In some embodiments, an emulsifiable concentrate (EC) composition of the compound of formula I is applied. In some embodiments, an EC composition comprising 50 g/L of the compound of formula I is applied.

In some embodiments, a suspension concentrate (SC) composition of the compound of formula I is applied. In some embodiments, an SC composition comprising 500 g/L of the compound of formula I is applied.

In some embodiments, an oil dispersion (OD) composition of the compound of formula I is applied. In some embodiments, an OD composition comprising 250 g/L of the compound of formula I is applied.

Examples of EC, SC and OD compositions of the compound of formula I are described hereinbelow.

The present invention also provides a method for treating a seed or seedling against fungal pathogen infection and/or fungal disease comprising applying a compound of Formula I Formula I

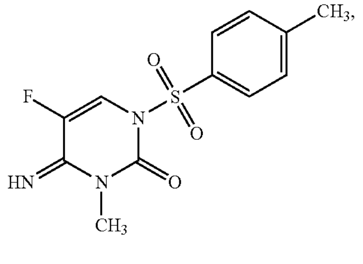

to the seed, seedling and/or a locus thereof so as to thereby treat the seed or seedling against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the seed or seedling is of a plant selected from the group consisting of soybean, rice, fruits, vegetables, sugar beet, rapeseed oil, grapevine, cotton and any combination thereof.

The present invention also provides a method of producing a plant resistant to fungal pathogen infection and/or fungal disease, the method comprising applying a compound of Formula I Formula I

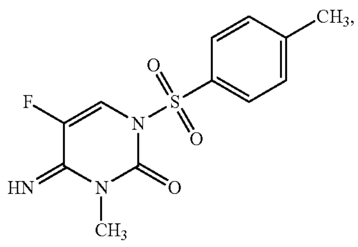

to the plant or a locus thereof so as to thereby produce a plant resistant to fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

In some embodiments, treating the plant or a locus thereof comprises treating the seed, the seedling, or a locus of the seed or seedling.

The present invention also provides a method of producing a plant resistant to fungal pathogen infection and/or fungal disease, the method comprising applying a compound of Formula I Formula I

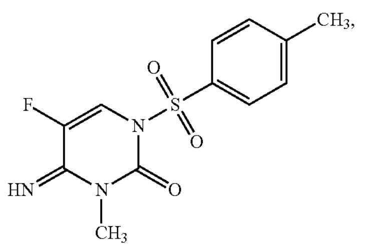

to a seed of the plant, a seedling of the plant, and/or a locus of the seed or seedling, so as to thereby produce a plant resistant to fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

The present invention also provides a plant resistant to fungal pathogen infection and/or fungal disease, wherein the seed adapted to produce the plant, the seedling adapted to produce the plant, or a locus of plant is treated with a compound of Formula I Formula I

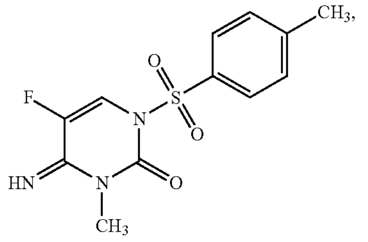

wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

The present invention also provides a plant seed or seedling adapted to produce a plant resistant to fungal pathogen infection and/or fungal disease, wherein the plant seed or seedling is treated with a compound of Formula I Formula I

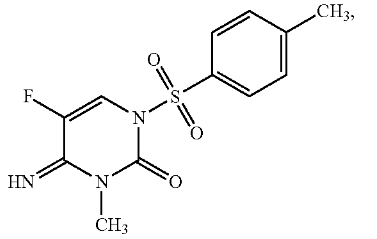

and wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

The present invention also provides use of a compound of Formula I

Formula I

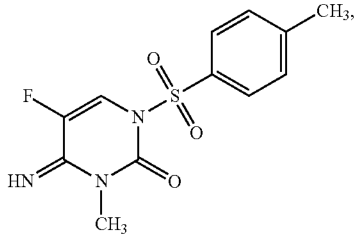

for treating a plant against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum*

*capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

The present invention also provides a composition comprising an amount of the compound of formula I for treating a plant against fungal pathogen infection and/or fungal disease, wherein:

(1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

The present invention provides a method for treating a plant against fungal pathogen infection and/or fungal disease comprising applying an amount of the compound of formula I Formula I

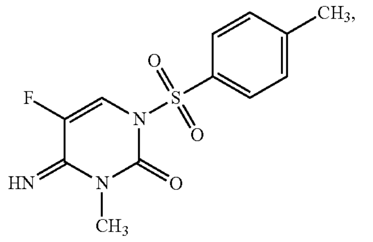

wherein the amount is effective to treat the plant against fungal pathogen infection and/fungal disease and has an ecologically acceptable effect on non-target organisms.

The present invention provides a method for treating a plant against fungal pathogen infection and/or fungal disease comprising applying an amount of the compound of formula I.

Formula I

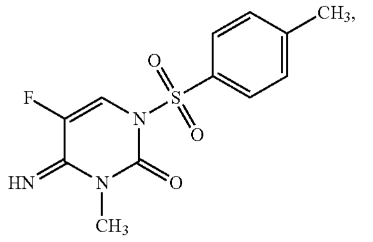

wherein the amount is less than 150 g ai/ha.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea, Colletotrichum* sp., *Colletotrichum truncatum, Puccinia recondite, Colletotrichum kahawae, Hemileia vastatrix, Ascochyta rabiei, Fusarium* sp., *Cercospora zeae-maydis, Setosphaeria turcica, Cochliobolus carbonum, Ramularia collo-cygni, Uromyces betae, Zymoseptoria tritici, Cochliobolus heterostrophus, Puccinia striiformis, Pseudocercospora musae*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice, brown rust, coffee berry disease, coffee leaf rust, Didymella pisi, Fusarium head blight, gray leaf spot, northern corn leaf blight, northern corn leaf spot, Ramularia leaf spot, rust, Septoria, southern corn leaf blight, yellow rust, yellow sigatoka, and any combination thereof, and/or (3) the plant is selected from the group consisting of soybean, rice, fruit plants, vegetable plants, sugar beet, rapeseed, grapevine, cotton, olive, pulses, cereals, coffee, corn, and any combination thereof.

In some embodiments, (1) the fungal pathogen is selected from the group consisting of *Pyricularia oryzae, Rhizoctonia solani, Sclerotinia sclerotium, Pseudoperonospora cubensis, Venturia inequalis, Podosphaera leucotricha, Botrytis cinerea, Sphaerotheca fuliginea, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Colletotrichum dematium, Cercospora kikushi, Plasmopara viticola, Mycosphaerella fijiensis, Phytophthora infestans, Colletotrichum capsica, Podosphaera fuliginea*, and any combination thereof, (2) the fungal disease is selected from the group consisting of blast, sheath blight, early blight, late blight, leaf blight, apple scab, black sigatoka, downy mildew, late season diseases of soybean, Asian soybean rust, anthracnose, powdery mildew, potato late blight, brown spot of rice and any combination thereof, and/or (3) the plant is selected from the group consisting of soybean, rice, fruit plants, vegetable plants, sugar beet, rapeseed, grapevine, cotton, olive and any combination thereof.

In some embodiments, (1) the fungal pathogen is selected from the group consisting of *Pyricularia oryzae, Rhizoctonia solani, sclerotinia sclerotium, Pseudoperonospora cubensis, Venturia inequalis, Podosphaera leucotricha, Botrytis cinerea, Sphaerotheca fuliginea, Pseudoperonospora cubensis, Alternaria solani, Cercospora beticola, Ramularia beticola, Ramularia areola, Erysiphe betae, Phakopsora pachyrhizi, Microsphaera diffusa, Mycosphaerella areola, Corynespora cassiicola, Col-*

*letotrichum dematium, Cercospora kikushi, Plasmopara viticola, Mycosphaerella fijiensis* and any combination thereof, (2) the fungal disease is selected from the group consisting of blast, sheath blight, early blight, apple scab, downy mildew, black sigatoka, downy mildew, late season diseases of soybean, Asian soybean rust, anthracnose, powdery mildew, and any combination thereof, and/or (3) the plant is selected from the group consisting of soybean, rice, fruit plants, vegetable plants, sugar beet, rapeseed, grapevine, cotton and any combination thereof.

In some embodiments, the amount has an ecologically acceptable effect on reproduction of the non-target organism.

Ecological effect may be assessed using the EU guidance documents, including but not limited to documents pertaining to use in wheat and barley such as EFSA (2009) Guidance on risk assessment for birds and mammals, EFSA Journal 2009; 7(12):1438, EFSA (2013) Guidance on tiered risk assessment for plant protection products for aquatic organisms in edge-of-field surface waters. EFSA Journal 2013; 11(7):3290, and SANCO (2002) Guidance Document on Terrestrial Ecotoxicology Under Council Directive 91/414/EEC, SANCO/10329/2002 rev 2 final, 17 Oct. 2002, each of which is hereby incorporated by reference in its entireties into this application.

In some embodiments, the amount has an ecologically acceptable effect on growth and/or development of the non-target organism.

In some embodiments, the amount has an ecologically acceptable acute effect on non-target organisms.

In some embodiments, the amount has an ecologically acceptable chronic effect on non-target organisms.

In some embodiments, the ecologically acceptable effect is less than 50% mortality of a non-target organism species. In some embodiments, the ecologically acceptable effect is less than 20% mortality of a non-target organism species. In some embodiments, the ecologically acceptable effect is less than 10% mortality of a non-target organism species.

In some embodiments, the non-target organism is birds. In some embodiments, the amount has an ecologically acceptable acute effect on the bird. In some embodiments, the amount has an ecologically acceptable effect on reproduction of the bird. In some embodiments, the bird is bobwhite quail. Bobwhite quail is used as the surrogate species for birds.

In some embodiments, the non-target organism is mammals. In some embodiments, the amount has an ecologically acceptable acute effect on the mammal. In some embodiments, the amount has an ecologically acceptable chronic effect on the mammal.

In some embodiments, the mammal is rat. In some embodiments, the mammal is rabbit. Rat and rabbit are used as the surrogate species for mammals.

In some embodiments, the non-target organism is fishes. In some embodiments, the amount has an ecologically acceptable acute effect on the fish. In some embodiments, the amount has an ecologically acceptable chronic effect on the fish. In some embodiments, the fish is rainbow trout. Rainbow trout is used as the surrogate species for fish.

In some embodiments, the non-target organism is aquatic invertebrates. In some embodiments, the amount has an ecologically acceptable acute effect on the aquatic invertebrate. In some embodiments, the amount has an ecologically acceptable chronic effect on the aquatic invertebrate. In some embodiments, the aquatic invertebrate is *Daphnia magna. Daphnia magna* is used as the surrogate species for aquatic invertebrates.

In some embodiments, the non-target organism is algae. In some embodiments, the amount has an ecologically acceptable chronic effect on the algae. In some embodiments, the algae is green algae. Green algae is used as the surrogate species for algae.

In some embodiments, the non-target organism is arthropods. In some embodiments, the amount has an ecologically acceptable acute oral effect on the arthropod. In some embodiments, the amount has an ecologically acceptable acute contact effect on the arthropod. In some embodiments, the amount has an ecologically acceptable chronic oral effect on the arthropod. In some embodiments, the amount has an ecologically acceptable chronic effect on larvae of the arthropod. In some embodiments, the amount has an ecologically acceptable effect on reproduction of the arthropod. In some embodiments, the arthropod is parasitoid wasp. In some embodiments, the arthropod is honeybee.

In some embodiments, the amount has an ecologically acceptable acute oral effect on honeybee. In some embodiments, the amount has an ecologically acceptable acute contact effect on honeybee. In some embodiments, the amount has an ecologically acceptable chronic oral effect on honeybee. In some embodiments, the amount has an ecologically acceptable chronic effect on larvae of honeybee. In some embodiments, the amount has an ecologically acceptable acute effect on colony survival of honeybee. In some embodiments, the amount has an ecologically acceptable chronic effect on colony survival of honeybee. In some embodiments, the amount has an ecologically acceptable acute effect on development of honeybee. In some embodiments, the amount has an ecologically acceptable chronic effect on development of honeybee.

In some embodiments, the ecologically acceptable effect is a less than 10% reduction of honeybee colony size. In some embodiments, the ecologically acceptable effect is a less than 7% reduction of honeybee colony size.

In some embodiments, the non-target organism is earthworms. In some embodiments, the amount has an ecologically acceptable chronic effect on the earthworm. In some embodiments, the earthworm is *Eisenia fetida.*

In some embodiments, the non-target organism is soil microbes. In some embodiments, the amount has an ecologically acceptable effect on nitrogen activity of soil microbes.

In some embodiments, the non-target organism is crops. In some embodiments, the amount has an ecologically acceptable effect on seedling emergence of the crop. In some embodiments, the amount has an ecologically acceptable effect on vegetative vigour of the crop. In some embodiments, the crop is sugar beet, oil seed rape, cucumber, carrot, soybean, sunflower, onion, common oat, ryegrass, or maize.

In some embodiments, an ecologically acceptable effect is substantially no observable effect. In some embodiments, an ecologically acceptable effect is no observable effect.

In some embodiments, the amount of the compound of formula I is 150 g ai/ha or less.

In some embodiments, the amount of the compound of formula I is 100 g ai/ha or less.

In some embodiments, the amount of the compound of formula I is 100 g ai/ha or less, applied twice with a 7-day interval in between applications.

The present invention also provides a mature plant resistant to fungal attack wherein the mature plant or a seed or seedling adapted to produce the mature plant is treated with an amount of the compound of formula I Formula I

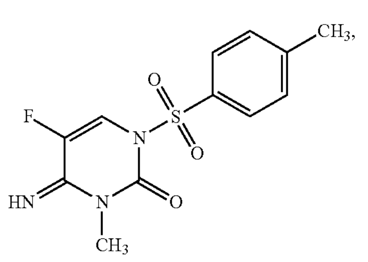

and wherein the treated mature plant has an ecologically acceptable effect on non-target organisms that contact the treated mature plant.

In some embodiments, the compound of formula I is formulated as a composition.

In some embodiments, the composition is an EC composition. In some embodiments, the composition is an SC composition. In some embodiments, the composition is an OD composition.

In some embodiments, the composition is for controlling fungal pathogen infection and/or fungal disease. In some embodiments, the composition is for controlling fungal disease caused by fungal pathogen.

In some embodiments, the composition is for preventing fungal pathogen infection and/or fungal disease.

In some embodiments, the composition is for protecting the plant from fungal pathogen infection and/or fungal disease.

In some embodiments, the fruit is apple. In some embodiments, the fruit is strawberry. In some embodiments, the fruit is banana.

In some embodiments, the vegetable is zucchini. In some embodiments, the vegetable is cucumber. In some embodiments, the vegetable is potato. In some embodiments, the vegetable is chili. In some embodiments, the vegetable is carrot.

In some embodiments, the composition comprises at least one stabilizing surfactant. In some embodiments, the composition comprises at least two stabilizing surfactants. In some embodiments, the composition comprises two stabilizing surfactants. In some embodiments, the composition comprises a stabilizing system.

In some embodiments, one of the stabilizing surfactants is a non-ionic stabilizing surfactant. In some embodiments, the non-ionic stabilizing surfactant is selected from the group consisting of polymers, ester of alkoxylated diethylethanolamine, poly alkylene oxide alcohol ether, and alcohols.

In some embodiments, the polymer is a block polymer of random polymer. In some embodiments, the polymer is a tri-block polymer. In some embodiments, the tri-block polymer is an ABA block polymer. In some embodiments, the polymer has a low HLB (hydrophile-lpophile balance) value, preferably an HLB value of 5. In some embodiments, the polymer is Atlox™ 4912 (manufactured and sold by Croda).

In some embodiments, the ester alkoxylated amine is Atlox™ 4915 alkoxylated diethylethanolamine, di-ethyl ethanol amine mono-trimerate, or Atlox™ 4915 (manufactured and sold by Croda).

In some embodiments, the alkoxylated fatty alcohol is Genapol X080 (manufactured and sold by Clariant), Genapol X 050 (manufactured and sold by Clariant), tridecyl alcohol polyglycol ether, Rhodasurf LA 30 (manufactured and sold by Solvay), Aerosol OT-SE or Aerosol OT-100 (manufactured and sold by Solvay), Rhodacal 70/B (manufactured and sold by Solvay), Arlatone TV (manufactured and sold by Croda), Alkamuls A (manufactured and sold by Solvay), or Alkamuls BR (manufactured and sold by Solvay).

In some embodiments, the alcohol has a short carbon chain of C1-C6. In some embodiments, the alcohol has a long carbon chain of C7-C20.

In some embodiments, the non-ionic stabilizing surfactant is a non-ionic derivative of polyalkylene oxide polyaryl ether.

In some embodiments, one of the stabilizing surfactants is an ionic surfactant. In some embodiments, the ionic stabilizing surfactant is an anionic stabilizing surfactant. Anionic stabilizing surfactant refers to compounds which have an anionic group such as phosphonic salt and sulfonic salt. An example of an ionic surfactant that may be used is sodium dioctyl sulfosuccinate which is manufactured and sold by Solvay as Aerosol® OT-SE.

In some embodiments, the anionic stabilizing surfactant is anionic derivative of polyalkylene oxide polyaryl ether.

In some embodiments, the composition comprises at least one non-ionic stabilizing surfactant and at least one anionic stabilizing surfactant. In some embodiments, the stabilizing system comprises at least one non-ionic stabilizing surfactant and at least one anionic stabilizing surfactant.

In some embodiments, the composition comprising a non-ionic stabilizing surfactant and an anionic stabilizing surfactant is a SC composition. In some embodiments, the combination, mixture or composition comprising a non-ionic stabilizing surfactant and an anionic stabilizing surfactant is a SE composition.

In some embodiments, one of the stabilizing surfactants is a derivative of polyalkylene oxide polyaryl ether. In some embodiments, the derivative of polyalkylene oxide polyaryl ether is a nonionic derivative of polyalkylene oxide polyaryl ether. In some embodiments, the derivative of polyalkylene oxide polyaryl ether surfactant is an anionic derivative of polyalkylene oxide polyaryl ether.

In some embodiments, the composition comprises at least two stabilizing surfactants. In some embodiments, the two stabilizing surfactants comprise two derivatives of polyalkylene oxide polyaryl ether. In some embodiments, the two stabilizing surfactants comprise a non-ionic derivative of polyalkylene oxide polyaryl ether and an anionic derivative of polyalkylene oxide polyaryl ether.

In some embodiments, the non-ionic derivative of polyalkylene oxide polyaryl ether is a compound having an aryl group substituted with at least two aromatic groups.

In some embodiments, the non-ionic derivative of polyalkylene oxide polyaryl ether has the following structure:

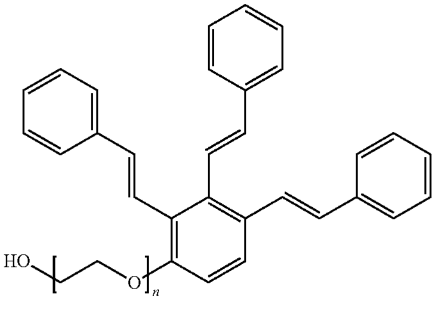
.

In some embodiments, the non-ionic derivative of polyalkylene oxide polyaryl ether has the following structure:

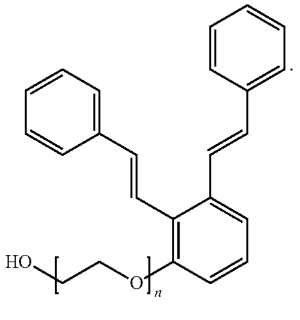

In some embodiments, the anionic derivative of polyalkylene oxide polyaryl ether is a compound having an aryl group substituted with at least two aromatic groups.

In some embodiment, the anionic group of the anionic derivative of polyalkylene oxide polyaryl ether has an anionic group selected from phosphate ($PO_4$), phosphonate ($PO_3$), sulfonate ($SO_3$), and sulfate ($SO_4$).

Polyalkylene oxides may include but are not limited to polyethylene oxide group, polypropylene oxide, polybutylene oxide and any combination thereof. In some embodiments, the polyalkylene oxide group is a polyethylene oxide. In some embodiments, the polyalkylene oxide group is a polypropylene oxide.

Polyalkylene oxides may include but are not limited to copolymers and homogenous polymers. Copolymers may include but are not limited to random polymer and block polymer. In some embodiments, the polyalkylene oxide group is a di block copolymer. In some embodiments, the polyalkylene oxide group is a tri block copolymer.

In some embodiments, the polyalkylene oxide polyaryl ether is a polyalkylene oxide styryl phenyl ether. In some embodiments, the polyalkylene oxide polyaryl ether is a polyalkylene oxide benzyl phenyl ether. In some embodiments, the polyalkylene oxide polyaryl ether is a polyalkylene oxide bisphenyl ether. In some embodiments, the polyalkylene oxide polyaryl ether is a polyalkylene oxide tristyryl phenyl ether. In some embodiments, the polyalkylene oxide polyaryl ether is a polyalkylene oxide distyryl phenyl ether. In some embodiments, the polyalkylene oxide distyryl phenyl ether is polyoxyethylene distyryl phenyl ether.

In some embodiments, the polyalkylene oxide polyaryl ether is an anionic stabilizing surfactant. Anionic stabilizing surfactant refers to compounds which have an anionic group such as phosphonic salt and sulfonic salt.

In some embodiments, the salt comprises a cation. In some embodiments, the cation is selected from a group consisting of sodium, potassium, ammonium, calcium, magnesium and combinations thereof.

In some embodiments, the anionic derivative of polyalkylene oxide polyaryl ether has the following structure:

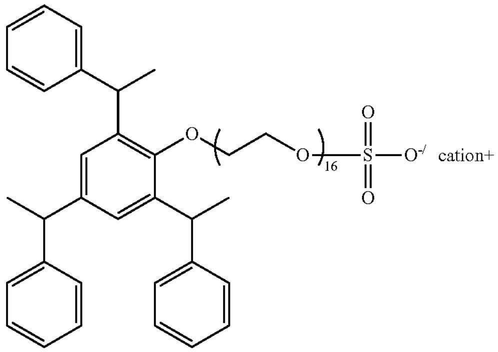

In some embodiments, the anionic derivative of polyalkylene oxide polyaryl ether is tristyrylphenol ethoxylate phosphate ester.

In some embodiments, the polyalkylene oxide polyaryl ether is tristyrylphenol ethoxylate phosphate ester. Preferably, the tristyrylphenol ethoxylate phosphate ester is Soprophor® 3D33 manufactured and sold by Solvay.

In some embodiments, the polyalkylene oxide polyaryl ether is 2,4,6-Tri-(1-phenylethyl)-phenol polyglycol ether with 54 EO. Preferably, the 2,4,6-Tri-(1-phenylethyl)-phenol polyglycol ether with 54 EO is Emulsogen® TS 540 manufactured and sold by Clariant.

In some embodiments, the polyalkylene oxide polyaryl ether is ethoxylated tristyrylphenol. Preferably, the ethoxylated tristyrylphenol is Soprophor® TS/54 manufactured and sold by Solvay.

In some embodiments, the salt comprising cation selected from the group consisting of sodium, potassium, ammonium, calcium, magnesium and combination thereof.

Polyalkylene oxide polyaryl ether surfactants may include but is not limited to poly phenyl ethyl phenol and tristyrylphenol.

Polyalkylene oxide polyaryl ethers surfactant may include but is not limited to non-capped surfactants, end-capped surfactants or combination thereof.

In some embodiments, the composition comprises a two or more stabilizing surfactants and the two stabilizing surfactants are a nonionic polyalkylene oxide polyaryl ether surfactant and an anionic polyalkylene oxide polyaryl ether surfactant. In some embodiments, the nonionic surfactant is tristyrylphenol ethoxylate. In some embodiments, the anionic surfactant is tristyrylphenol ethoxylate phosphate ether.

In some embodiments, the composition comprises tristyrylphenol ethoxylate and tristyrylphenol ethoxylate phosphate ether.

In some embodiments, the nonionic polyalkylene oxide polyaryl ether is a compound having an ether group substituted with at least two groups comprising aromatic rings.

In some embodiments, the polyalkylene oxide group is a polyoxyethylene. In some embodiments, the polyalkylene oxide group is a polyoxypropylene. In some embodiments, the polyalkylene oxide group is a block copolymer of polyoxyethylene. In some embodiments, the polyalkylene oxide group is a block copolymer of polyoxypropylene.

Polyalkylene oxides may include but are not limited to poly ethoxylated group, poly propoxylated group, poly butoxylated group and any combination thereof.

Polyalkylene oxides may include but are not limited to copolymers and homogenous polymers.

Copolymers may include but are not limited to random polymer and block polymer.

In some embodiments, the polyalkylene oxide polyaryl ether is a polyalkylene oxide tristyryl phenyl ether. In some embodiments the polyalkylene oxide tristyryl phenyl ether is polyoxyethylene tristyryl phenyl ether. In some embodiments, the polyalkylene oxide tristyryl phenyl ether is polyoxyethylene polyoxypropylene tristyryl phenyl ether.

In some embodiments, the polyalkylene oxide polyaryl ether is a polyalkylene oxide distyryl phenyl ether. In some embodiments, the polyalkylene oxide distyryl phenyl ether is polyoxyethylene distyryl phenyl ether.

In some embodiments, non-ionic derivative of a polyalkylene oxide polyaryl ether is tristyrylphenol ethoxylate phosphate ester.

In some embodiments, the stabilizing surfactant is a derivative of tristyryl phenol-polyethylene glycol ether.

In some embodiments, the stabilizing surfactant is an anionic derivative of tristyryl phenol-polyethylene glycol ether.

In some embodiments, the stabilizing surfactant is a non-ionic derivative of tristyryl phenol-polyethylene glycol ether.

In some embodiments, the composition comprises two stabilizing surfactants and the two stabilizing surfactants are Soprophor 3D33 and Soprophor TS/54 (TSP 54).

In some embodiments, the composition comprises two stabilizing surfactants and both stabilizing surfactants are derivatives of polyalkylene oxide polyaryl ether. In some embodiments, the combination, mixture or composition comprises two stabilizing surfactants wherein one stabilizing surfactant is a non-ionic derivative of polyalkylene oxide polyaryl ether and one stabilizing surfactant is an anionic derivative of polyalkylene oxide polyaryl ether.

In some embodiments, the composition comprises at least two stabilizing surfactants wherein at least one stabilizing surfactant is a non-ionic derivative of polyalkylene oxide polyaryl ether and at least one stabilizing surfactant is an anionic derivative of polyalkylene oxide polyaryl ether.

In some embodiments, the composition comprises two stabilizing surfactants wherein one stabilizing surfactant is a non-ionic derivative of polyalkylene oxide polyaryl ether and one stabilizing surfactant is an anionic derivative of polyalkylene oxide polyaryl ether.

In some embodiments, stabilizing surfactant is Soprophor 3D33.

In some embodiments, stabilizing surfactant is tristyrylphenol ethoxylate phosphate ester.

In some embodiments, the polyalkylene oxide polyaryl ether is Soprophor 3D 33 from Solvay.

In some embodiments, the polyalkylene oxide polyaryl ether is Emulsogen TS 540 from Clariant.

In some embodiments, the polyalkylene oxide polyaryl ether is SOPROPHOR TS/54 from Solvay.

In some embodiments, the salt comprising cation is selected from the group consisting of sodium, potassium ammonium, calcium, magnesium and combination thereof.

Polyaryl may refer to but is not limited to poly phenyl ethyl phenol and tristyrylphenol.

Polyalkylene oxide polyaryl ethers surfactant refer to non-capped surfactants, end-capped surfactants or combination thereof.

In some embodiments, the combination of surfactants comprises a mixture of a nonionic polyalkylene oxide polyaryl ether surfactant and an anionic polyalkylene oxide polyaryl ether surfactant. In some embodiments, the nonionic surfactant is tristyrylphenol ethoxylate. In some embodiments, the anionic surfactant is tristyrylphenol ethoxylate phosphate ether.

In some embodiments, the combination of surfactants comprises tristyrylphenol ethoxylate and tristyrylphenol ethoxylate phosphate ether.

In some embodiments, the nonionic polyalkylene oxide polyaryl ether is a compound having an ether group substituted with at least two groups comprising aromatic rings.

In some embodiments, the polyalkylene oxide group is a polyoxyethylene. In some embodiments, the polyalkylene oxide group is a polyoxypropylene. In some embodiments, the polyalkylene oxide group is a block copolymer of polyoxyethylene. In some embodiments, the polyalkylene oxide group is a block copolymer of polyoxypropylene.

Polyalkylene oxides may include but are not limited to poly ethoxylated group, poly propoxylated group, poly butoxylated group and any combination thereof.

Polyalkylene oxides may include but ae not limited to copolymers and homogenous polymers.

Copolymers may include but are not limited to random polymer and block polymer.

In some embodiments, the polyalkylene oxide polyaryl ether is a polyalkylene oxide tristyryl phenyl ether. In some embodiments the polyalkylene oxide tristyryl phenyl ether is polyoxyethylene tristyryl phenyl ether. In some embodiments, the polyalkylene oxide tristyryl phenyl ether is polyoxyethylene polyoxypropylene tristyryl phenyl ether.

In some embodiments, the polyalkylene oxide polyaryl ether is a polyalkylene oxide distyryl phenyl ether. In some embodiments, the polyalkylene oxide distyryl phenyl ether is polyoxyethylene distyryl phenyl ether.

In some embodiments, nonionic derivative of a polyalkylene oxide polyaryl ether is tristyrylphenol ethoxylate phosphate ester In some embodiments, stabilizing surfactant is Emulsogen TS 540.

In some embodiments, nonionic derivative of surfactant is Emulsogen TS 540 In some embodiments, stabilizing surfactant is Soprophor TS/54.

In some embodiments, nonionic derivative of a polyalkylene oxide polyaryl ether is Soprophor TS/54

In some embodiments, stabilizing surfactant is anionic derivative of tristyryl phenol-polyethylene glycol ether.

In some embodiments, stabilizing surfactant is nonionic derivative of tristyryl phenol-polyethylene glycol ether.

In some embodiments, the composition comprises a stabilizing system.

In some embodiments, the weight ratio of the compound of Formula I to the non-ionic derivative of polyalkylene oxide polyaryl ether is from 25:1 to 10:1. In some embodiments, the weight ratio of the compound of Formula I to the anionic derivative of polyalkylene oxide polyaryl ether is from 25:1 to 10:1.

In some embodiments, the composition is free of phytologically acceptable adjuvant.

In some embodiments compound of formula I is applied without adjuvant(s).

In some embodiments, the composition further comprises a phytologically acceptable adjuvant.

In some embodiments, the compound of formula I is applied as combination with adjuvant(s).

In some embodiments the compound of formula I and adjuvant(s) are formulated as separated composition and applied in separate application such as simultaneous (such as tank mix) or contemporaneous application In some embodiments, the phytologically acceptable adjuvant is selected from the group consisting of:

(i) polyalkylene oxide alkyl ether;

(ii) siloxane polyalkyleneoxide copolymer;

(iii) esters of fatty acid;

(iv) vinylpyrrolidones and derivatives thereof; and (v) sugar-based surfactants.

In some embodiments, the polyalkylene oxide alkyl ether is poly alkoxylated alcohol.

In some embodiments, the alkyl of the polyalkylene oxide alkyl ether comprises, but is not limited to, carbohydrate chain comprising C1-C26.

In some embodiments, the alcohol of the poly alkoxylated alcohol comprises, but is not limited to, carbohydrate chain of C1-C26.

In some embodiments, the alkyl of the polyalkylene oxide alkyl ethers comprises, but is not limited to, short carbohydrate chain and long carbohydrate chain.

Carbohydrate chains may refer, but are not limited, to saturated, unsaturated, branched and unbranched chains.

In some embodiments, short chain refers to C1-C8. In some embodiments, long chain refers to C9-C26.

In some embodiments, the polyalkylene oxide refers but is not limited to polyethylene oxide, polypropylene oxide, polybutylene oxide or combinations thereof.

In some embodiments, the polyalkylene oxide includes but is not limited to copolymers. Copolymer refers to block co-polymers, such as polyethylene oxide-polypropylene oxide, and/or random co-polymers, such as ethylene oxide-propylene oxide. In some embodiments, the polyallylene oxide block copolymer is di block copolymer. In some embodiments, the polyalkylene oxide block copolymer is tri block copolymer.

In some embodiments, the tri block copolymer is polyethylene oxide/polypropylene oxide/polyethylene oxide.

In some embodiments, the polyallcylene oxide alkyl ether is alkyl end capped. In some embodiments, the alkyl includes but is not limited to short carbohydrate chain and long carbohydrate chain. Carbohydrate chains may refer but are not limited to saturated, unsaturated, branched and unbranched chains. In some embodiments, short chain refers to C1-C8.

In some embodiments, polyalkylene oxide alkyl ether is isotridecyl alcohol polyglycol ether.

In some embodiments, the polyalkylene oxide alkyl ether is C16-C18 alcohol ethoxylate propoxylate ether.

In some embodiments, the C16-C18 alcohol ethoxylate propoxylate ether is Ethylan 995 manufactured and sold by Akzo Nobel Agrochemicals. In some embodiments, the C16-C18 alcohol ethoxylate propoxylate ether is Agnique® BP420 manufactured and sold by BASF.

In some embodiments, the polyalkylene oxide alkyl ether is ethoxylate propoxylate alcohol.

In some embodiments, the ethoxylate propoxylate alcohol is Synperonic 13/9 manufactured and sold by Croda. In some embodiments, the ethoxylate propoxylate alcohol is Atplus PFA manufactured and sold by Croda.

In some embodiments, the polyalkylene oxide alkyl ether is iso-tridecyl alcohol polyglycol ether.

In some embodiments, the iso-tridecyl alcohol polyglycol ether is Genapol X80 manufactured and sold by Clariant. In some embodiments, the iso-tridecyl alcohol polyglycol ether is Trycol® manufactured and sold by BASF.

In some embodiments, the polyalkylene oxide alkyl ether is effective for reducing surface tension of the composition and improving spreading of the compound of Formula I on plant leaf. Reducing the surface tension leads to reduced drifting from the leaf.

In some embodiments, the siloxane polyalkylene oxide copolymer refers to organo modified trisiloxane.

In some embodiments, the siloxane polyalkylene oxide copolymer is Break Thru S233 from Evonik. In some embodiments, Siloxane polyalkylene oxide copolymer is Silwett 077 from Momentive.

In some embodiments, the siloxane polyalkylene oxide copolymer is effective for reducing surface tension of the combination, mixture or composition. Silicone surfactant was found efficient agent for reducing surface tension and rapidly spread on of the composition over lipophilic-surfaces.

In some embodiments, the ester of fatty acid may include but is not limited to alkyl ester of fatty acid and plant oil.

In some embodiments, the alky ester comprising carbohydrate chain comprising C10-C20.

In some embodiments, the alkyl includes but is not limited to short carbohydrate chain Carbohydrate chains may refer but are not limited to saturated, unsaturated, branched and unbranched chains.

In some embodiments, short chain refers to C1-C8. In some embodiments, fatty acid alkyl ester is Rhodaphac PA/23 from Solvay (phosphate ester of ethoxylated fatty alcohol) or Alkamuls VO/2003 (ethoxylated (18EO) fatty acid) from Solvay.

In some embodiments, the adjuvant is tridecyl alcohol ethoxylated or polyoxyethylene (9) isotridecanol.

In some embodiments, plant oil includes but is not limited to vegetable oil and derivatives thereof.

In some embodiments, vegetable oil includes but is not limited to seed oil, coconut oil, rape seed oil, castor oil, soybean oil, palm oil and corn oil.

In some embodiments, derivative of vegetable oil refers to alkyl ester, poly alkylene oxide.

Polyalkylene oxide refers to polyethylene oxide, polypropylene oxide, polybutylene oxide and combination thereof.

In some embodiments, vegetable oil and derivatives thereof include but is not limited to rapeseed oil methylated ester and coconut fatty acid ester of polyglycerol ether.

In some embodiments, the adjuvant is a mixture of methylated seed oil and polyglycerol ester.

In some embodiments, the rapeseed oil methylated ester is Agnique ME 18 RDF manufactured and sold by BASF.

In some embodiments, the polyalkylene oxide derivative of vegetable oil is coconut fatty acid ester of polyglycerol ether.

In some embodiments, the coconut fatty acid ester of polyglycerol ether is Synergen GL5 manufactured and sold by Clariant.

In some embodiments, the ester of fatty acid softens the leafs surface properties for better and efficient penetration of the compound of Formula I.

In some embodiments, the derivative of vinylpyrrolidones is a block copolymer of vinylpyrrolidone and vinyl acetate (VP/VA).

In some embodiments, the block copolymer of vinylpyrrolidone and vinyl acetate is Sokalan VA 64 P manufactured and sold by Ashland.

In some embodiments, the block copolymer of vinylpyrrolidone and vinyl acetate is Agrimer VA 6 manufactured and sold by Ashland.

In some embodiments, the vinylpyrrolidones (PVP) and derivatives thereof are effective for increasing adherence of the compound of Formula I to plant leaves, for improvement of adhesive and retention properties (e.g. for rain fastness).

Sugar-based surfactants may include but are not limited to sorbitan esters, sucrose esters, alkyl polyglycosides, and fatty acid glucamides.

In some embodiments, the sugar-based surfactant is alkyl or fatty acid derivative of glucamides.

In some embodiments, the sugar-based surfactant is alkylglucamides.

In some embodiments, the fatty acid glucamide is C8/C10 fatty acid glucose amide.

In some embodiments, the C8/C10 fatty acid glucose amide is synergen GA from Clariant.

In some embodiments, the sugar-based surfactant is sorbitan and derivatives thereof.

In some embodiments, the derivative of sorbitan is poly ethylene oxide derivative and fatty acid ester.

In some embodiments, the sorbitan is di or tri fatty acid ester. In some embodiments, the derivative of sorbitan is poly ethylene oxide derivative comprising 20 to 80 groups of ethylene oxide.

In some embodiments, the derivative of sorbitan is Tween 80.

In some embodiments, the sugar-based surfactant affects the leaf surface for improving the penetration of the compound of Formula I through the leaf surface.

In some embodiments, the composition comprises a multi adjuvants system. Multi adjuvants system refers to blend or any combination of adjuvants.

In some embodiments, the composition comprises at least two adjuvants. In some embodiments, the combination, mixture or composition comprises at least three adjuvants.

In some embodiments, blend of adjuvant includes but is not limited to combination of alkyl fatty acid ester and fatty alcohol alkoxyklate.

In some embodiments, to the combination of alkyl fatty acid ester and fatty alcohol alkoxylate is Synergen SOC manufactured and sold by Clariant.

In some embodiments, to the combination of alkyl fatty acid ester and fatty alcohol alkoxylate is FOP manufactured and sold by Clariant.

In some embodiments, a blend of adjuvant includes but is not limited to combination of plant oil and/or derivative thereof and sugar-based surfactant.

In some embodiments, the composition comprises a pH adjuster.

In some embodiments, the pH adjusters may include but are not limited to buffers, bases and/or acidifiers.

In some embodiments the pH adjuster is an acid. In some embodiments the pH adjuster is a base.

In some embodiments the pH adjuster is a mixture of at least one base and at least one acid.

In some embodiments, the pH adjuster is a buffer.

Buffers refer to combinations of acids and bases. Acids include but are not limited to organic and inorganic acids. Bases include but are not limited to organic and inorganic bases.

Organic acids may include but are not limited to citric acid, formic acid, acetic acid, propionic acid, butyric acid, oxalic acid, lactic acid, malic acid, and benzoic acid.

Inorganic acids may include but are not limited to hydrochloric acid, nitric acid, phosphoric acid, sulfuric acid and boric acid.

Organic bases may include but are not limited to primary and secondary amines, pyridines, imidazole and any combination thereof.

In some embodiments, the pH adjuster is potassium hydrogen phosphate.

In some embodiments, the pH adjuster is combination of disodium mono hydrogen phosphate and potassium hydrogen phosphate In some embodiments, the compound of formula I is combined with additional at least one additional fungicide.

In some embodiments, the compound of formula I and the additional fungicide(s) are applied simultaneously.

In some embodiments, the compound of formula I and the additional fungicide(s) are applied contemporaneously.

In some embodiments, the compound of formula I and the additional fungicide(s) are applied sequentially.

In some embodiments, the compound of formula I and the additional fungicide(s) are applied separately.

In some embodiments, the compound of formula I and the additional fungicide(s) re applied together.

In some embodiments, the compound of formula I and the additional fungicide(s) are applied together as a tank mix. In some embodiments, the compound of formula I and the additional fungicide(s) are formulated as a single composition. In some embodiments, the compound of formula I and the additional fungicide(s) are formulated as two or more separate compositions.

In some embodiments, the present invention further comprises at least one additional pesticide. In some embodiments, the pesticide is a fungicide, herbicide, insecticide, acaricides, or nematicide.

Additional fungicide can be but not limited to boscalid, isofetamid, azoxystrobin, prothioconazole, fluopyram, fluxapyroxad, fluazinam, folpet, fludioxonil, Revysol (mefentrifluconazole), prothioconazole, azoxystrobin, copper, captan, mancozeb, chlorothalonil, phosphonate, fosetyl, fluopicolide, ametoctradin, zoxamide, cyazofamid, amisulbrom, oxathiapiprolin, metalaxyl, propamocarb, cymoxanil, mandipropamid, dimethomorph fluazinam, bupirimate, triazole fungicide, strobilurin fungicide, sulphur, fenpropidin, quinoxyfen, SDHI fungicide and any combination thereof.

In some embodiments, the combination of the compound of formula I and the additional fungicide increases control of fungal disease. In some embodiments, the combination of the compound of formula I and the additional fungicide increases prevention of fungal disease. In some embodiments, the combination of the compound of formula I and the additional fungicide decreases time for effective control of fungal disease. In some embodiments, the combination of the compound of formula I and the additional fungicide decreases the amount of the fungicide(s) which is required for effective controlling fungal disease. In some embodiments, the combination of the compound of formula I and the additional fungicide extends the controlling effect of the individual fungicide in the mixture in terms of type of crop and disease. In some embodiments, the combination of the compound of formula I and the additional fungicide prolongs the time of controlling effect of the mixture compared to the individual fungicide in the mixture in terms of type of crop and disease. In some embodiments, the combination of the compound of formula I and the additional fungicide prolongs the time of controlling effect of the individual fungicide in the mixture in terms of type of crop and disease.

The present invention also provides a method of improving the ecological safety of a fungicide comprising applying the fungicide and a compound of Formula I Formula I

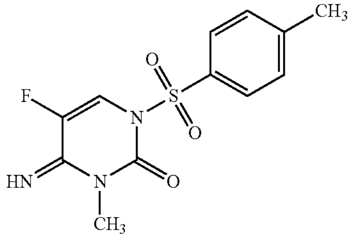

to the plant or locus, so as to reduce the amount of the fungicide necessary to achieve the same fungicidal effect thereby improving the ecological safety of the fungicide.

The fungicide applied with the compound of Formula I may be any one or any combination of the fungicide(s) disclosed herein.

In some embodiments, the compound of formula I is combined with an oil. In some embodiments, the oil is selected from the group consisting of tea tree oil, mineral oils, vegetable oils, and any combination thereof.

In some embodiments wherein the plant is oil seed rate (OSR), the compound of formula I is combined with at least one fungicide selected from the group consisting of boscalid, isofetamid, azoxystrobin, prothioconazole, fluopyram, fluxapyroxad, fluazinam, folpet, fludioxonil, and any combination thereof.

In some embodiments wherein the plant is sugar beet, the compound of formula I is combined with at least one fungicide selected from the group consisting of revysol, prothioconazole and a combination thereof.

In some embodiments wherein the plant is rice, the compound for formula I is combined with at least one fungicide selected from the group consisting of azoxystrobin, prothioconazole and a combination thereof.

In some embodiments wherein the pathogen is Oomycetes, the compound of formula I is combined with at least one fungicide selected from the group consisting of copper, folpet, captan, mancozeb, chlorothalonil, phosphonate, fosetyl, fluopicolide, ametoctradin, zoxamide, cyazofamid, amisulbrom, oxathiapiprolin, metalaxyl, propamocarb, cymoxanil, carboxylic acid amides, fluazinam, and any combination thereof. In some embodiments, the carboxylic acid amide is mandipropamid, dimethomorph or a combination thereof.

In some embodiments wherein the disease is powdery mildew, the compound of formula I is combined with at least one fungicide selected from the group consisting of bupirimate, triazole fungicide, strobilurin fungicide, sulphur, fenpropidin, quinoxyfen, succinate dehydrogenase inhibitor (SDHI) fungicide and any combination thereof.

In some embodiments wherein the disease is powdery mildew in vegetable and/or fruit plant, the compound of formula I is combined with at least one fungicide selected from the group consisting of bupirimate, triazole fungicide, strobilurin fungicide, sulphur, fenpropidin, quinoxyfen, SDHI fungicide and any combination thereof.

In some embodiments, the SDHI (succinate dehydrogenase inhibitors) fungicide may include but is not limited to fluxapyroxad, penflufen, bixafen, isopyrazam, sedaxane, benzovindiflupyr, thifluzamide, isofetamid, fluopyram, pydiflumetofen, pyraziflumid, flutolanil, carboxin, boscalid, fluindapyr, penthiopyrad, isoflucypram, inpyrfluxam, furametpyr, benodanil, mepronil, fenfuram, oxycarboxin, pyrapropoyne, flubeneteram, quinofumelin or any combination thereof.

In some embodiments the strobilurin fungicide may include but not limited to azoxystrobin, picoxystrobin, fluxastrobin, dimoxystrobin, pyraclostrobin, trifloxystrobin, coumoxystrobin, fenaminstrobin, pyrametostrobin, pyraoxystrobin, mandestrobin, oryzastrobin, enoxastrobin, pyraclostrobin, mandestrobin, fluoxastrobin, flufenoxystrobin, metominostrobin, pyriminostrobin; and any combination thereof.

In some embodiments, DMI-fungicides (DeMethylation Inhibitors) may include but is not limited to ipconazole, tebuconazole, metconazole, fenbuconazole, bromuconazole, tetraconazole, penconazole, difenoconazole, prothioconazole, epoxiconazole, mefentrifluconazole, triticonazole, imazalil, prochloraz, azaconazole, etaconazole, bitertanol, fluquinconazole, flusilazole, cyproconazole, triadimenol, hexaconazole, simeconazole, imibenconazole, diniconazole, pyrisoxazole or any combination thereof.

In some embodiments, the fungicide is a fungicidal sterol biosynthesis inhibitor.

In some embodiments, the sterol biosynthesis inhibitor is selected from the group consisting of prothioconazole, epoxiconazole, cyproconazole, myclobutanil, prochloraz, metconazole, difenoconazole, tebuconazole, tetraconazole, fenbuconazole, propiconazole, fluquinconazole, flusilazole, flutriafol, and fenpropimorph.

In some embodiments, the sterol biosynthesis inhibitor is selected from the group consisting of prothioconazole, epoxiconazole, metconazole, difenoconazole, propiconazole, prochloraz, tetraconazole, tebuconazole, fenpropimorph, fenpropidin, ipconazole, triticonazole, spiroxamine, fenhexamid, and fenpyrazamine.

In some embodiments, the sterol biosynthesis inhibitor is prothioconazole. In some embodiments, the sterol biosynthesis inhibitor is epoxiconazole. In some embodiments, the sterol biosynthesis inhibitor is cyproconazole. In some embodiments, the sterol biosynthesis inhibitor is myclobutanil. In some embodiments, the sterol biosynthesis inhibitor is metconazole. In some embodiments, the sterol biosynthesis inhibitor is difenoconazole. In some embodiments, the sterol biosynthesis inhibitor is propiconazole. In some embodiments, the sterol biosynthesis inhibitor is prochloraz. In some embodiments, the sterol biosynthesis inhibitor is tetraconazole. In some embodiments, the sterol biosynthesis inhibitor is tebuconazole. In some embodiments, the sterol biosynthesis inhibitor is fluquinconazole. In some embodiments, the sterol biosynthesis inhibitor is flusilazole. In some embodiments, the sterol biosynthesis inhibitor is flutriafol. In some embodiments, the sterol biosynthesis inhibitor is fenpropimorph. In some embodiments, the sterol biosynthesis inhibitor is fenpropidin. In some embodiments, the sterol biosynthesis inhibitor is ipconazole. In some embodiments, the sterol biosynthesis inhibitor is triticonazole. In some embodiments, the sterol biosynthesis inhibitor is spiroxamin. In some embodiments, the sterol biosynthesis inhibitor is fenhexamid. In some embodiments, the sterol biosynthesis inhibitor is fenpyrazamine. In some embodiments, the sterol biosynthesis inhibitor is fenbuconazole.

In some embodiments, the fungicide is a succinate dehydrogenase inhibitor.

In some embodiments, the succinate dehydrogenase inhibitor is selected from the group consisting of benzovindiflupyr, penthiopyrad, isopyrazam, fluxapyroxad, boscalid, fluopyram, bixafen, and penflufen.

In some embodiments, the succinate dehydrogenase inhibitor is benzovindiflupyr. In some embodiments, the succinate dehydrogenase inhibitor is penthiopyrad. In some embodiments, the succinate dehydrogenase inhibitor is isopyrazam. In some embodiments, the succinate dehydrogenase inhibitor is fluxapyroxad. In some embodiments, the succinate dehydrogenase inhibitor is boscalid. In some embodiments, the succinate dehydrogenase inhibitor is fluopyram. In some embodiments, the succinate dehydrogenase inhibitor is bixafen. In some embodiments, the succinate dehydrogenase inhibitor is penflufen.

In some embodiments, the fungicide is a strobilurin fungicide.

In some embodiments, the strobilurin fungicide is selected from the group consisting of azoxystrobin, pyraclostrobin, picoxystrobin, fluoxastrobin, trifloxystrobin, kresoxim-methyl, dimoxystrobin, and orysastrobin.

In some embodiments, the strobilurin fungicide is azoxystrobin. In some embodiments, the strobilurin fungicide is pyraclostrobin. In some embodiments, the strobilurin fungicide is picoxystrobin. In some embodiments, the strobilurin fungicide is fluoxastrobin. In some embodiments, the strobilurin fungicide is trifloxystrobin. In some embodiments, the strobilurin fungicide is kresoxim-methyl. In some embodiments, the strobilurin fungicide is dimoxystrobin. In some embodiments, the strobilurin fungicide is orysastrobin.

In some embodiments, the fungicide is a fungicidal multisite inhibitor.

In some embodiments, the fungicidal multisite inhibitor is selected from a group consisting of mancozeb, chlorothalonil, folpet, captan, metiram, maneb, propineb, copper hydroxide, copper octanoate, copper oxychloride, copper sulfate, copper sulfate (tribasic), mancopper, oxine-copper, copper bis(3-phenlsalicylate), copper zinc chromate, cuprous oxide, cupric hydrazinium sulfate, and cuprobam.

In some embodiments, the fungicidal multisite inhibitor is mancozeb. In some embodiments, the fungicidal multisite inhibitor is chlorothalonil. In some embodiments, the fungicidal multisite inhibitor is folpet. In some embodiments, the fungicidal multisite inhibitor is captan. In some embodiments, the fungicidal multisite inhibitor is metiram. In some embodiments, the fungicidal multisite inhibitor is maneb. In some embodiments, the fungicidal multisite inhibitor is propineb.

In some embodiments, the fungicidal multisite inhibitor is copper hydroxide, copper octanoate, copper oxychloride, copper sulfate, copper sulfate (tribasic), mancopper, oxine-copper, copper bis(3-phenlsalicylate), copper zinc chromate, cuprous oxide, cupric hydrazinium sulfate, or cuprobam.

In some embodiments, the fungicide is fluindapyr, pydiflumetofen, mefentrifluconazole, inpyrfluxam, isofetamid or Qi inhibitor.

In some embodiments, the Qi inhibitor is amisulbrom. In some embodiments, the Qi inhibitor is cyazofamid.

In some embodiments, the Qi inhibitor is a picolinamide. In some embodiments, the picolinamide is fenpicoxamid.

In some embodiments, the pesticide is selected from the group consisting of 2-(thiocyanatomethylthio)-benzothiazole, 2-phenylphenol, 8-hydroxyquinoline sulfate, ametoctradin, amisulbrom, antimycin, *Ampelomyces quisqualis*, azaconazole, azoxystrobin, *Bacillus subtilis, Bacillus subtilis* strain QST713, benalaxyl, benomyl, benthiavalicarb-isopropyl, benzylaminobenzene-sulfonate (BABS) salt, bicarbonates, biphenyl, bismerthiazol, bitertanol, bixafen, blasticidin-S, borax, Bordeaux mixture, boscalid, bromuconazole, bupirimate, calcium polysulfide, captafol, captan, carbendazim, carboxin, carpropamid, carvone, chlazafenone, chloroneb, chlorothalonil, chlozolinate, *Coniothyrium minitans*, copper hydroxide, copper octanoate, copper oxychloride, copper sulfate, copper sulfate (tribasic), cuprous oxide, cyazofamid, cyflufenamid, cymoxanil, cyproconazole, cyprodinil, dazomet, debacarb, diammonium ethylenebis-(dithiocarbamate), dichlofluanid, dichlorophen, diclocymet, diclomezine, dichloran, diethofencarb, difenoconazole, difenzoquat ion, diflumetorim, dimethomorph, dimoxystrobin, diniconazole, diniconazole-M, dinobuton, dinocap, diphenylamine, dithianon, dodemorph, dodemorph acetate, dodine, dodine free base, edifenphos, enestrobin, enestroburin, epoxiconazole, ethaboxam, ethoxyquin, etridiazole, famoxadone, fenamidone, fenarimol, fenbuconazole, fenfuram, fenhexamid, fenoxanil, fenpiclonil, fenpropidin, fenpropimorph, fenpyrazamine, fentin, fentin acetate, fentin hydroxide, ferbam, ferimzone, fluazinam, fludioxonil, flumorph, fluopicolide, fluopyram, fluoroimide, fluoxastrobin, fluquinconazole, flusilazole, flusulfamide, flutianil, flutolanil, flutriafol, fluxapyroxad, folpet, formaldehyde, fosetyl, fosetyl-aluminum, fuberidazole, furalaxyl, furametpyr, guazatine, guazatine acetates, GY-81, hexachlorobenzene, hexaconazole, hymexazol, imazalil, imazalil sulfate, imibenconazole, iminoctadine, iminoctadine triacetate, iminoctadine tris(albesilate), iodocarb, ipconazole, ipfenpyrazolone, iprobenfos, iprodione, iprovalicarb, isoprothiolane, isopyrazam, isotianil, kasugamycin, kasugamycin hydrochloride hydrate, kresoxium-methyl, laminarin, mancopper, mancozeb, mandipropamid, maneb, mefenoxam, mepanipyrim, mepronil, meptyl-dinocap, mercuric chloride, mercuric oxide, mercurous chloride, metalaxyl, metalaxyl-M, metam, metam-ammonium, metam-potassium, metam-sodium, metconazole, methasulfocarb, methyl iodide, methyl isothiocyanate, metiram, metominostrobin, metrafenone, mildiomycin, myclobutanil, nabam, nitrothal-isopropyl, nuarimol, octhilinone, ofurace, oleic acid (fatty acids), orysastrobin, oxadixyl, oxine-copper, oxpoconazole fumarate, oxycarboxin, pefurazoate, penconazole, pencycuron, penflufen, pentachlorophenol, pentachlorophenyl laurate, penthiopyrad, phenylmercury acetate, phosphonic acid, phthalide, picoxystrobin, polyoxin B, polyoxins, polyoxorim, potassium bicarbonate, potassium hydroxyquinoline sulfate, probenazole, prochloraz, procymidone, propamocarb, propamocarb hydrochloride, propiconazole, propineb, proquinazid, prothioconazole, pyraclostrobin, pyrametostrobin, pyraoxystrobin, pyrazophos, pyribencarb, pyributicarb, pyrifenox, pyrimethanil, pyriofenone, pyroquilon, quinoclamine, quinoxyfen, quintozene, *Reynoutria sachalinensis* extract, sedaxane, silthiofam, simeconazole, sodium 2-phenylphenoxide, sodium bicarbonate, sodium pentachlorophenoxide, spiroxamine, sulfur, SYP-Z048, tar oils, tebuconazole, tebufloquin, tecnazene, tetraconazole, thiabendazole, thifluzamide, thiophanate-methyl, thiram, tiadinil, tolclofos-methyl, tolylfluanid, triadimefon, triadimenol, triazoxide, tricyclazole, tridemorph, trifloxystrobin, triflumizole, triforine, triticonazole, validamycin, valifenalate, valiphenal, vinclozolin, zineb, ziram, zoxamide, *Candida oleophila, Fusarium oxysporum, Gliocladium* spp., *Phlebiopsis gigantea, Streptomyces griseoviridis, Trichoderma* spp., (RS)—N-(3,5-dichlorophenyl)-2-(methoxymethyl)-succinimide, 1,2-dichloropropane, 1,3-dichloro-1,1,3,3-tetrafluoroacetone hydrate, 1-chloro-2,4-dinitronaphthalene, 1-chloro-2-nitropropane, 2-(2-heptadecyl-2-imidazolin-1-yl)ethanol, 2,3-dihydro-5-phenyl-1,4-dithi-ine 1,1,4,4-tetraoxide, 2-methoxyethylmercury acetate, 2-methoxyethylmercury chloride, 2-methoxyethylmercury silicate, 3-(4-chlorophenyl)-5-methylrhodanine, 4-(2-nitroprop-1-enyl) phenyl thiocyanateme, ampropylfos, anilazine, azithiram, barium polysulfide, Bayer 32394, benodanil, benquinox, bentaluron, benzamacril, benzamacril-isobutyl, benzamorf, binapacryl, bis(methylmercury) sulfate, bis(tributyltin) oxide, buthiobate, cadmium calcium copper zinc chromate sulfate, carbamorph, CECA, chlobenthiazone, chloraniformethan, chlorfenazole, chlorquinox, climbazole, copper bis(3-phenylsalicylate), copper zinc chromate, cufraneb, cupric hydrazinium sulfate, cuprobam, cyclafuramid, cypendazole, cyprofuram, decafentin, dichlone, dichlozoline, diclobutrazol, dimethirimol, dinocton, dinosulfon, dinoterbon, dipyrithione, ditalimfos, dodicin, drazoxolon, EBP, ESBP, etaconazole, etem, ethirim, fenaminosulf, fenapanil, fenitropan, fluotrimazole, furcarbanil, furconazole, furconazole-cis, furmecyclox, furophanate, glyodine, griseofulvin, halacrinate, Hercules 3944, hexylthiofos, ICIA0858, isopamphos, isovaledione, mebenil, mecarbinzid, metazoxolon, methfuroxam, methylmercury dicyandiamide, metsulfovax, milneb, mucochloric anhydride, myclozolin, N-3, 5-dichlorophenyl-succinimide, N-3-nitrophenylitaconimide, natamycin, N-ethylmercurio-4-toluenesulfonanilide, nickel bis(dimethyldithiocarbamate), OCH, phenylmercury dimethyldithiocarbamate, phenylmercury nitrate, phosdiphen, prothiocarb, prothiocarb hydrochloride, pyracarbolid, pyridinitril, pyroxychlor, pyroxyfur, quinacetol, quinacetol sulfate, quinazamid, quinconazole, rabenzazole, salicylanilide, SSF-109, sultropen, tecoram, thiadifluor, thicyofen, thiochlorfenphim, thiophanate, thioquinox, tioxymid, triamiphos, triarimol, triazbutil, trichlamide, urbacid, zarilamid, and any combinations thereof.

In some embodiments, the pesticide is an insecticide. In some embodiments, the pesticide is an acaricides. In some embodiments, the pesticide is a nematicide. In some embodiments, the pesticide is an herbicide.

Examples of insecticides and acaricides may include, but are not limited to, abamectin, pyriproxyfen, acetamiprid, bifenthrin, cyfluthrin, pymetrozine, novaluron, ethiprole, fipronil, and lambda-cyhalothrin.

Examples of nematicide may include, but not limited to fluensulfone.

The present method and composition can be applied to fungi or their locus. Application may be made by the use of conventional ground sprayers, granule applicators, and by other conventional means known to those skilled in the art.

Each embodiment disclosed herein is contemplated as being applicable to each of the other disclosed embodiments. Thus, all combinations of the various elements described herein are within the scope of the invention. In addition, the elements recited in the combination embodiments can be used in the mixture, composition, method and use embodiments described herein and vice versa.

EXPERIMENTS

Materials

The compound for formula I is 5-fluoro-4-imino-3-methyl-1-tosyl-3,4-dihydropyrimidin-2(1H)-one. The compound of formula I is also known as ADF-16.

The 50 EC composition of the compound of formula I (i.e. ADF-16), as described in U.S. Provisional Application No. 63/024,031, is provided in Table 1 below.

TABLE 1

50 EC composition of the compound of formula I

| Ingredient | CAS No. | Chemical Name | % w/w |
|---|---|---|---|
| compound of Formula I (ADF-16) | N/A | | 4.739336493 |
| Agnique BP 420 | 68002-96-0 | | 7.109004739 |
| Soprophor TS/16 | 104376-75-2 (99734-09-5) | "Poly(oxy-1,2-ethanediyl), .alpha.-phenyl-.omega.-hydroxy-, styrenated (tristyrylphenol ethoxylate)" | 23.22274882 |
| Synergen SOC | Proprietary | Fatty alcohol alkoxylate blend in propylene glycol | 3.791469194 |
| Acetophenone 99% | 98-86-2 | acetophenone | 61.13744076 |

The 500 SC composition of the compound of formula I (i.e. ADF-16), as described in U.S. Provisional Application No. 63/024,031, is provided in Table 2 below.

TABLE 2

500 SC composition of the compound of formula I (i.e. ADM 00050 F 1 A)

| Ingredient | CAS No. | Chemical Name | % w/w |
|---|---|---|---|
| compound of Formula I (ADF-16) | N/A | | 41.66666667 |
| AG-RH 23 | 11138-66-2 | Xanthan Gum | 0.191666667 |
| Disodium Phosphate Anhydrous | 7558-79-4 | Disodium Phosphate Anhydrous | 0.583333333 |
| Emulsogen TS 540 | 104376-75-2 | Tristyryl phenol-polyethylene glycol ether | 1.416666667 |
| Potassium dihydrogene phosphate | 7778-77-0 | Potassium dihydrogene phosphate | 0.141666667 |
| Propylene glycol | 57-55-6 | 1,2 propanediol | 1.958333333 |
| Proxel GXL | (A)2634-33-5, | (A)1,2-Benzisothiazol- | 1.67E−02 |

TABLE 2-continued

| 500 SC composition of the compound of formula I (i.e. ADM 00050 F 1 A) | | | |
|---|---|---|---|
| Ingredient | CAS No. | Chemical Name | % w/w |
| | (B)1310-73-2 | 3(2H)-one, (B)Sodium hydroxide | |
| SAG 1572 | N/A | Polydimethylsiloxane emulsion | 1.5 |
| Silwet L-77 | (A)27306-78-1, (B)67674-67-3 | (A)Polyalkyleneoxide modified Heptamethyltrisiloxane, (B)Polyalkyleneoxide Modified Heptamethyltrisiloxane | 0.2 |
| Soprophor 3 D 33 | (A) 90093-37-1, (B)99734-09-5, (C)7664-38-2 | (A) 2,4,6-Tris(1-phenylethyl) polyoxyethylenated phosphates, (B)Poly(oxy-1,2-ethanediyl),.alpha.-[tris(1-phenylethyl)phenyl]-.omega.-hydroxy-, (C)orthophosphoric acid (POLYARYLPHENYL ETHER PHOSPHATE)" | 3.75 |
| Supragil WP | N/A | Reaction product of naphthalene, propan-2-ol, sulfonated and neutralized by caustic soda | 0.5 |
| water soft | 7732-18-5 | water | 48.575 |

The 250 OD composition of the compound of formula I (i.e. ADF-16) is provided in Table 3 below.

TABLE 3

| 250 OD composition of the compound of formula I | |
|---|---|
| Ingredient | % w/w |
| 5-fluoro-4-imino-3-methyl-1-tosyl-3,4-dihydropyrimidin-2(1H)-one | 25.00 |
| Agrimer ™ AL-22 | 3.00 |
| Atlox ® 4916 | 3.00 |
| Aerosol ® OT-SE | 6.00 |
| Synperonic ® PE/L 64 | 6.00 |
| Genapol ® X 050 | 3.00 |
| TEOS | 5.00 |
| Aerosil ® R202 | 2.60 |
| Agnique ® ME 18 RD-F | 46.40 |

Processing Details (1-Liter Batches):

1. Tetraethyl orthosilicate (TEOS) is added to Agnique® ME 18 RD-F and is mixed with a high shear mixer for 5 mins.
2. Aerosil® is added whilst shearing and is mixed until fully dispersed (approximately 5 mins).
3. Agrimer™ AL-22, Atlox® 4916, Aerosol® OT-SE, Synperonic® PE/L 64 and Genapol® X 050 are added and are mixed until homogenous (approximately 5-10 mins).
4. The compound of Formula I is added slowly whilst shearing and is mixed for 15 mins.

The resulting batch is milled in Eiger mini motor mill for 15 mins at 4500 rpm (75% 0.75-1.0 mm glass-bead charge). D(50) is approximately 2-3 μm.

Example 1. Control of *Sclerotinia* in Soybean as Seed Treatment

Disinfected seed surface of the soybean cultivar RAS 04 from RAGT were treated with the laboratory seed dressing equipment called Bol Hégé with the following products:

ADM 00050 F 1 A (compound of formula I 500 SC) at 0.002-0.005-0.01-0.02 and 0.05 L/100 Kg seeds (1-2.5-5-10-25 g ai/100 Kg seeds), without coating agent.

Vibrance duo (25+25 g ai/L of Fludioxonil and Sedaxane SC) at 0.2 L/100 Kg seeds, corresponding to 5+5 g ai/100 Kg seeds of Fludioxonil and Sedaxane Santhal (465 g ai/L of Metalaxyl-M (Mefenoxam) EC) at 0.064 L/100 Kg seeds (3 g ai/100 Kg seeds of Metalaxyl-M=Mefenoxam) without coating agent Sterile distilled water Untreated Control, without coating agent Treated or untreated soybean seeds were allowed to dry under laminar flow for 24 h before sowing.

Plastic Box of 500 cc were filled with 250 ml extra fine (vermiculite up to 2 5 cm of the top 3 boxes per treatment. 50 ml of sterilized soybean seeds previously inoculated with *Sclerotinia sclerotiorum* (strain Sscl wt) grounded and mixed with XF vermiculite were spread over the 250 ml vermiculite. Same was done with the non-inoculated seeds serving as a reference for the germination test.

The inoculum was covered with 100 ml (1 cm) of XF vermiculite, and then 9 untreated or treated 9 soybean seeds were sown in each box. Seeds were covered with 150 ml (1.5 cm) of XF vermiculite. The substrate was moistened with 200 ml of tap water and then weekly once with tap water and once with a 0 5 g/l nutrients solution (Plant Prod, Ltd N P K 20 20 20 and micronutrients). The lid was punctured and then placed on each box for 5 days to maintain saturated humidity. Boxes were placed in a climatic chamber with a photoperiod of 16 h light/8 h darkness, 2424° C. day/1818° C. night and a relative humidity of 85.

Phytotoxicity assessments were carried out checking analyzing the following parameters:

a. Rate of emergence of soybean seedlings after 7 days post sowing dps.
b. General development (pictures) of the aerial part of the soybean plants after 3 weeks of incubation Results are shown in Table 4 and FIG. 1.

TABLE 4

Evaluation of the rate of soybean seedlings cv RAS 04 emergence of seeds untreated (or treated with ADM 00050 F 1 A at five rates, Vibrance Duo or Metalaxyl-M) at one rate each 7 days post sowing in controlled conditions.

| Treatment | Rate (g a.i./100 Kg seeds) | Seedling emergence rate (% of the total) |
|---|---|---|
| Untreated control | — | 85.2 +/− 3.7a[α] |
| ADM.00050.F.1.A | 1 | 77.8 +/− 6.4a |
| | 2.5 | 77.5 +/− 6.3a |
| | 5 | 77.8 +/− 6.4a |
| | 10 | 77.8 +/− 6.4a |
| | 25 | 81.5 +/− 9.8a |
| Vibrance duo | 5 + 5 | 81.5 +/− 9.8a |
| Metalaxyl-M | 3 | 77.8 +/− 6.4a |

[α]Each value corresponds to the mean of 3 replicates of 9 seeds +/− standard error. Values followed by the same letter are not statistically different according to the Fisher LSD test ($P < 0.05$).

It could be concluded that ADM 00050 F 1 A did not show any adverse effect on both emergence and subsequent development of soybean seedlings over a 3-week period of incubation in controlled conditions, at any dose tested (1-2.5-5-10 and 25 g ai/100 Kg), and that the results are in line with both reference seed treatment fungicides.

Disease assessments were carried out checking analyzing the following parameters:

a. Rate of emergence of soybean seedlings after 7 days post sowing dps.

b. Intensity of infections of the roots of soybean plants after 3 weeks of incubation Results are shown in Tables 5 and 6.

TABLE 5

Evaluation of the rate of seedling emergence of soybean seedlings cv RAS 04 7 days after sowing of seeds untreated (control) or treated with ADM 00050 F 1 A at three rates or Vibrance Duo at one rate in XF vermiculite inoculated with *Sclerotinia sclerotiorum* strain Sscl wt.

| Treatment | Rate (g a.i./ 100 Kg seeds) | Seedling emergence rate (% of the total) |
|---|---|---|
| Untreated and Not inoculated Control | — | 96.3 +/− 3.7a[α] |
| Untreated and Inoculated Control | | 51.9 +/− 9.8d |
| ADM.00050.F.1.A | 5 | 74.1 +/− 3.7c |
| | 10 | 77.8 +/− 6.4bc |
| | 25 | 92.6 +/− 3.7ab |
| Vibrance duo | 5 + 5 | 100.0 +/− 0.0a |

[α]Each value corresponds to the mean of 3 replicates of 12 seeds +/− standard error. Values followed by the same letter are not statistically different according to the Fisher LSD test ($P < 0.05$).

TABLE 6

Evaluation of the intensity of infection of the roots of soybean seedlings cv RAS 04 28 days after sowing of seeds untreated (control) or treated with ADM 00050 F 1 A at three rates or Vibrance Duo at one rate in XF vermiculite inoculated with *Sclerotinia sclerotiorum* strain Sscl wt.

| Treatment | Rate (g a.i./ 100 Kg seeds) | Intensity of infection (efficacy) |
|---|---|---|
| Untreated and Not Inoculated Control | — | 2.1% +/− 0.3c[α] |
| Untreated and Inoculated Control | — | 51.5% +/− 6.4a |
| ADM.00050.F.1.A | 5 | 13.9% +/− 2.3b (76.2%)[β] |
| | 10 | 7.6% +/− 2.7bc (88.9%) |
| | 25 | 2.3% +/− 0.2c (99.7%) |
| Vibrance duo | 5 + 5 | 2.1% +/− 0.4c (100.0%) |

[α]Each value corresponds to the mean of 3 replicates of 12 seeds +/− standard error. Values followed by the same letter are not statistically different according to the Fisher LSD test ($P < 0.05$).

[β]Value in blue between brackets correspond to the fungicide efficacy in percent of the untreated and inoculated control after subtracting the contamination rate of the uninoculated control.

It could therefore be concluded that ADM 00050 F 1 A exhibited a clear effects on the emergence rate of soybean seedlings compared to the untreated control inoculated with *Sclerotinia sclerotiorum* and that this product used without coating agent appeared highly efficient towards *Sclerotinia sclerotiorum*. Its activity was close to that of the reference fungicide, Vibrance Duo, at the highest rate of 25 g ai/100 Kg seeds.

Example 2. Control of *Rhizoctonia solani* in Soybean as Seed Treatment

Disinfected seed surface of the soybean cultivar RAS 04 from RAGT were treated with the laboratory seed dressing equipment called Bol Hégé with the following products:

ADM 00050 F 1 A (500 SC) at 0.002-0.005-0.01-0.02 and 0.05 L/100 Kg seeds (1-2.5-5-10-25 g ai/100 Kg seeds), without coating agent.

Vibrance duo (25+25 g ai/L of Fludioxonil and Sedaxane SC) at 0.2 L/100 Kg seeds, corresponding to 5+5 g ai/100 Kg seeds of Fludioxonil and Sedaxane Santhal (465 g ai/L of Metalaxyl-M (Mefenoxam) EC) at 0.064 L/100 Kg seeds (3 g ai/100 Kg seeds of Metalaxyl-M=Mefenoxam) without coating agent Sterile distilled water Untreated Control, without coating agent Treated or untreated soybean seeds were allowed to dry under laminar flow for 24 h before sowing.

Plastic Box of 500 cc were filled with 250 ml extra fine (vermiculite up to 2 5 cm of the top 3 boxes per treatment. 50 ml of sterilized soybean seeds previously inoculated with *Rhizoctonia solani* (strain RsolAG 2 2) grounded and mixed with XF vermiculite were spread over the 250 ml vermiculite. Same was done with the non-inoculated seeds serving as a reference for the germination test.

The inoculum was covered with 100 ml (1 cm) of XF vermiculite, and then 9 untreated or treated 9 soybean seeds were sown in each box. Seeds were covered with 150 ml (1.5 cm) of XF vermiculite. The substrate was moistened with 200 ml of tap water and then weekly once with tap water and once with a 0 5 g/l nutrients solution (Plant Prod, Ltd N P K 20 20 20 and micronutrients). The lid was punctured and then placed on each box for 5 days to maintain saturated humidity. Boxes were placed in a climatic chamber with a photoperiod of 16 h light/8 h darkness, 2424° C. day/1818° C. night and a relative humidity of 85.

Figure 2:
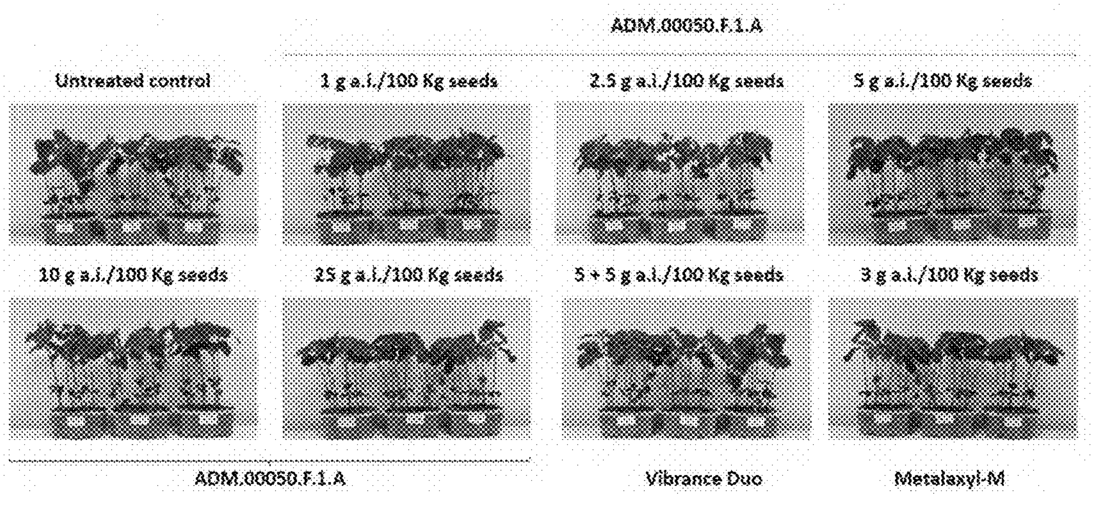
FIG. 2: Observation of the aerial part development of soybean plants from untreated seeds (control) or treated with ADM.00050.F.1.A at five rates, Vibrance Duo or Metalaxyl-M at one rate each after 3 weeks of incubation in controlled conditions.

Phytotoxicity assessments were carried out checking analyzing the following parameters:

c. Rate of emergence of soybean seedlings after 7 days post sowing dps.

d. General development (pictures) of the aerial part of the soybean plants after 3 weeks of incubation Results are shown in Table 7 and FIG. 2.

TABLE 7

Evaluation of the rate of soybean seedlings cv RAS 04 emergence of seeds untreated (or treated with ADM 00050 F 1 A at five rates, Vibrance Duo or Metalaxyl-M) at one rate each 7 days post sowing in controlled conditions.

| Treatment | Rate (g a.i./100 Kg seeds) | Seedling emergence rate (% of the total) |
|---|---|---|
| Untreated control | — | 85.2 +/− 3.7a[α] |
| ADM.00050.F.1.A | 1 | 77.8 +/− 6.4a |
| | 2.5 | 77.5 +/− 6.3a |
| | 5 | 77.8 +/− 6.4a |
| | 10 | 77.8 +/− 6.4a |
| | 25 | 81.5 +/− 9.8a |
| Vibrance duo | 5 + 5 | 81.5 +/− 9.8a |
| Metalaxyl-M | 3 | 77.8 +/− 6.4a |

[α]Each value corresponds to the mean of 3 replicates of 9 seeds +/− standard error. Values followed by the same letter are not statistically different according to the Fisher LSD test ($P < 0.05$).

It could be concluded that ADM 00050 F 1 A did not show any adverse effect on both emergence and subsequent development of soybean seedlings over a 3-weeks period of incubation in controlled conditions, at any dose tested (1-2.5-5-10 and 25 g ai/100 Kg), and that the results are in line with both reference seed treatment fungicides.

Disease assessments were carried out checking analyzing the following parameters:

a. Rate of emergence of soybean seedlings after 7 days post sowing dps.

b. Intensity of infections of the roots of soybean plants after 3 weeks of incubation Results are shown in Tables 8 and 9.

TABLE 8

Evaluation of the rate of seedling emergence of soybean seedlings cv RAS 04 7 days after sowing of seeds untreated (control) or treated with ADM 00050 F 1 A at three rates or Vibrance Duo at one rate in XF vermiculite inoculated with *R. solani* strain Rsol AG 2 2.

| Treatment | Rate (g a.i./100 Kg seeds) | Seedling emergence rate (% of the total) |
|---|---|---|
| Untreated and Noninoculated Control | — | 96.3 +/− 3.7a[α] |
| Untreated and Inoculated Control | | 100.0 +/− 0.0a |
| ADM.00050.F.1.A | 5 | 92.6 +/− 3.7a |
| | 10 | 96.3 +/− 2.5a |
| | 25 | 92.6 +/− 3.7a |
| Vibrance Duo | 5 + 5 | 92.6 +/− 3.7a |

[α]Each value corresponds to the mean of 3 replicates of 12 seeds +/− standard error. Values followed by the same letter are not statistically different according to the Fisher LSD test ($P < 0.05$).

TABLE 9

Evaluation of the intensity of infection of the roots of soybean seedlings cv RAS 04 28 days after sowing of seeds untreated (control) or treated with ADM 00050 F 1 A at three rates or Vibrance Duo at one rate in XF vermiculite inoculated with *R. solani* strain Rsol AG 2 2.

| Treatment | Rate (g a.i./100 Kg seeds) | Intensity of infection (%) | Efficacy |
|---|---|---|---|
| Untreated and Noninoculated Control | — | 0.0 +/− 0.0e[α] | — |
| Untreated and Inoculated Control | | 60.9 +/− 1.7a | — |
| ADM.00050.F.1.A | 5 | 47.0 +/− 2.8b | 22.8%[β] |
| | 10 | 33.7 +/− 1.4c | 44.8% |
| | 25 | 22.9 +/− 1.0d | 62.4% |
| Vibrance duo | 5 + 5 | 24.3 +/− 2.6d | 60.0% |

[α]Each value corresponds to the mean of 3 replicates of 12 seeds +/− standard error. Values followed by the same letter are not statistically different according to the Fisher LSD test ($P < 0.05$).

[β]Values in blue between brackets correspond to the fungicide efficacy in percent of the untreated and inoculated control.

It could therefore be concluded that ADM 00050 F 1 A used without coating agent exhibits a clear dose response effect towards *R. solani*. Its activity is comparable to that of the Reference fungicide, Vibrance Duo, at the highest rate of 25 g ai/100 Kg seeds.

Example 3. Control of *Rhizoctonia solani* (Sheath Blight) in Rice as Foliar Treatment The trial was carried out in the glasshouse at SAGEA's facility in Castagnito (Cuneo)—Piemonte region (Northern Italy) in order to evaluate the efficacy against *Rhizoctonia solani* and the selectivity on rice (Leonidas variety) of compound of formula I 250 OD, compound of formula I 500 SC and compound of formula I 50 EC at 150 g ai/ha in comparison to CUSTODIA (Azoxystrobin 11%+Tebuconazole 18.3% w/w SC) at 400 g ai/ha.

The application took place 4 days after the artificial inoculation which was carried out by mixing the inoculum of *R. solani* in the floating water.

37 days after application (DA-A) the untreated check recorded a 8.7% of severity and 30.5% of incidence. All the test items resulted significantly different from it with values of affected leaf area and similar across them.

Figure 3:
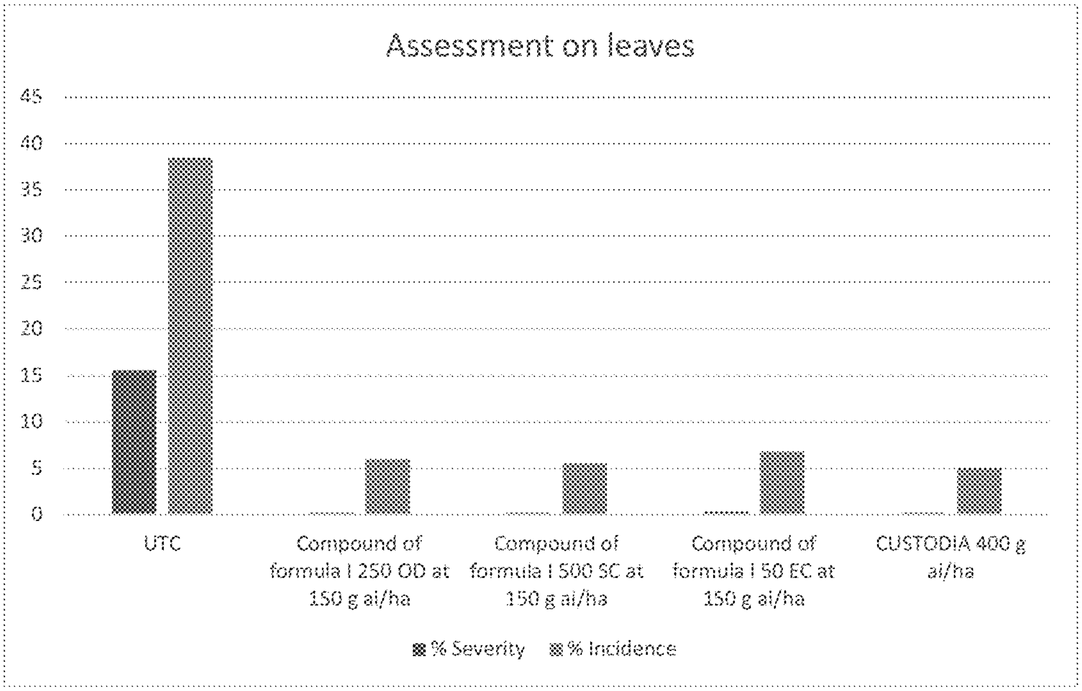
FIG. 3: Assessments on leaf severity (%) and incidence (%)
Figure 4:
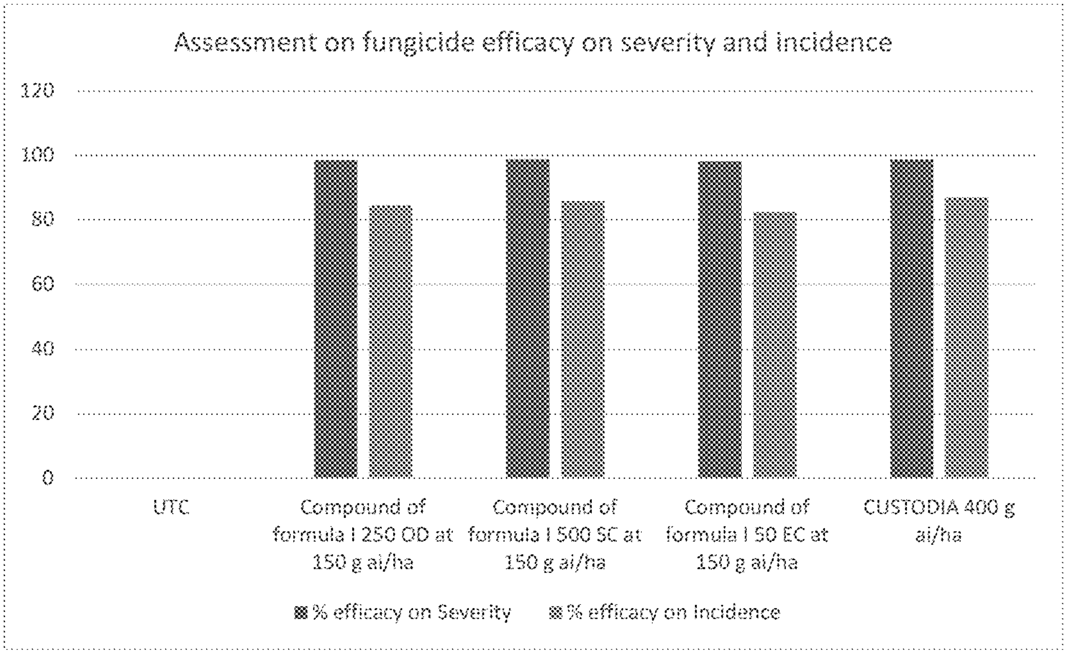
FIG. 4: Assessments on fungicide efficacy (Abbott's formula) on leaf severity and incidence

The last assessment was performed on 50 DA-A, as the previous assessment, all the test items resulted significantly different from the untreated check (15.6% of severity and 38.5% of incidence—see FIGS. 3 and 4.

In presence of a medium *Rhizoctonia solani* pressure, all the tested products provided a disease reduction in comparison to the untreated check. All the formulation of compound of formula I when applied at 150 showed comparable performances to the reference CUSTODIA at 400 g ai/ha during the whole trial. A consistent dose response was pointed out among the different rates of compound of formula I 250 OD, compound of formula I 500 SC and compound of formula I 50 EC.

During the trial three assessments were carried out to evaluate the negative effects on the crop due to products application. No phytotoxic symptoms or differences in crop vigor were observed, showing the full selectivity of the tested products on rice (Leonidas variety).

Example 4. Control of *Pyricularia oryzae* (Blast) (Blast) in Rice as Foliar Treatment The trial was carried out in the glasshouse at SAGEA's facility in Castagnito (Cuneo)—Piemonte region (Northern Italy) to evaluate the efficacy against *Pyricularia oryzae* (blast) and the selectivity on rice (Leonidas variety) of compound of formula I 250 OD 150 (T5) and 200 (T6) g ai/ha, in comparison to AMISTAR at 250 g (T9) ai/ha.

The application took place 3 days after the artificial inoculation was carried out by spraying the inoculum of *P. oryzae* on the leaves.

The last assessment was performed 32 DA-A and all the test items resulted significantly different from the untreated check (33.0% of severity and 76.3% of incidence) and no differences could be seen between the test item and the commercial reference.

Figure 5:
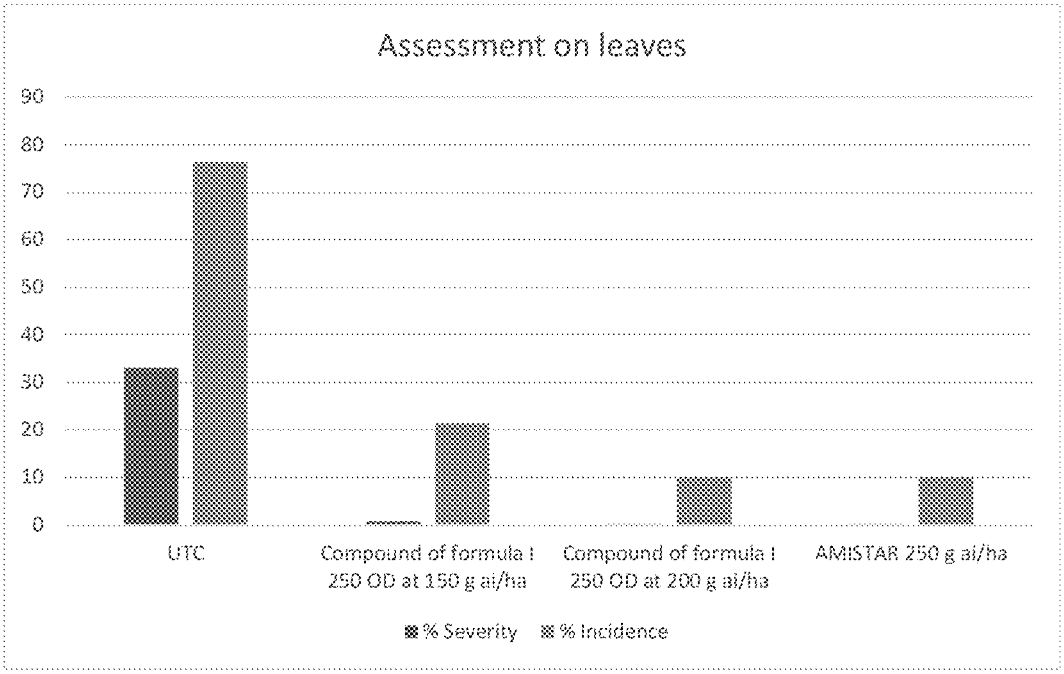
FIG. 5: Assessments on leaf severity and incidence at the third assessment
Figure 6:
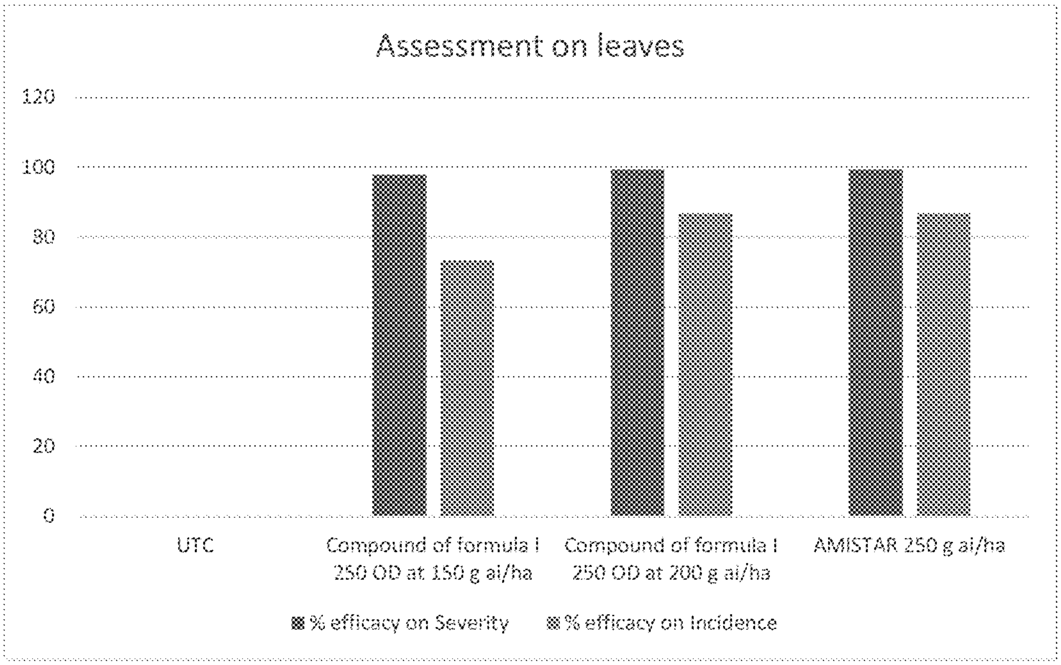
FIG. 6: Assessments on fungicide efficacy (Abbott's formula) on leaf severity and incidence at the third assessment

The results are shown in FIGS. 5 and 6.

In presence of a high *Pyricularia oryzae* (blast) pressure, all the tested products provided a disease reduction in comparison to the untreated check. ADF-16 250 OD applied at 150 and 200 g ai/ha showed comparable performances to the reference AMISTAR at 250 g ai/ha during the whole trial.

During the trial four assessments were carried out to evaluate the negative effects on the crop due to products application. No phytotoxic symptoms or differences in crop vigor were observed, showing the full selectivity of the tested products on rice (Leonidas variety).

Example 5. Control of *Sclerotinia sclerotiorum* in Rapeseed as Foliar Treatment The trial was carried out in the glasshouse at SAGEA's facility in Castagnito (Cuneo)—Piemonte region (Northern Italy) to evaluate the efficacy against *Sclerotinia sclerotiorum* and the selectivity on rapeseed (Delight variety) of ADF-16 250 OD at 75, 100, 125 and 150 g ai/ha, ADF-16 500 SC and ADF-16 50 EC at 75 and 150 g ai/ha in comparison to AMISTAR FOLD at 250 g ai/ha.

The application took place 1 days after the artificial inoculation which was carried out by spraying the inoculum of *S. sclerotiorum* on the plants.

29 DA-A, the untreated check recorded 57.6% and 43.8% of severity on stems and branches respectively and 100.0% of incidence for both stems and branches.

For what concerned the percentage of affected stems area all the test items resulted significantly different from the untreated check and similar among them.

Figure 7:
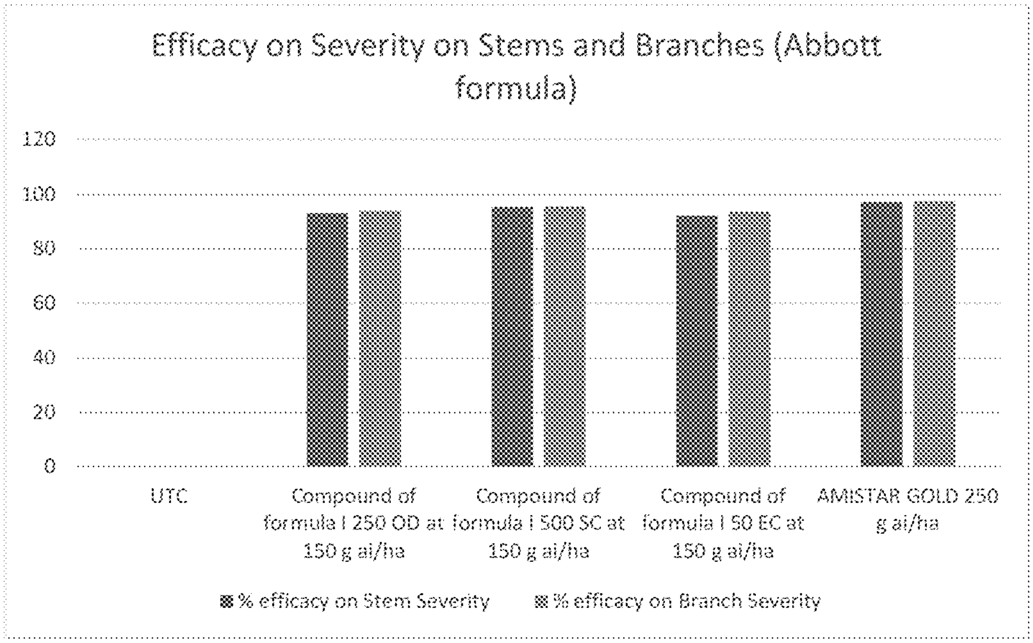
FIG. 7: Assessments on fungicide efficacy (Abbott's formula) on stems severity at the last assessment date

The results are shown in FIG. 7.

In presence of a high *Sclerotinia sclerotiorum* pressure, all the tested products provided a disease reduction in comparison to the untreated check.

All the formulation of ADF-16 when applied at 150 showed comparable performances to the reference AMISTAR GOLD at 250 g ai/ha during the whole trial.

No phytotoxic symptoms or differences in crop vigor were observed, showing the full selectivity of the tested products on rapeseed (Delight variety).

Example 6. Control of *Pseudoperonospora cubensis* (Downy Mildew) in Cucumber as Foliar Treatment The trial was carried out in a commercial glasshouse in Vittoria (RG)—Sicily region (Southern Italy) to evaluate the efficacy against *Pseudoperonospora cubensis* (downy mildew) and the selectivity on cucumber (Bosco variety) of ADF-16 250 OD at 100, 125, 150 and 200 g ai/ha in comparison to AIRONE PIU at 630 g ai/ha and EQUATION PRO at 21 g ai/ha.

Each plot (2 m×5 m, 2 rows per plot) consisted of at least 10 plants and 4 replicates per treatment were carried out. The soil used for the trial was a mix of peat and perlite. 3 applications were carried out as follows: A: early curative (disease symptoms lower than 5%), B: 7-10 days from A and C: 7-10 days from B. The corresponding treatments dates were: 16 Nov. 2020 (BBCH 64), 23 Nov. 2020 (BBCH 65) and 30$^{th}$ of November (BBCH 67)

The application was carried out with a backpack sprayer OleomacSP126 and a water volume of 1000 L/ha.

Phytotoxicity, if any, was assessed 7, 14 and 21 days form each application and starting from the first symptoms the percentage of affected leaf area (% severity) as well as the percentage of affected leaves (% incidence) was measured.

At the time of the last assessment (21 days after the third application), the disease severity was 37.7% in the untreated control and the disease incidence reached 100%.

Figure 8:
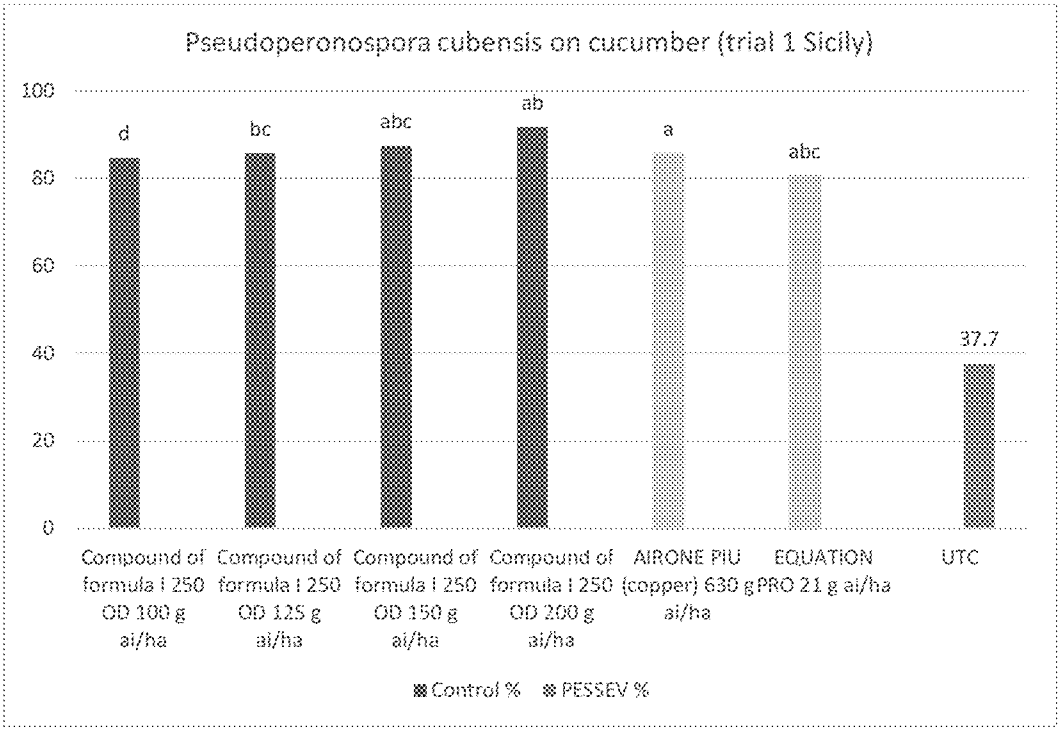
FIG. 8: Percentage of disease pressure control compared to the untreated at the time of the last assessment (21 DA-C) and corresponding severity of the disease in the untreated control

As shown in FIG. 8, all rates of ADF-16 provided a significant control of the disease and the performance was comparable to both references from 100 g ai/ha onwards. A clear dose response could be depicted.

Example 7. Control of *Plasmopara viticola* (Downy Mildew) in Grapevine as Foliar Treatment The trial was carried out in a commercial vineyard in Castelnuovo del Garda, (VR)—Veneto region (Northern Italy) to evaluate the efficacy against *Plasmopara viticola* (downy mildew) and the selectivity on grapevine (Merlot variety) of ADF-16 as a 250 OD and 500 SC formulation (this with and without an adjuvant) at 75 and 100 g ai/ha in comparison to the reference product AMPEXIO (240 g/kg Zoxamide+250 g/kg Mandipropamid) at 245 g ai/ha and an untreated control.

The trial was conducted following the EPPO guidelines.

Five applications were made starting from BBCH 64 with 5-10 days interval. The applications were made with a backpack sprayer and the water volume at each application was 100 L/ha.

Under extremely high disease pressure all treatments provided very high levels of control the disease severity on leaves (between 85% and 89% vs. UTC) and no statistically significant difference could be seen across rates or formulations.

On bunches differences among the treatments could be seen with the reference product scoring the highest value of control (98.77% vs. UTC). The highest rate of ADF-16 with the addition of the adjuvant (T7 ADF-16 500 SC at 100 g ai/ha+Lutensol TDA9 2% v/v) wasn't significantly different than the control reaching 86.63% of control of the disease severity on bunches. A clear dose response could be seen between compound of formula I at 75 g ai/ha and at 100 g ai/ha, both rates providing a significant control of the disease compared to the untreated control.

Example 8. Control of *Erysiphe betae* (Powdery Mildew) in Sugar Beet as Foliar Treatment The screening test was conducted in a greenhouse in Gerichshain, Kupferstraße 6, Germany. The test was performed from application until 28 days after treatment. The efficacy and phytotoxic symptoms of compound of formula I to the plant species sugar beet were examined with a water control under greenhouse conditions. During the whole trial period the plants were stored at 12.6° C.-24.2° C. and 41.9-78.2% relative humidity.

The inoculation of the leaves was carried out. A spore suspension was produced. Infested leaves of sugar beets from a field were put in water for some minutes to get a spore suspension. For better homogeneity Tween 20 (Polysorbat) was added to the spore solution (0.1%). Two diseases were observed on the sampled leaves, *Uromyces betae* and *Erysiphe betae*, just *E. betae* infested the plants in this screening trial.

In the screening test compound of formula I was applied at BBCH stage 16-18 at different application rates and formulations (compound of formula I 250 OD, ADF-16 50 EC, compound of formula I 500 SC—see treatment table list in Table 10) compared to the untreated check and the standard compound Juwel (125 g/l Epoxiconazol, 125 g/l Kresoxim-methyl).

TABLE 10

Treatment list

| Product name | Fomulation concentration | Application rate [L/ha] |
|---|---|---|
| 1 untreated check | | |
| 2 ADF-16 250 OD | 50 g ai/L | 0.2 |
| 3 ADF-16 50 EC | 50 g ai/L | 1.0 |
| 4 ADF-16 500 SC | 50 g ai/L | 0.1 |
| 5 ADF-16 250 OD | 75 g ai/L | 0.3 |
| 6 ADF-16 250 OD | 100 g ai/L | 0.4 |
| 7 ADF-16 250 OD | 125 g ai/L | 0.5 |
| 8 ADF-16 250 OD | 150 g ai/L | 0.6 |
| 9 ADF-16 50 EC | 150 g ai/L | 3.0 |
| 10 ADF-16 500 SC | 150 g ai/L | 0.3 |
| 11 Juwel | 250 g ai/L | 1.0 |

The application was carried out once one day after inoculation in an automatic application cabin at a spray volume equivalent to 200 L/ha. During the observation period of 28 days after treatment (DAT), the plants were assessed weekly for growth stage, leaf diseases and phytotoxicity.

The plants were cultivated according to good horticultural practice. The sugar beets were provided with water (tap water) and nutrient solution (Hakaphos blau, 0.15%) by bottom watering using pot saucers. Weeding was done as soon as possible by hand. No additional pesticides were applied.

Results

Figure 9:
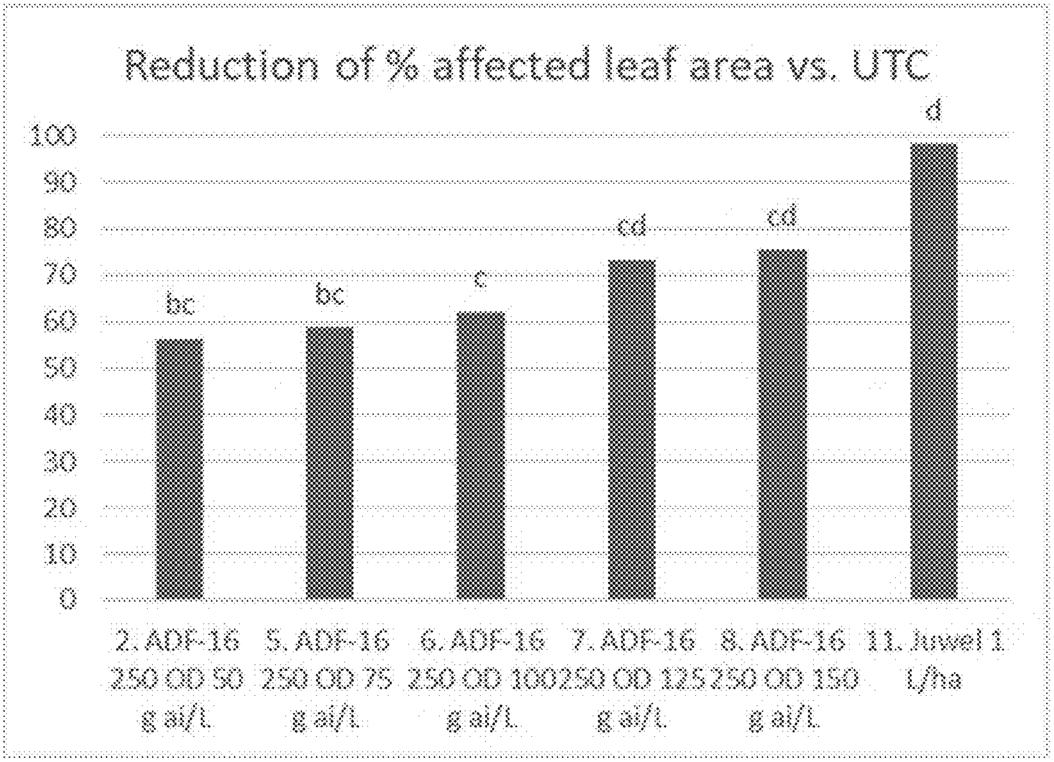
FIG. 9: Reduction of % affected leaf area vs. UTC of the compound of formula I OD treatments (50 g ai/ha, 75 g ai/ha, 100 g ai/ha, 125 g ai/ha and 150 g ai/ha) and the reference product

The fungicidal effect of compound of formula I against *Erysiphe betae* (powdery mildew) in sugar beet was clearly observed in this trial (>60% reduction of the affected leaf area compared to the UTC starting from 100 g ai/ha). A clear dose response was visible among the rates. The reference product provided the highest control of the disease however no significant difference could be seen between the higher rates of compound of formula I and the reference product. Clear differences between the standard compound and compound of formula I were observed. Results of the OD formulations are summarized in the graph depicted in FIG. 9.

Example 9. Control of *Mycosphaerella fijiensis* (Black Sigatoka) in Banana as Foliar Treatment The banana plants used for this experimentation were obtained from vitro-plants Cavendish type furnished by VITROPIC S.A. (France). One-month old plants (2 fully deployed leaves: F2 (oldest leaf) and F1 and the cigar leaf) are treated (see details in the table below) were inoculated with a calibrated mycelial seed-inoculum of a mixture of 4 *M. fijiensis* strains (for each treatment, 3 repetitions (banana plants) are considered). Banana leaves of each plant were treated on their upper (adaxial) and lower (abaxial) face and then incubated for one hour under a laminar flow in order to let dry the fungicide droplets. After inoculation, banana plants were transferred in climatic chamber: 25° C. day/18° C. night, photoperiod of 16 h light/8 h dark and 100% Relative Humidity.

TABLE 11 treatment list (SICO = Difenoconazole 250 EC = reference product) - all products were prepared in an equivalent volume of 50 L/ha.

| Conditions | Doses |
|---|---|
| Control (Sterile Distilled Water) | — |
| SICO | 0.4 L/ha |
| ADF-16 50 EC | 12.5 g a.i./ha |
| (ADM 00050.F.2.A) | 50 g a.i./ha |
| (50 g a.i./L) | |

From 28 days to 56 days post inoculation (dpi) each banana plants is observed and the disease intensity severity (DSI: Disease Severity Index) is evaluated over time in order to determine the AUDPC (Area Under Disease Progress Curve)—Table 12, and the fungicidal efficacy expressed in percent of the untreated control—Table 13.

TABLE 12

Area Under Disease Progress Curve (AUDPC) of *M. fijiensis* on banana leaves F2 and F1 inoculated 24 h before treatment with water (Control) or several products in controlled conditions.

| Conditions | Doses | AUDPC F2 | AUDPC F1 |
|---|---|---|---|
| Untested and uninoculated | | 0.00 * | 0.00 |
| Control (Sterile Distilled Water) | | 3227.78 | 2897.22 |
| SICO | | 194.44 | 388.89 |
| ADF-16 50 EC | 12.5 g a.i./ha | 952.78 c | 836.11 c |
| | 50 g a.i./ha | 587.33 cd | 252.78 cd |

TABLE 13

Fungicide efficacy obtained from the AUDPC values of the several products applied 24 h after inoculation of banana leaves with *M. fijiensis* in controlled conditions.

| Conditions | Doses | Efficacy (%) F2 | Efficacy (%) F1 |
|---|---|---|---|
| SICO | | 94 | 87 |
| ADF-16 50 EC | 12.5 g a.i./ha | 70 | 71 |
| | 50 g a.i./ha | 82 | 91 |

The experiment confirms that ADF-16 is efficiently controlling *Mycosphaerella fijiensis* in banana.

Example 10. Control of *Botrytis cinerea* (Grey Mould) in Strawberry as Foliar Treatment The objective of the trial was to assess the fungicidal effect of ADF-16 against *Botrytis cinerea* in strawberry, compared to an untreated control and a reference product.

The compound of formula I 250 OD was tested at different doses, namely 400, 450 and 500 g ai/ha as depicted in the table below and compared to an untreated control as well as two reference products, SCALA (pyrimethanil 400 g/L) at 1000 g ai/ha and SIGNUM (boscalid+pyraclostrobin 26.7+6.7 g/kg) at 600 g ai/ha.

*Botrytis cinerea* was artificial inoculated by spraying the inoculum on the leaves 3-4 days before the application.

To test for fungicidal control of *Botrytis cinerea*, the strawberry plants, grown in pots, were sprayed with each of the above treatments. 5 pots of 22 cm of diameter (the soil used for the trial is a mix of peat and perlite) with 1 plant each were used, 1 pot per replicate (each treatment is made of 4 replicates) was considered.

Each of the treatments was applied 3 times (ABC) according to the disease development as follows: A, early curative (before the disease symptoms appear; 3-4 days after the artificial inoculation), B, 7-10 days from A and C, to be evaluated in function of the disease development (7-10 days from B).

At 7, 14 and 21 days form the application any possible phytotoxicity symptoms (%) were evaluated and no phytotoxicity was seen.

At the first symptoms the following parameters were assessed:

percentage of affected leaf area (% severity)
percentage of affected leaves (% incidence)
percentage of affected fruit area (% severity)
percentage of affected fruits (% incidence)

Figure 10:
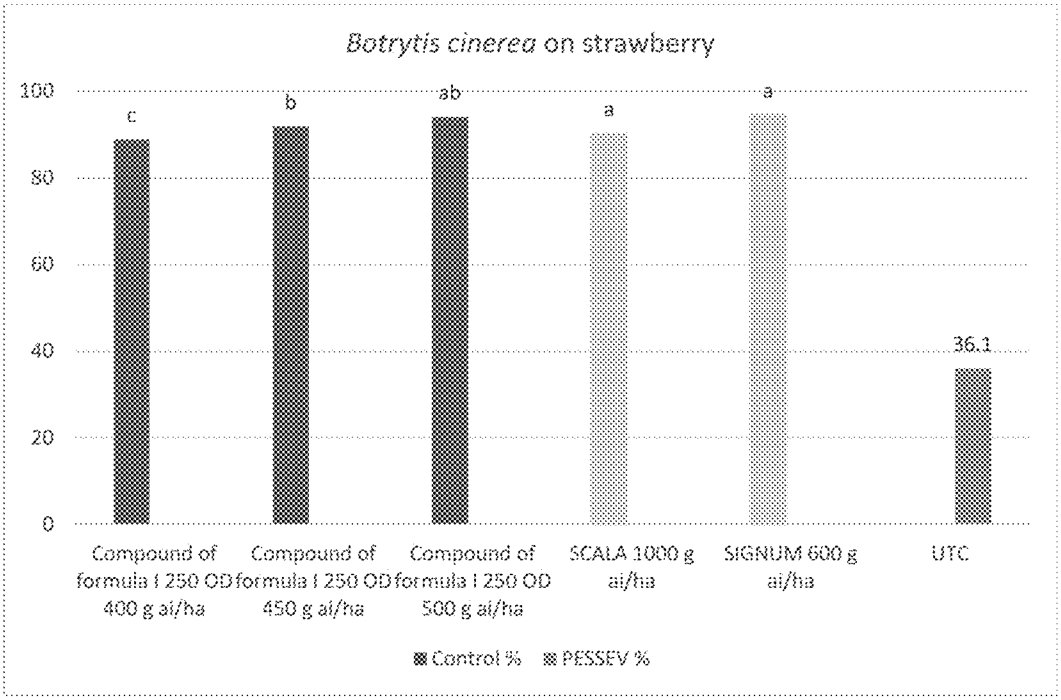
FIG. 10: Assessments on fungicide efficacy (Abbott's formula) on leaf severity

The results observed at the third and last assessment are shown in FIG. 10.

FIG. 10 depicts that the compound of formula I provided more than 90% control already at 450 g ai/ha, a significant lower amount of AI compared to the usual minimum 600 g ai/ha needed with the other commercially available products.

Example 11: Control of *Venturia inaequalis* in Apple

The trial was carried out in the glasshouse sited in the SAGEA's facility in Castagnito (Cuneo)—Piemonte region (Northern Italy) in order to evaluate and compare the efficacy against *Venturia inaequalis* and the selectivity on apple (Golden Delicious variety) of ADF-16 250 OD applied at several rates (75, 125, 150, 175 and 200 g ai/ha). As reference treatment KING (tribasic copper sulphate) was applied at 630 g ai/ha.

The artificial inoculation was carried out by spraying the inoculum of *V. inaequalis* on apple leaves. Then three applications were performed on day 4, day 11 and day 12 after artificial inoculation.

During the trial, four assessments (day 11, day 18, day 25 and day 32) were carried out in order to detect any phytotoxicity symptoms on the crop and for evaluating the disease severity and incidence.

At the last assessment, performed 14 DA-C (day 32 after artificial inoculation) the untreated check recorded 23.8% of severity and 42.0% of incidence. The ADF-16 250 OD applied at 200 g ai/ha resulted better than KING in terms of severity (3.5% and 7.3% respectively).

In presence of a high *Venturia inaequalis* pressure all the tested rates of ADF-16 250 OD provided a significant disease control in comparison to the untreated check.

Figure 11:
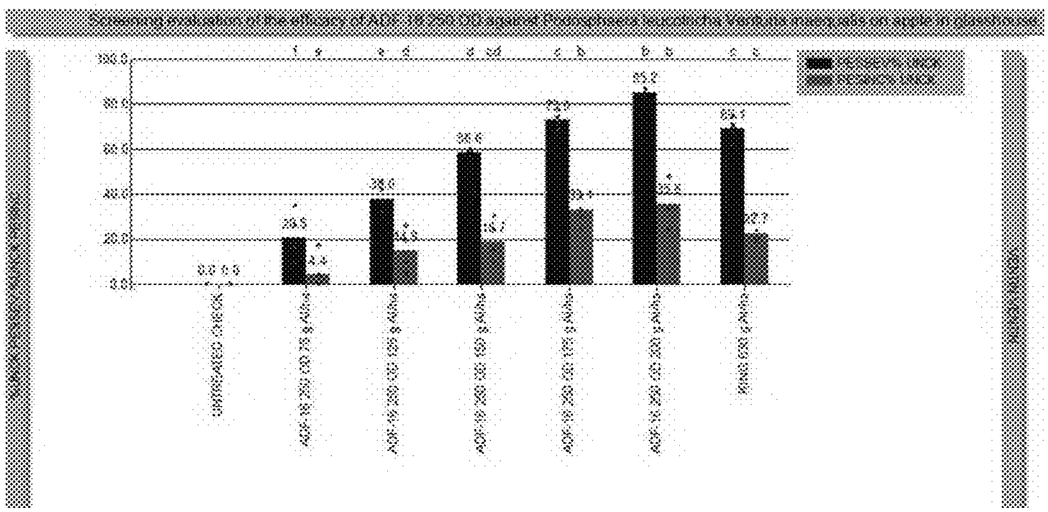
FIG. 11: Efficacy for controlling *Venturia inaequalis* on apple

ADF-16 250 OD applied at 200 g ai/ha recorded the higher fungicide efficacy (85.2 PESSEV % UNCK and 35.8 PESINC % UNCK respectively) and resulted significantly different from all the other dose rates and from the KING. The results are shown in FIG. 11.

Example 12. Control of *Podosphaera fuliginea* on Zucchini

The trial was carried out in the glasshouse sited in the SAGEA's facility in Castagnito (Cuneo)—Piemonte region (Northern Italy) in order to evaluate and compare the efficacy against *Podosphaera fuliginea* and the selectivity on zucchini (Genovese variety) of ADF-16 250 OD applied at several rates (100, 125, 150 and 200 g AI/ha). As reference treatment BAROCCO 80 WG (sulfur 800 g/kg) was applied at 2000 g ai/ha.

Artificial inoculation was carried out by spraying the inoculum of *P. fuliginea* on the zucchini plants. Then three applications were performed at 4 days, 11 days and 18 days after artificial inoculation. Before that, the.

During the trial, three assessments (18 days, 25 days and 32 days) were carried out in order to evaluate the disease severity and incidence.

Figure 12:
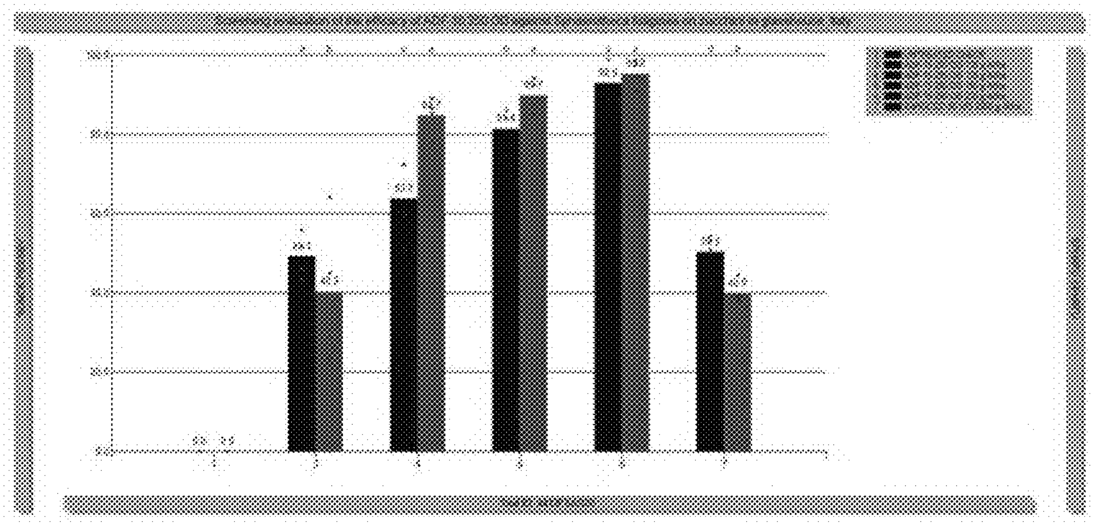
FIG. 12: Efficacy for controlling *Podosphaera fuliginea* on zucchini

At the last assessment, performed 14 DA-C (32 days after artificial inoculation) the untreated check, on the upper side, recorded 44.3% of severity and 95.8% of incidence. All the treatments resulted significantly different from the untreated check with efficacy values of severity ranging from 2.9% to 34.2% and incidence from 26.7% to 85.0%. All treatments resulted significantly different with values of severity ranging from 1.4% to 18.1% and incidence from 16.7% to 66.7%. ADF-16 250 OD performed better than the reference product KING at all rates. The results are shown in FIG. 12.

Example 13a. Control of *Cercospora beticola* on Sugar Beet

The trial was carried out in the glasshouse sited in the SAGEA's facility in Castagnito (Cuneo)—Piemonte region (Northern Italy) in order to evaluate and compare the efficacy against *Cercospora beticola* (Leaf spot of beet) and the selectivity on sugarbeet (Raison variety) of ADF-16 250 OD (named in this trial ADM-16 250 OD) applied at several rates (75, 100, 125 and 150 g AI/ha). As reference treatment POLTIGLIA DISPERSS (Bordeaux mixture 200 g/kg) was applied at 1200 g ai/ha.

Artificial inoculation (January 18th) was carried out by spraying the inoculum of *C. beticola* on sugarbeet plants. Then three applications were performed at 3 days, 10 days and 17 days after artificial inoculation. Before that, the.

During the trial, four assessments (10 days, 17 days, 24 days and 31 days after artificial inoculation) were carried out in order to detect any sign of phytotoxicity on the crop. Besides, disease severity and disease incidence of the pathogen were assessed on 17 days, 24 days and 31 days after artificial inoculation.

Figure 13:
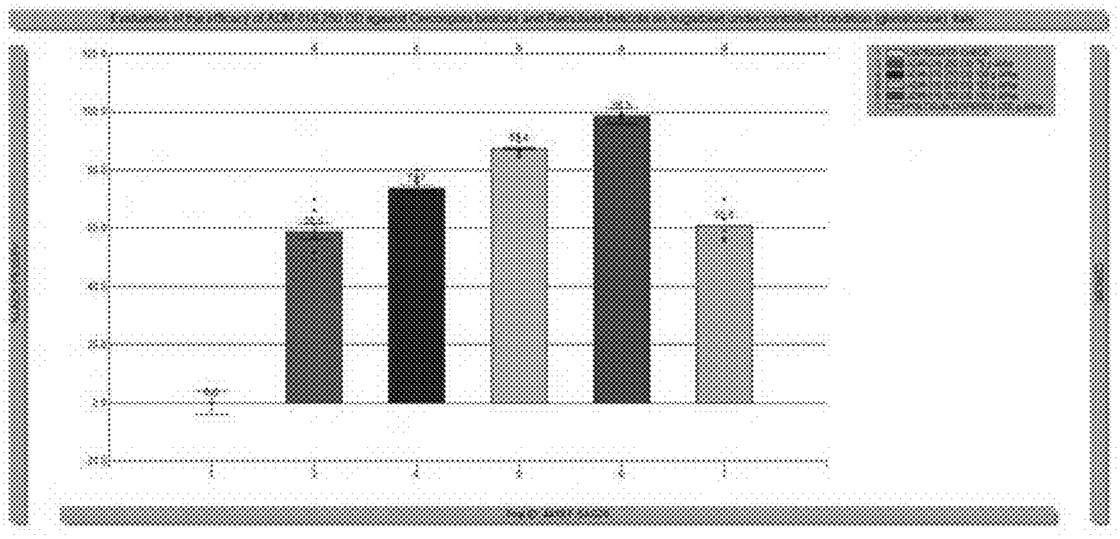
FIG. 13: Efficacy for controlling *Cercospora beticola* on sugar beet

At the last assessment carried out at 14 DA-C (31 days after artificial inoculation), the untreated check recorded 33.6% of severity and 87.3% of incidence. All the test items resulted significantly different from the untreated check with values of control of the severity ranging from 58.9% (ADF-16 250 OD at 75 g ai/ha) to 98.5% (ADF-16 250 OD at 150 g ai/ha). The results are shown in FIG. 13.

Example 13b. Control of *Ramularia beticola* on Sugar Beet

The trial was carried out in the glasshouse sited in the SAGEA's facility in Castagnito (Cuneo)—Piemonte region (Northern Italy) in order to evaluate and compare the efficacy against *Ramularia beticola* (Leaf spot of beet) and the selectivity on sugarbeet (Raison variety) of ADF-16 250 OD applied at several rates (125 and 150 g ai/ha). As reference treatment AMISTAR GOLD (difenoconazole 125 g/l+azoxystrobin 125 g/l) was applied at 250 g ai/ha.

Artificial inoculation was carried out by spraying the inoculum of *R. beticola* on sugarbeet plants. Then three applications were performed at 3 days, 10 days, and 17 days after artificial inoculation.

During the trial, four assessments (at 10 days, 17 days, 24 days and 31 days after artificial inoculation) were carried out in order to detect any sign of phytotoxicity on the crop. Besides, disease severity and disease incidence of the pathogen were assessed on 17 days, 24 days and 31 days after artificial inoculation.

Figure 14:
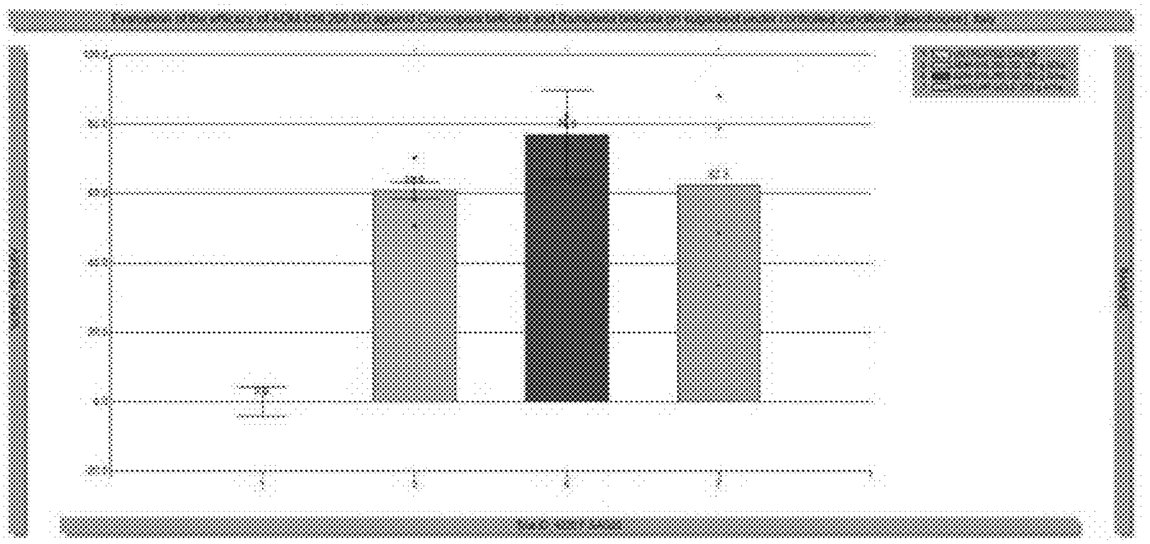
FIG. 14: Efficacy for controlling *Ramularia beticola* on sugar beet

At the last assessment carried out at 14 DA-C (31 days after artificial inoculation), the untreated check recorded 29.3% of severity and 81.7% of incidence. Both ADF-016 250 OD treatments resulted significantly different from the untreated check with values of control of the severity ranging from 60.8% (ADF-16 250 at 125 g ai/ha) to 76.9% (ADF-16 250 at 150 g ai/ha). The results are shown in FIG. 14.

Example 14. Control of *Microsphaera diffusa* (Powdery Mildew) on Soybean

The objective of the trial is to assess the fungicidal effect of ADF-16 against *Microsphaera diffusa* (powdery mildew) on soybean, compared to an untreated control and a reference product.

ADF-16 is tested at different doses, namely 50, 100, 150 and 200 g ai/ha as depicted in the table below.

TABLE 14 treatment list

| N. | Product | Forms | Rate (g a.i./ha) | Rate ml/ha |
|---|---|---|---|---|
| 1 | Check | — | — | — |
| 2 | ADF - 16 + Adjuvant 0.25% v/v | 250 OD | 50 | 200 |
| 3 | ADF - 16 + Adjuvant 0.25% v/v | 250 OD | 100 | 400 |
| 4 | ADF - 16 + Adjuvant 0.25% v/v | 250 OD | 150 | 600 |
| 5 | ADF - 16 + Adjuvant 0.25% v/v | 250 OD | 200 | 800 |
| 6 | ADF - 16 + Adjuvant 0.5% v/v | 500 SC | 50 | 100 |
| 7 | ADF - 16 + Adjuvant 0.5% v/v | 500 SC | 100 | 200 |
| 8 | ADF - 16 + Adjuvant 0.5% v/v | 500 SC | 150 | 300 |
| 9 | ADF - 16 + Adjuvant 0.5% v/v | 500 SC | 200 | 400 |
| 10 | ADF - 16 + Adjuvant 0.5% v/v | 50 EC | 50 | 1.000 |
| 11 | ADF - 16 + Adjuvant 0.5% v/v | 50 EC | 100 | 2.000 |
| 12 | ADF - 16 + Adjuvant 0.5% v/v | 50 EC | 150 | 3.000 |
| 13 | ADF - 16 + Adjuvant 0.5% v/v | 50 EC | 200 | 4.000 |
| 14 | Versatilis | 750 EC | 450 | 600 |

*Microsphaera diffusa* (powdery mildew) is artificially inoculated by spraying the inoculum on the leaves few days after the application.

To test for fungicidal control of *Microsphaera diffusa* (powdery mildew), the soybean plants, grown in pots, are sprayed at V2 with each of the above treatments. 5 pots with 3 soybean plants each are considered, each treatment counts for 4 replicates.

Between 14 and 21 days from the inoculation, the severity (%) of the infection is assessed.

Results show no significant phytotoxicity of the compound of formula I.

Results show application of the compound of formula I effectively controls *Microsphaera diffusa* (powdery mildew) on soybean.

Example 15. Control of *Ramularia areola* on Cotton

The objective of the trial is to assess the fungicidal effect of ADF-16 against *Ramularia areola* on cotton, compared to an untreated control and a reference product.

ADF-16 is tested at different doses, namely at 50, 100, 150 and 200 g ai/ha as depicted in the table below.

TABLE 15 treatment list

| N. | Product | Form. | Rate (g a.i./ha) |
|---|---|---|---|
| 1 | Check | — | — |
| 2 | ADF - 16 | 250 OD | 50 |
| 3 | ADF - 16 | 250 OD | 100 |
| 4 | ADF - 16 | 250 OD | 150 |
| 5 | ADF - 16 | 250 OD | 200 |
| 6 | ADF - 16 | 500 SC | 50 |
| 7 | ADF - 16 | 500 SC | 100 |
| 8 | ADF - 16 | 500 SC | 150 |
| 9 | ADF - 16 | 500 SC | 200 |
| 10 | ADF - 16 | 50 EC | 50 |
| 11 | ADF - 16 | 50 EC | 100 |
| 12 | ADF - 16 | 50 EC | 150 |
| 13 | ADF - 16 | 50 EC | 200 |
| 14 | Score | 250 EC | 75 |

No adjuvant will be added in any treatment.

*Ramularia areola* is artificially inoculated by spraying the conidia on the plants, previously sprayed with the fungicide.

To test for fungicidal control of *Ramularia areola*, the cotton plants, grown in pots, are sprayed at first true leaf fully open with each of the above treatments. 5 pots with 3 cotton plants each are considered, each treatment counts for 4 replicates.

Between 25 and 30 days from the inoculation the severity (%) of the infection is assessed.

Results show no significant phytotoxicity of the compound of formula I.

Results show application of the compound of formula I effectively controls *Ramularia areola* on cotton.

Example 16. Control of Necrotrophic Disease Like *Corynespora cassiicola* and *Colletotrichum dematium* var. *truncatum* on Soybean The objective of the trial is to assess the fungicidal effect of ADF-16 against two necrotrophic disease like *Corynespora cassiicola* and *Colletotrichum dematium* var. *truncatum* on soybean, compared to an untreated control and a reference product.

ADF-16 is tested at different doses, namely at 50, 100, 150 and 200 g ai/ha as depicted in the table below.

TABLE 16 treatment list

| N. | Product | Form. | Rate (g a.i./Ha) | Rate (ml/ha) |
|---|---|---|---|---|
| 1 | Check | — | — | — |
| 2 | ADF - 16 + Adjuvant 0.25% v/v | 250 OD | 50 | 200 |
| 3 | ADF - 16 + Adjuvant 0.25% v/v | 250 OD | 100 | 400 |
| 4 | ADF - 16 + Adjuvant 0.25% v/v | 250 OD | 150 | 600 |
| 5 | ADF - 16 + Adjuvant 0.25% v/v | 250 OD | 200 | 800 |
| 6 | ADF - 16 + Adjuvant 0.5% v/v | 500 SC | 50 | 100 |
| 7 | ADF - 16 + Adjuvant 0.5% v/v | 500 SC | 100 | 200 |
| 8 | ADF - 16 + Adjuvant 0.5% v/v | 500 SC | 150 | 300 |
| 9 | ADF - 16 + Adjuvant 0.5% v/v | 500 SC | 200 | 400 |
| 10 | ADF - 16 + Adjuvant 0.5% v/v | 50 EC | 50 | 1.000 |
| 11 | ADF - 16 + Adjuvant 0.5% v/v | 50 EC | 100 | 2.000 |
| 12 | ADF - 16 + Adjuvant 0.5% v/v | 50 EC | 150 | 3.000 |
| 13 | ADF - 16 + Adjuvant 0.5% v/v | 50 EC | 200 | 4.000 |

TABLE 16-continued

| treatment list | | | | |
|---|---|---|---|---|
| N. | Product | Form. | Rate (g a.i./Ha) | Rate (ml/ha) |
| 14 | Score (reference for *Colletotrichum*) | 250 EC | 75 | Score |
| 15 | unizen Gold (reference for *Corynespora*) | 750 WG | 1.125 | 1.509 |

The inoculation of *Corynespora cassiicola* and *Colletotrichum dematium* var. *truncatum* is done with infected leaves from the field few days after the application.

To test for fungicidal control against the two necrotrophic diseases, the soybean plants, grown in pots, are sprayed at V2 with each of the above treatments. 5 pots with 3 soybean plants each are considered, each treatment counts for 4 replicates.

Between 14 and 21 days from the inoculation the severity (%) of the infection is assessed.

Results show no significant phytotoxicity of the compound of formula I. Results show application of the compound of formula I effectively controls *Corynespora cassiicola* on soybean. Results show application of the compound of formula I effectively controls *Colletotrichum dematium* var. *truncatum* on soybean.

Example 17. Control of *Cercospora kikushi* on Soybean

The objective of the trial is to assess the fungicidal effect of ADF-16 against late season disease like *Cercospora kikushi* m on soybean, compared to an untreated control and a reference product.

ADF-16 is tested at different doses, namely at 50, 100 and 200 g ai/ha as depicted in the table below.

TABLE 17

| treatment list | | | | | |
|---|---|---|---|---|---|
| N. | Product | Form | a.i./ha | ml/ha | Spray time |
| 1 | Check | — | — | — | — |
| 2 | ADF - 16 + Adjuvant 0.25% v/v | 250 OD | 50 | 200 | 15DBF > R1 > R1 + 15 |
| 3 | ADF - 16 + Adjuvant 0.25% v/v | 250 OD | 100 | 400 | |
| 4 | ADF - 16 + Adjuvant 0.25% v/v | 250 OD | 200 | 800 | |
| 5 | ADF - 16 + Adjuvant 0.5% v/v | 500 SC | 50 | 100 | |
| 6 | ADF - 16 + Adjuvant 0.5% v/v | 500 SC | 100 | 200 | |
| 7 | ADF - 16 + Adjuvant 0.5% v/v | 500 SC | 200 | 400 | |
| 8 | ADF - 16 + Adjuvant 0.5% v/v | 50 EC | 50 | 1.000 | |
| 9 | ADF - 16 + Adjuvant 0.5% v/v | 50 EC | 100 | 2.000 | |
| 10 | ADF - 16 + Adjuvant 0.5% v/v | 50 EC | 200 | 4.000 | |
| 11 | Cronnos OD + Rumba 0.25% v/v | | | 2.250 | |

The trial is carried out in open field and no artificial inoculation is performed.

To test for fungicidal control against the late season disease, each plot (3m×5m) is sprayed with one of the treatments from Table 17. Each treatment is made of 4 replicates.

Three applications are made, the first approximately 14 days before flowering followed by a second one at R1 and the third at R1+14 days. A fourth application is considered based on the development of the disease.

Assessments are done before all sprays and at 7, 14 and 21 days after the last spray. The whole plot is assessed considering the 3 plant parts (bottom, mid and upper). The final grade is the mean of the 3 scores (bottom, mid and upper).

The whole plot is assessed for defoliation. The defoliation assessment takes place at R6-R7 stage when the untreated control reaches 80 to 90% defoliation. The harvest assessment is done from the middle of the plot covering at least 8 $m^2$/plot.

Results show no significant phytotoxicity of the compound of formula I.

Results show application of the compound of formula I effectively controls *Cercospora kikushi* on soybean.

Example 18. Control of *Podosphaera leucotricha* (Powdery Mildew) in Apple

The trial was carried out in the glasshouse sited in the SAGEA's facility in Castagnito (Cuneo)—Piemonte region (Northern Italy) in order to evaluate and compare the efficacy against *Podosphaera leucotricha* and the selectivity on apple (Golden Delicious variety) of ADF-16 250 OD applied at several rates (75, 125, 150, 175 and 200 g AI/ha). As reference treatments BAROCCO 80 WG was applied at 2000 g ai/ha.

Artificial inoculation was carried out by spraying the inoculum of *P. leucotricha* on apple leaves. Then three applications were performed at 5 days, 12 days, and 19 days after artificial inoculation.

Figure 15:
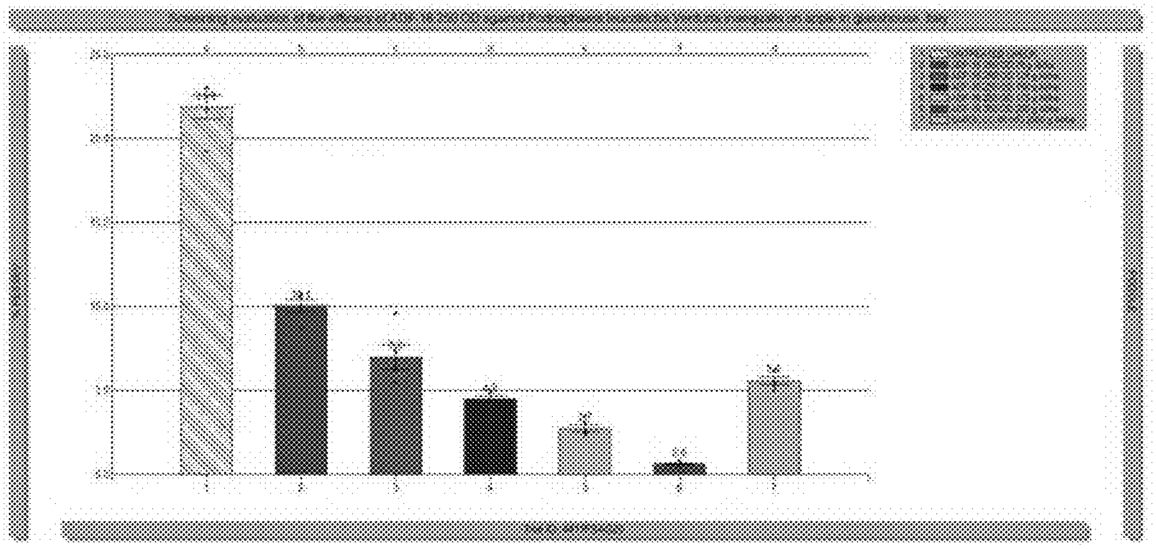
FIG. 15: Efficacy for controlling *Podosphaera leucotricha* (powdery mildew in apple) in apple

At the last assessment, performed 14 days after the 3 application the untreated check recorded 21.9% of severity and 59.6% of incidence. ADF-16 250 OD at 200 g ai/ha resulted significantly different from the other test items with the lowest value of severity (0.6%). In any case, all the other test items resulted significantly different from the untreated check with values of severity ranging from 2.7% to 10.1%. The results are shown in FIG. 15.

Example 19. Control of *Alternaria solani* (Early Blight) on Potato

The trial was carried out in the glasshouse sited in the SAGEA's facility in Castagnito (Cuneo)—Piemonte region (Northern Italy) in order to evaluate and compare the efficacy against *Alternaria solani* and the selectivity on potato (Agata variety) of ADF-16 250 OD applied at several rates (100, 125, 150 g AI/ha). As reference treatments CUPRIZOL S (copper oxychloride 180 g/l+sulphur 292 g/l) was applied at 330 g AI/ha.

Artificial inoculation was carried out by spraying the inoculum of *A. solani* on potato plants. Then three applications were performed at 4 days, 12 days, and 19 days after artificial inoculation.

Figure 16:
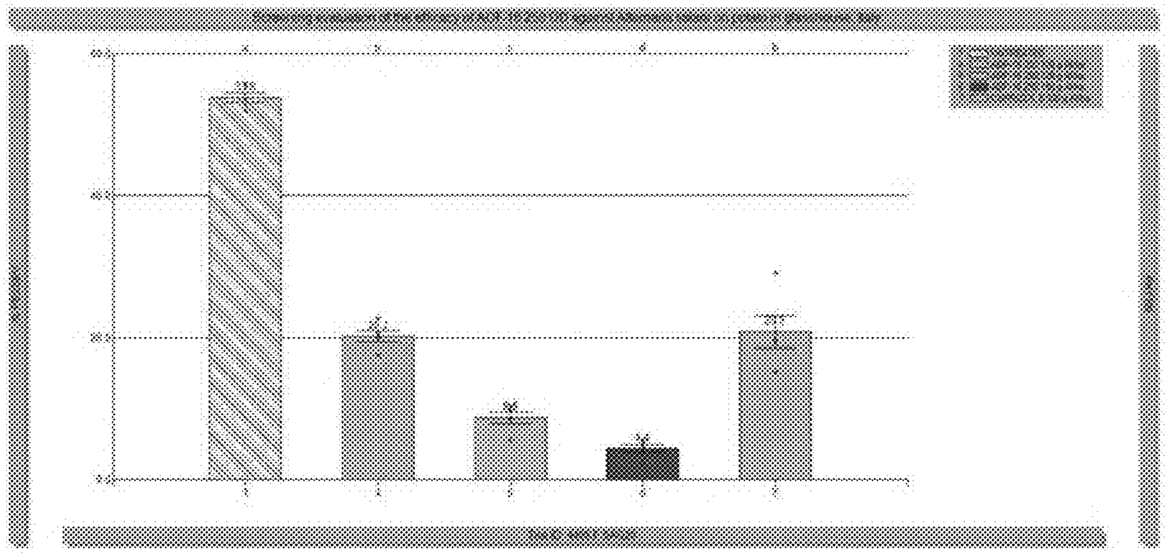
FIG. 16: Efficacy for controlling *Alternaria solani* (Early blight) on potato

At the last assessment, performed 14 days after the last application the untreated check recorded 53.8% of severity. ADF-16 250 OD at 150 g ai/ha resulted significantly different from the other test items with the lowest value of severity (4.4%). Results are shown in FIG. 16.

Example 20. Control of *Phakopsora pachyrhizi* (Asian Soybean Rust) on Soybean

The trial was conducted in the greenhouse of the Phytopathology Laboratory, of the Empresa de Pesquisa Agrícola Agenda Agronegócios Ltda., in Passo Fundo-RS, in the year 2021.

The experimental design used was randomized block design and the study was composed of 14 treatments and 35 repetitions. The experimental unit was constituted by the primary leaf severity in 1 cm2, totaling 35 in a pot experiment (standing plant).

The crop used was soybean *Glycine max*, with the cultivar BMX Delta Maturity group: 5.9 and susceptible to soybean rust.

The inoculum of soybean rust (*Phakopsora pachyrhizi*) was from sample of the uredospore population, obtained from naturally infected soybean plants from Passo Fundo collected in March 2021, in the Experimental Station of Agenda Agronegócios Ltda, in the District of Bela Vista, maintained and multiplied in pots containing soybean plants (standing plant) and without exposure to any other type of fungicide.

Incubation occurred over a period of 12 hours at a temperature of 22±2° C., and in a dark environment; then, at the same temperature and under a 14-hour photoperiod, remaining in the incubation room for 14 days (period for full visualization of the signs of the pathogen in the witness treatment, without fungicide).

The trial doses of ADF-16 50 EC were: 100 g ai/ha; 150 g ai/ha with adjuvant, 150 g ai/ha without adjuvant, and 200 g ai/ha. The standard used was the product Protioconazole at a dose of 80 g ai/ha of active ingredient.

TABLE 18 treatment list

| N. | Product | Form. | a.i. concentration (ppm) |
|---|---|---|---|
| 1 | Check | — | — |
| 2 | ADF - 16 + Adjuvant 0.25% v/v | 250 OD | 1 |
| 3 | ADF - 16 + Adjuvant 0.25% v/v | 250 OD | 10 |
| 4 | ADF - 16 + Adjuvant 0.25% v/v | 250 OD | 100 |
| 5 | ADF - 16 + Adjuvant 0.25% v/v | 250 OD | 200 |
| 6 | ADF - 16 + Adjuvant 0.5% v/v | 500 SC | 1 |
| 7 | ADF - 16 + Adjuvant 0.5% v/v | 500 SC | 10 |
| 8 | ADF - 16 + Adjuvant 0.5% v/v | 500 SC | 100 |
| 9 | ADF - 16 + Adjuvant 0.5% v/v | 500 SC | 200 |
| 10 | ADF - 16 + Adjuvant 0.5% v/v | 50 EC | 1 |
| 11 | ADF - 16 + Adjuvant 0.5% v/v | 50 EC | 10 |
| 12 | ADF - 16 + Adjuvant 0.5% v/v | 50 EC | 100 |
| 13 | ADF - 16 + Adjuvant 0.5% v/v | 50 EC | 200 |
| 14 | ADM.3500.F.2.A (prothioc) + Adjuvant 0.5% v/v | 250 EC | 1 |
| 15 | ADM.3500.F.2.A (prothioc) + Adjuvant 0.5% v/v | 250 EC | 10 |
| 19 | ADM.3500.F.2.A (prothioc) + Adjuvant 0.5% v/v | 250 EC | 100 |
| 20 | ADM.3500.F.2.A (prothioc) + Adjuvant 0.5% v/v | 250 EC | 200 |

The evaluation of severity was done by the number of *P. pachyrhizi* lesions/cm$^2$ of leaf, quantified in 2 cm$^2$ of the primary leaf.

All treatments were superior to treatment T1 (control) by the Scott-Knott test at 5% significance level. Under the conditions under which the experiment was conducted, the data obtained allowed the following observations:

The best treatment was T14 ADM.3500.F.2.A 250 EC+Rumba 0.5% v/v with 54.8% control;

The best treatments were T13 ADF-16 50 EC+Rumba 0.5% v/v which achieved 43.9% control and T12 ADF-16 50 EC with 42.0% control.

The best formulation was EC.

Example 21. Control of *Phytophtora infestans* on Potato

The trial was carried out in the glasshouse sited in the SAGEA's facility in Castagnito (Cuneo)—Piemonte region (Northern Italy) to evaluate and compare the efficacy against *Phytophtora infestans* and the selectivity on potato, Agata variety, of ADF-16 250 OD applied 150 g ai/ha in comparison to the reference products CUPRIZOL S at 330 g ai/ha.

Four days before application, artificial inoculation was carried out by spraying the inoculum of *P. infestans* on the potato plants. During the trial, three assessments at 7 DA-A, 14 DA-A and 21 DA-A were carried out in order to detect any sign of phytotoxicity-on the crop and to evaluate the disease presence in terms of percentage of affected area (severity) and percentage of affected leaves (incidence).

In the following efficacy assessments, performed at 14 DA-A and 21 DA-A, an increase of the disease pressure was observed with the untreated check that at the last assessment recorded 37.1% of affected leaf area and 87.2% of affected leaves.

As observed in the first assessment, both the reference treatment and ADF-16 test items resulted in significantly different control compared to the untreated check and ADF-16 provided a significant better control than the reference treatment at half of the amount of ai in g/ha.

TABLE 19

| | PESSEV % UNCK | PESINC % UNCK |
|---|---|---|
| UTC (untreated check) | 0 | 0 |
| ADF-16 250 OD 150 g ai/ha ABC | 97.0 | 72.5 |
| CUPRIZOL S (copper oxychloride + sulphur) 330 g ai/ha ABC | 66.9 | 35.7 |

Example 22. Control of *Cercospora beticola* on Beets

*Cercospora beticola* causes *Cercospora* leaf spot on beets species. The efficacy of an ADF-16 formulation was compared to a sulfur-based formulation used at the same equivalent dose of 125 g a.i./ha.

Treatments were performed preventively, 24 hours before inoculation with the fungal pathogen of interest, using a hand-sprayer calibrated to deliver an equivalent volume of 300 1 per hectare. All formulations were prepared in the same equivalent water volume following the agricultural practice. Control plants (untreated) were treated with water. 3 repetitions of 2 plants per condition were taken. Mean of Disease Intensity Infection by *Cercospora beticola* strain Cbet 1 of sugar beet plants untreated (control) or treated protectively 24 h before inoculation with ADF-16 500 SC (ADM.00050.F.1.A) at 125 g a.i./ha (0.25 L/ha) or Catzo SC at 125 g a.i./ha (0.16 L/ha) after 14 days of incubation in controlled conditions shows that at the same amount of active ingredient, ADF-16 (ADF-16 SC at 125 g a.i./ha) provides a much higher control.

TABLE 20

| Modality | % DSI (14 dpi)* | SE | Statistical groups (Newman Keuls test at 5%) | Efficacy (%) |
|---|---|---|---|---|
| Control | 70.0 | 4.2 | A | — |
| ADF-16 SC (125 g a.i./ha) | 54.0 | 4.6 | B | 22.9% |
| Catzo SC (125 g a.i./ha) | 68.9 | 4.6 | A | 1.5% |

*Each DSI value corresponds to the mean of 20 observations (4 plants with 5 leaves each per modality) +/− standard error (SE). Values followed by the same letter are not significantly different according to the Newman Kels test at 5%.

Example 22: Control of *Colletotrichum capsici* on Chili

The trial was carried out in Madhavapuram, Khammam (Dist), Telangana (India) to evaluate and compare the efficacy against *Colletotrichum capsici* and the selectivity on chili (Yashaswini (Mahyco)) of ADF-16 500 SC applied at 200 g AI/ha. As a reference treatment, Almagor (Azoxy 5.6%+PCZ 20%+Tebu 10% w/v) EC was applied at 105+375+187.5 g AI/ha.

Two application were performed, the first at 110 Days after transplanting and the second at 15 DA-A.

10 plants were tagged randomly per replication per treatment (10×3 replications=30 plants) & observations were recorded from 10 randomly selected fruits per plant at 0 DAA (Pre-count), 5 DAA, 10 DAA, 15 DAA after 1st spray and repeated the same after the second application.

Disease incidence was calculated at the two application timings as the percentage of the number of infected fruits on the total number of assessed fruits (observations were taken from 10 tagged plants and from each tagged plant 10 fruits were observed, therefore, total number of fruits observed is 100 per treatment per replication).

ADF-16 500 SC applied at 200 g AI/ha achieved the lowest incidence compared to both reference products which in comparison applied more than double the amount of active ingredient.

TABLE 21

| Treatment | g ai/ha | % Disease incidence 15 DA-A |
|---|---|---|
| UTC | — | — |
| ADF-16 500 SC | 200 | 35.3 |
| Almagor (Azoxy 5.6% + PCZ 20% + Tebu 10% w/v) EC | 105 + 375 + 187.5 | 37.3 |

Example 23. Control of *Alternaria solani* on Potato

The trial was carried out in the glasshouse sited in the SAGEA's facility in Castagnito (Cuneo)—Piemonte region (Northern Italy) to evaluate and compare the efficacy against *Alternaria solani* and the selectivity on potato (Agata variety) of ADF-16 250 OD applied at 150 g AI/ha. As reference treatments CUPRIZOL S and CABRIO DUO were applied respectively at 330 and 280 g AI/ha.

Artificial inoculation was carried out by spraying the inoculum of *Alternaria solani* on potato plants. The three applications were performed at 4 days, 11 days and 18 days after artificial inoculation.

During the trial, four assessments (11 days, 18 days, 25 days and 32 days after inoculation) were carried out to detect any phytotoxicity symptoms on the crop and for evaluating the disease severity and incidence.

At the last assessment, performed at 32 days after inoculation, the untreated check recorded 53.8% of severity and 100.0% of incidence. ADF-16 250 OD at 150 g ai/ha resulted in significantly better control of the disease at a significant lower amount of ai/ha.

TABLE 22

| | PESSEV % UNCK | | PESINC % UNCK | |
|---|---|---|---|---|
| UTC | 0 | | 0 | |
| ADF-16 250 OD 150 g ai/ha ABC | 91.7 | a | 62.7 | a |
| CUPRIZOL S (copper oxychloride + sulphur) 330 g ai/ha ABC | 61.3 | c | 16 | c |
| CABRIO DUO (pyraclostrobin + dimetomorph) 280 g ai/ha ABC | 83.3 | b | 48 | b |

Example 25. Control of *Plenodomus lingam* on Phoma

The trial was carried out in Kryniczno, 55-114 Wisznia Mala, woj. dolnoślaskie, Polska/Lower Silesia, South-western Poland in order to evaluate and compare the efficacy against *Plenodomus lingam* (Phoma) and the selectivity on rapeseed (LG Architect variety) of ADF-16 500 SC applied at two rates (125 and 150 g ai/ha).

One application took place at BBCH stage 63-65 on May 13, 2021. The assessment of the stem infection was performed at crop growth stage BBCH 85 on Jul. 8, 2021 and showed significant control of the disease from ADF-16 500 SC at 125 g ai/ha and 150 g ai/ha compared to the untreated control, with efficacy levels of 80.5% and 78.1% respectively.

Example 26. Ecological Toxicity Profile of Flumetylsulforim

The compound flumetylsulforim (ADF-16) is a new active ingredient of fungicidal plant protection products for application in arable crops, intended for submission for approval in the EU.

The ecotoxicity of flumetylsulforim was investigated in numerous studies in accordance with the strict requirements for the approval of active substances in the EU.

The results of these studies and risk estimates based on the relevant endpoints are summarized in the table below.

TABLE 23

| Organism | Species | Study type | Ecotoxicity endpoint[1] | Risk at current use pattern[2] |
|---|---|---|---|---|
| Birds | Bobwhite quail | Acute | $LD_{50}$ > 2000 mg/kg bw | Acceptable |
| | Bobwhite quail | Reproduction | NOED > 67.8 mg/kg bw/d | Acceptable |
| Mammals | Rat | Acute | $LD_{50}$ > 2000 mg/kg bw | Acceptable |
| | Rabbit | Long-term | NOED = 15 mg/kg bw/d | Acceptable |

TABLE 23-continued

| Organism | Species | Study type | Ecotoxicity endpoint[1] | Risk at current use pattern[2] |
|---|---|---|---|---|
| Fish | Rainbow trout | Acute | $LC_{50}$ = 5.41 mg/L | Acceptable |
| | Rainbow trout | Long-term | NOEC = 0.128 mg/L | Acceptable |
| Aquatic invertebrates | *Daphnia magna* | Acute | $EC_{50}$ > 10.0 mg/L | Acceptable |
| | *Daphnia magna* | Long-term | NOEC = 0.32 mg/L | Acceptable |
| Algae | Green alga | Long-term | $EC_{50}$ > 10.0 mg/L | Acceptable |
| Non-target arthropods | Honeybee | Acute oral | $LD_{50}$ > 3.727 μg/bee | Acceptable |
| | Honeybee | Acute contact | $LD_{50}$ > 50 μg/bee | Acceptable |
| | Honeybee | Chronic oral | $LD_{50}$ = 16.0 μg/bee/d | Acceptable |
| | Honeybee | Chronic larvae | NOEC > 250 mg/kg diet | Acceptable |
| | Parasitoid wasp | Reproduction | $LR_{50}$ > 189 g/ha | Acceptable |
| | Predatory mite | Reproduction | $LR_{50}$ > 189 g/ha | Acceptable |
| Earthworms | *Eisenia fetida* | Long-term | NOEC = 309 mg/kg dws | Acceptable |
| Soil microbial activity | Nitrogen activity | Long-term | >10.3 mg/kg dws | Acceptable |
| Non-target terrestrial plants | Sugar beet | Seedling emergence | $ER_{50}$ > 189 g/ha | Acceptable |
| | Oil seed rape | Seedling emergence | $ER_{50}$ > 189 g/ha | Acceptable |
| | Cucumber | Seedling emergence | $ER_{50}$ > 189 g/ha | Acceptable |
| | Carrot | Seedling emergence | $ER_{50}$ > 189 g/ha | Acceptable |
| | Soybean | Seedling emergence | $ER_{50}$ > 189 g/ha | Acceptable |
| | Sunflower | Seedling emergence | $ER_{50}$ > 189 g/ha | Acceptable |
| | Onion | Seedling emergence | $ER_{50}$ > 189 g/ha | Acceptable |
| | Common oat | Seedling emergence | $ER_{50}$ > 189 g/ha | Acceptable |
| | Ryegrass | Seedling emergence | $ER_{50}$ > 189 g/ha | Acceptable |
| | Maize | Seedling emergence | $ER_{50}$ > 189 g/ha | Acceptable |
| | Sugar beet | Vegetative vigour | $ER_{50}$ > 189 g/ha | Acceptable |
| | Oil seed rape | Vegetative vigour | $ER_{50}$ > 189 g/ha | Acceptable |
| | Cucumber | Vegetative vigour | $ER_{50}$ > 189 g/ha | Acceptable |
| | Carrot | Vegetative vigour | $ER_{50}$ > 189 g/ha | Acceptable |
| | Soybean | Vegetative vigour | $ER_{50}$ > 189 g/ha | Acceptable |
| | Sunflower | Vegetative vigour | $ER_{50}$ > 189 g/ha | Acceptable |
| | Onion | Vegetative vigour | $ER_{50}$ > 189 g/ha | Acceptable |
| | Common oat | Vegetative vigour | $ER_{50}$ > 189 g/ha | Acceptable |
| | Ryegrass | Vegetative vigour | $ER_{50}$ > 189 g/ha | Acceptable |
| | Maize | Vegetative vigour | $ER_{50}$ > 189 g/ha | Acceptable |

$LD_{50}/LC_{50}/EC_{50}/LR_{50}/ER_{50}$: dose/concentration/rate resulting in 50% effect (lethal or any effect); NOED/NOEC: no observed effect dose/concentration; bw: bodyweight; d: day; dws: dry weight soil.
[1]symbol ">" indicates greater-than values where no effects were observed at maximum test concentrations.
[2]risk assessed based on current use pattern in wheats and barley at 2 × 100 g/ha, 7-day inter.

As shown above, numerous studies resulted in low toxicity while many of the studies concluded in no toxic effect at the maximum test concentration (i.e. greater-than values). Flumetylsulforim appears to be bee-friendly and harmless to other beneficial insects as well as to many other key organisms tested.

The overall ecological toxicity profile of flumetylsulforim shows an exceptional compatibility to the environment. This profile determined in a wide range of studies makes flumetylsulforim suitable for effective use against fungal diseases in the crop while conserving the biodiversity and the ecosystem in agricultural landscapes at the same time.

Risk-assessments carried out based on the use pattern in wheat and barley according to the current EU standards and requirements show an acceptable acute and long-term risk with comfortably good margin of safety at first tiers without the obligation of implementing buffer zones or drift-reducing technology throughout all assessed key organism.

The EU guidance documents based on which the risk was assessed for the use in wheat and barley are EFSA (2009) Guidance on risk assessment for birds and mammals, EFSA Journal 2009; 7(12):1438, EFSA (2013) Guidance on tiered risk assessment for plant protection products for aquatic organisms in edge-of-field surface waters. EFSA Journal 2013; 11(7):3290, and SANCO (2002) Guidance Document on Terrestrial Ecotoxicology Under Council Directive 91/414/EEC, SANCO/10329/2002 rev 2 final, 17 Oct. 2002, each of which is hereby incorporated by reference in its entireties into this application.

The invention claimed is:

1. A method for treating a plant against fungal pathogen infection and/or fungal disease comprising applying an amount of a compound of Formula I Formula I

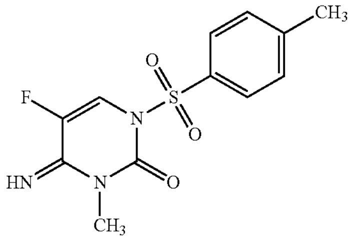

to a plant or a locus thereof so as to thereby treat the plant against fungal pathogen infection and/or fungal disease, wherein:

(1) the fungal pathogen is *Cochliobolus carbonum*, the fungal disease is Northern Corn Leaf Spot, the plant is corn, and the amount of the compound is Formula I is 75-150 g a.i./ha, (2) the fungal pathogen is *Setosphaeria turcica*, the fungal disease is Northern Corn Leaf Blight, the plant is corn, and the amount of the compound is Formula I is 75-150 g a.i./ha, (3) the fungal pathogen is *Cercospora zeae-maydis*, the fungal disease is Gray Leaf Spot, the plant is corn, and the amount of the compound is Formula I is 75-150 g a.i./ha, (4) the fungal pathogen is *Ramularia areola*, the fungal disease is *Ramularia* leaf spot, the plant is cotton, and the amount of the compound is Formula I is 75-200 g a.i./ha, (5) the fungal pathogen is *Cochliobolus heterostrophus*, the fungal disease is Southern corn leaf blight, the plant is corn, and the amount of the compound is Formula I is 75-150 g a.i./ha, (6) the fungal pathogen is *Cercospora kikushi*, the fungal disease is *Cercospora*, the plant is soybean, and the amount of the compound is Formula I is 50-200 g a.i./ha, (7) the fungal pathogen is *Septoria glycines*, the fungal disease is Septoria, the plant is soybean, and the amount of the compound is Formula I is 50-200 g a.i./ha, (8) the fungal pathogen is *Corynespora cassiicola*, the fungal disease is Target spot, the plant is soybean, and the amount of the compound is Formula I is 50-150 g a.i./ha, (9) the fungal pathogen is *Erysiphe diffusa*, the fungal disease is Powdery mildew, the plant is soybean, and the amount of the compound is Formula I is 50-200 g a.i./ha, or

(10) the fungal pathogen is *Cercospora beticola*, the fungal disease is Leaf spot of beet, the plant is sugar beet, and the amount of the compound is Formula I is 75-150 g a.i./ha.

2. The method of claim 1, wherein:

the fungal pathogen is *Setosphaeria turcica*, the fungal disease is Northern Corn Leaf Blight, the plant is corn, and the amount of the compound is Formula I is 75-150 g a.i./ha, the fungal pathogen is *Cercospora zeae-maydis*, the fungal disease is Gray Leaf Spot, the plant is corn, and the amount of the compound is Formula I is 75-150 g a.i./ha, the fungal pathogen is *Ramularia areola*, the fungal disease is *Ramularia* leaf spot, the plant is cotton, and the amount of the compound is Formula I is 75-200 g a.i./ha, the fungal pathogen is *Cercospora kikushi*, the fungal disease is *Cercospora*, the plant is soybean, and the amount of the compound is Formula I is 50-200 g a.i./ha, the fungal pathogen is *Septoria glycines*, the fungal disease is Septoria, the plant is soybean, and the amount of the compound is Formula I is 50-200 g a.i./ha, the fungal pathogen is *Corynespora cassiicola*, the fungal disease is Target spot, the plant is soybean, and the amount of the compound is Formula I is 50-150 g a.i./ha, the fungal pathogen is *Erysiphe diffusa*, the fungal disease is Powdery mildew, the plant is soybean, and the amount of the compound is Formula I is 50-200 g a.i./ha, or the fungal pathogen is *Cercospora beticola*, the fungal disease is Leaf spot of beet, the plant is sugar beet, and the amount of the compound is Formula I is 75-150 g a.i./ha.

3. The method of claim 1, wherein treating a plant against fungal pathogen infection and/or fungal disease is (i) controlling fungal pathogen infection and/or fungal disease, (ii) preventing fungal pathogen infection and/or fungal disease, and/or protecting the plant from fungal pathogen infection and/or fungal disease.

4. The method of claim 1, wherein:

a) the compound of formula I is applied by contacting the plant or a locus thereof with an effective amount of a compound of Formula I, b) the compound of formula I is applied to root of the plant, c) the compound of formula I is applied to foliage of the plant, d) the compound of formula I is applied to seed, or e) the compound of formula I is applied to seedling.

5. The method of claim 1, wherein:

a) the compound of formula I is applied at the time of planting, 1 to 60 day(s) after planting, or 1 to 9 month(s) after planting, b) the compound of Formula I is applied at least one time during a growth season, and/or c) the method comprises a protectant application and/or a curative application of the compound of formula I.

6. The method of claim 1, wherein the method is effective for reducing leaf necrosis.

7. The method of claim 1, wherein the method is for treating a seed or seedling against fungal pathogen infection and/or fungal disease, and the method comprises applying the compound of Formula I to the seed, seedling and/or a locus thereof so as to thereby treat the seed or seedling against the fungal pathogen infection and/or the fungal disease.

8. A method of producing a plant resistant to fungal pathogen infection and/or fungal disease, the method comprising applying a compound of Formula I, Formula I

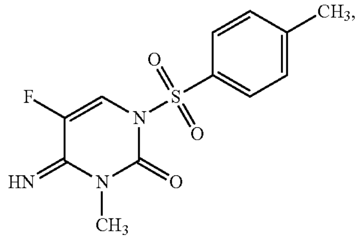

to a seedling of the plant, the plant or a locus thereof so as to thereby produce a plant resistant to fungal pathogen infection and/or fungal disease wherein:

(1) the fungal pathogen is *Cochliobolus carbonum*, the fungal disease is Northern Corn Leaf Spot, the plant is corn, and the amount of the compound is Formula I is 75-150 g a.i./ha, (2) the fungal pathogen is *Setosphaeria turcica*, the fungal disease is Northern Corn Leaf Blight, the plant is corn, and the amount of the compound is Formula I is 75-150 g a.i./ha, (3) the fungal pathogen is *Cercospora zeae-maydis*, the fungal disease is Gray Leaf Spot, the plant is corn, and the amount of the compound is Formula I is 75-150 g a.i./ha, (4) the fungal pathogen is *Ramularia areola*, the fungal disease is *Ramularia* leaf spot, the plant is cotton, and the amount of the compound is Formula I is 75-200 g a.i./ha, (5) the fungal pathogen is *Cochliobolus heterostrophus*, the fungal disease is Southern corn leaf blight, the plant is corn, and the amount of the compound is Formula I is 75-150 g a.i./ha, (6) the fungal pathogen is *Cercospora kikushi*, the fungal disease is *Cercospora*, the plant is soybean, and the amount of the compound is Formula I is 50-200 g a.i./ha, (7) the fungal pathogen is *Septoria glycines*, the fungal disease is Septoria, the plant is soybean, and the amount of the compound is Formula I is 50-200 g a.i./ha, (8) the fungal pathogen is *Corynespora cassiicola*, the fungal disease is Target spot, the plant is soybean, and the amount of the compound is Formula I is 50-150 g a.i./ha, (9) the fungal pathogen is *Erysiphe diffusa*, the fungal disease is Powdery mildew, the plant is soybean, and the amount of the compound is Formula I is 50-200 g a.i./ha, or

(10) the fungal pathogen is *Cercospora beticola*, the fungal disease is Leaf spot of beet, the plant is sugar beet, and the amount of the compound is Formula I is 75-150 g a.i./ha.

9. A plant resistant to fungal pathogen infection and/or fungal disease, wherein the seedling adapted to produce the plant, or a locus of plant is treated using the method of claim 8.

10. A plant seedling adapted to produce a plant resistant to fungal pathogen infection and/or fungal disease, wherein the plant seedling is treated using the method of claim 8.

11. The method of claim 1, wherein the amount is effective to treat the plant against fungal pathogen infection and/or fungal disease and has an ecologically acceptable effect on non-target organisms.

12. The method of claim 11, wherein:

a) the amount of the compound of formula I has an ecologically acceptable acute and/or chronic effect on non-target organisms, the amount of the compound of formula I has an ecologically acceptable effect on reproduction of the non-target organism, and/or the amount of the compound of formula I has an ecologically acceptable effect on growth and/or development of the non-target organism, b) the ecologically acceptable effect is less than 50%, less than 20%, or less than 10% mortality of a non-target organism species, and/or c) the non-target organism is bird, mammal, fish, aquatic invertebrate, algae, arthropod, earthworm, soil microbe, or crop.

13. The method of claim 11, wherein the non-target organism is honeybee.

14. The method of claim 13, wherein:

a. the amount has an ecologically acceptable acute oral effect on honeybee, b. the amount has an ecologically acceptable acute contact effect on honeybee, c. the amount has an ecologically acceptable chronic oral effect on honeybee, d. the amount has an ecologically acceptable chronic effect on larvae of honeybee, e. the amount has an ecologically acceptable acute effect on colony survival of honeybee, f. the amount has an ecologically acceptable chronic effect on colony survival of honeybee, g. the amount has an ecologically acceptable acute effect on development of honeybee, h. the amount has an ecologically acceptable chronic effect on development of honeybee, and/or i. the ecologically acceptable effect is less than 10% mortality of a non-target organism species or substantially no observable effect.

15. The method of claim 11, wherein the amount of the compound of formula I is 150 g ai/ha or less.

16. The method of claim 11, wherein the amount of the compound of formula I is 100 g ai/ha or less, applied twice with a 7-day interval in between applications.

17. A mature plant resistant to fungal attack wherein the mature plant or a seedling adapted to produce the mature plant is treated using the method of claim 11, and wherein the treated mature plant has an ecologically acceptable effect on non-target organisms that contact the treated mature plant.

18. The method of claim 1, wherein:

(1) the fungal pathogen is *Setosphaeria turcica*, the fungal disease is Northern Corn Leaf Blight, the plant is corn, and the amount of the compound is Formula I is 75-150 g a.i./ha, (2) the fungal pathogen is *Cercospora zeae-maydis*, the fungal disease is Gray Leaf Spot, the plant is corn, and the amount of the compound is Formula I is 75-150 g a.i./ha, (3) the fungal pathogen is *Ramularia areola*, the fungal disease is *Ramularia* leaf spot, the plant is cotton, and the amount of the compound is Formula I is 75-200 g a.i./ha, (4) the fungal pathogen is *Cercospora kikushi*, the fungal disease is *Cercospora*, the plant is soybean, and the amount of the compound is Formula I is 80-125 g a.i./ha, (5) the fungal pathogen is *Septoria glycines*, the fungal disease is Septoria, the plant is soybean, and the amount of the compound is Formula I is 80-125 g a.i./ha, (6) the fungal pathogen is *Corynespora cassiicola*, the fungal disease is Target spot, the plant is soybean, and the amount of the compound is Formula I is 80-125 g a.i./ha, (7) the fungal pathogen is *Erysiphe diffusa*, the fungal disease is Powdery mildew, the plant is soybean, and the amount of the compound is Formula I is 80-125 g a.i./ha, or (8) the fungal pathogen is *Cercospora beticola*, the fungal disease is Leaf spot of beet, the plant is sugar beet, and the amount of the compound is Formula I is 75-150 g a.i./ha.

* * * * *